(12) United States Patent
Prahlad et al.

(10) Patent No.: US 10,745,164 B2
(45) Date of Patent: Aug. 18, 2020

(54) AUTOMATED ITEM HANDLING WITH RECONFIGURABLE TOTES

(71) Applicant: Grabit, Inc., Sunnyvale, CA (US)

(72) Inventors: Harsha Prahlad, Cupertino, CA (US); Susan Kim, Menlo Park, CA (US); Matthew Leettola, San Jose, CA (US); Steven J. Annen, Mountain View, CA (US); Charlie S. Duncheon, Los Gatos, CA (US); Eric Winger, Ben Lomond, CA (US); Robert Roy, Fremont, CA (US); Pat Bournes, Santa Clara, CA (US); Patrick Wang, San Jose, CA (US)

(73) Assignee: Grabit, Inc., Sunnyvale, CA (US)

( * ) Notice: Subject to any disclaimer, the term of this patent is extended or adjusted under 35 U.S.C. 154(b) by 611 days.

(21) Appl. No.: 15/299,984

(22) Filed: Oct. 21, 2016

(65) Prior Publication Data

US 2017/0036798 A1    Feb. 9, 2017

Related U.S. Application Data

(63) Continuation of application No. PCT/US2015/026679, filed on Apr. 20, 2015.
(Continued)

(51) Int. Cl.
*B65B 59/00* (2006.01)
*B65D 21/02* (2006.01)
(Continued)

(52) U.S. Cl.
CPC .......... *B65B 59/00* (2013.01); *B65D 21/0233* (2013.01); *B65G 1/137* (2013.01);
(Continued)

(58) Field of Classification Search
CPC ...... G06Q 10/08; G06Q 10/083; G06Q 50/28; B65B 59/00; B65D 21/0233; B65D 88/05;
(Continued)

(56) References Cited

U.S. PATENT DOCUMENTS 3,480,174 A * 11/1969 Sherwood ............... B60P 7/132
                                                                220/1.5
3,797,691 A *  3/1974 Williams, Jr. ......... B65D 19/16
                                                                220/1.5
(Continued)

FOREIGN PATENT DOCUMENTS

CN       203889500 U      10/2014
CN       203911809 U      10/2014
(Continued)

OTHER PUBLICATIONS

PCT/US2017/013262 Invitation to Pay Additional Fees dated Mar. 20, 2017.
(Continued)

*Primary Examiner* — Andrew M Tecco
*Assistant Examiner* — Nicholas E Igbokwe
(74) *Attorney, Agent, or Firm* — Gardner, Linn, Burkhart & Ondersma LLP

(57) ABSTRACT

Provided herein are solutions to automated material handling comprising systems that allow automated "each pick handling" without requiring the complexity of robotic grasping. Numerous examples of pre-configurable and reconfigurable transport containers, partitioning devices, and automated container configuration stations are described in addition to methods of use and associated material handling systems that utilize such containers. Further described are containers that are individually configured or customized according to specific lot sizes to more efficiently and opti-
(Continued)

mally contain, store and distribute articles as a component of a picking system. Configurable containers or "totes" may be customized on a per-order basis to create optimally configured containers that maximize the use of space in a container, on a single-item-per-space basis, regardless of item quantity, size or volume, by customizing the size of each space within a container or tote. Still further, each containment area comprises a releasable surface that allows for picking of an item by utilizing gravity in lieu of a robotic gripper.

14 Claims, 48 Drawing Sheets

Related U.S. Application Data

(60) Provisional application No. 61/982,272, filed on Apr. 21, 2014.

(51) Int. Cl.
  *B65G 1/137* (2006.01)
  *G06Q 10/08* (2012.01)
  *G06Q 30/06* (2012.01)
  *G06Q 50/28* (2012.01)

(52) U.S. Cl.
  CPC ........... *B65G 1/1373* (2013.01); *G06Q 10/08* (2013.01); *G06Q 10/083* (2013.01); *G06Q 30/0635* (2013.01); *G06Q 50/28* (2013.01)

(58) Field of Classification Search
  CPC .... B65D 88/022; B65D 88/00; B65D 88/129; B65D 88/54; B65G 1/137; B65G 1/1373; Y10T 29/49904
  See application file for complete search history.

(56) References Cited

U.S. PATENT DOCUMENTS

| | | | |
|---|---|---|---|
| 4,723,353 A | 2/1988 | Monforte | |
| 4,856,769 A | 8/1989 | Andrew et al. | |
| 5,207,313 A | 5/1993 | Gebhardt | |
| 5,532,903 A | 7/1996 | Kendall | |
| 5,765,707 A * | 6/1998 | Kenevan | B65D 11/18 220/4.28 |
| 5,883,357 A | 3/1999 | Newman et al. | |
| 6,123,185 A | 9/2000 | Demarest et al. | |
| 6,548,982 B1 | 4/2003 | Papanikolopoulos et al. | |
| 6,622,063 B1 * | 9/2003 | Moritz | B65D 90/00 700/231 |
| 6,721,762 B1 * | 4/2004 | Levine | G06Q 10/04 |
| 7,034,432 B1 | 4/2006 | Pelrine et al. | |
| 7,598,651 B2 | 10/2009 | Kornbluh et al. | |
| 2001/0045755 A1 | 11/2001 | Schick et al. | |
| 2004/0045963 A1 | 3/2004 | Hoogland | |
| 2004/0146380 A1 * | 7/2004 | Baker | B65G 1/1373 414/273 |
| 2004/0162639 A1 | 8/2004 | Watanabe et al. | |
| 2005/0036873 A1 | 2/2005 | Ikehata et al. | |
| 2007/0005180 A1 * | 1/2007 | Stingel, III | B65G 1/0464 700/213 |
| 2007/0271857 A1 * | 11/2007 | Heather | B65D 88/005 52/79.9 |
| 2008/0089002 A1 | 4/2008 | Pelrine et al. | |
| 2010/0018964 A1 * | 1/2010 | Smith | B65D 90/00 220/1.5 |
| 2010/0147842 A1 * | 6/2010 | Reynard | B65D 88/022 220/23.88 |
| 2010/0178139 A1 | 7/2010 | Sundar et al. | |
| 2010/0249553 A1 | 9/2010 | MacLaughlin | |
| 2011/0193362 A1 | 8/2011 | Prahlad et al. | |
| 2011/0202157 A1 * | 8/2011 | Spikker | B01F 13/1066 700/96 |
| 2012/0024740 A1 * | 2/2012 | Gollnick | B65D 88/022 206/503 |
| 2012/0101627 A1 * | 4/2012 | Lert | B65G 1/1378 700/216 |
| 2012/0120544 A1 | 5/2012 | Pelrine et al. | |
| 2012/0181270 A1 * | 7/2012 | Smith | B65D 88/022 220/4.27 |
| 2012/0330453 A1 | 12/2012 | Samak et al. | |
| 2013/0010398 A1 | 1/2013 | Prahlad et al. | |
| 2013/0125319 A1 | 5/2013 | Regan | |
| 2013/0129464 A1 | 5/2013 | Regan et al. | |
| 2013/0149485 A1 | 6/2013 | Furukawa et al. | |
| 2013/0242455 A1 | 9/2013 | Prahlad et al. | |
| 2013/0276826 A1 | 10/2013 | Koenig et al. | |
| 2013/0292303 A1 | 11/2013 | Prahlad et al. | |
| 2013/0294875 A1 | 11/2013 | Prahlad et al. | |
| 2014/0008359 A1 * | 1/2014 | Ferren | B65D 88/121 220/1.5 |
| 2014/0036404 A1 | 2/2014 | Prahlad et al. | |
| 2014/0104744 A1 | 4/2014 | Prahlad et al. | |
| 2014/0241844 A1 | 8/2014 | Golda et al. | |
| 2015/0176981 A1 | 6/2015 | Regan et al. | |
| 2015/0295206 A1 | 10/2015 | Hsieh | |
| 2015/0298320 A1 | 10/2015 | Eisele et al. | |
| 2015/0314583 A1 | 11/2015 | Jess et al. | |
| 2016/0318190 A1 | 11/2016 | Prahlad et al. | |
| 2017/0087728 A1 | 3/2017 | Prahlad et al. | |
| 2018/0250832 A1 | 9/2018 | Prahlad et al. | |
| 2018/0319019 A1 | 11/2018 | Prahlad et al. | |
| 2018/0319020 A1 | 11/2018 | Prahlad et al. | |
| 2018/0326596 A1 | 11/2018 | Prahlad et al. | |

FOREIGN PATENT DOCUMENTS

| | | |
|---|---|---|
| CN | 203990927 U | 12/2014 |
| CN | 104718609 A | 6/2015 |
| DE | 102009011302 A1 | 9/2010 |
| DE | 102011051585 A1 | 1/2013 |
| DE | 102013220107 A1 | 4/2015 |
| EP | 1473764 A2 | 11/2004 |
| JP | S58104806 A | 6/1983 |
| JP | H0539885 U | 5/1993 |
| JP | H07116984 A | 5/1995 |
| JP | H09269995 A | 10/1997 |
| JP | 2000286543 A | 10/2000 |
| JP | 2003285289 A | 10/2003 |
| JP | 2004142878 A | 5/2004 |
| JP | 2005035751 A | 2/2005 |
| JP | 2007222967 A | 9/2007 |
| JP | 2009166859 A | 7/2009 |
| JP | 2012131612 A | 7/2012 |
| JP | 2013037538 A | 2/2013 |
| KR | 20110078566 A | 7/2011 |
| KR | 20130130405 A | 12/2013 |
| WO | WO-2007128398 A1 | 11/2007 |
| WO | WO-2013166317 A2 | 11/2013 |
| WO | WO-2013166324 A2 | 11/2013 |
| WO | WO-2015094375 A1 | 6/2015 |
| WO | WO-2015095826 A1 | 6/2015 |
| WO | WO-2015142754 A1 | 9/2015 |
| WO | WO-2015142911 A1 | 9/2015 |
| WO | WO-2015164264 A1 | 10/2015 |
| WO | WO-2016054561 A1 | 4/2016 |
| WO | WO-2017123816 A1 | 7/2017 |
| WO | WO-2017123817 A1 | 7/2017 |
| WO | WO-2017123818 A1 | 7/2017 |
| WO | WO-2018071722 A1 | 4/2018 |

OTHER PUBLICATIONS

PCT/US2017/013266 International Search Report and Written Opinion dated Apr. 3, 2017.
PCT/US2017/056413 International Search Report and Written Opinion dated Jan. 12, 2018.

(56) References Cited

OTHER PUBLICATIONS

PCT/US2013/077280 International Preliminary Report on Patentability dated Jun. 30, 2016.
PCT/US2013/077280 International Search Report and Written Opinion dated Oct. 2, 2014.
PCT/US2014/071725 International Preliminary Report on Patentability dated Jun. 30, 2016.
PCT/US2014/071725 International Search Report and Written Opinion dated Apr. 16, 2015.
PCT/US2015/020805 International Preliminary Report on Patentability dated Sep. 29, 2016.
PCT/US2015/020805 International Search Report and Written Opinion dated Jul. 20, 2015.
PCT/US2015/021051 International Preliminary Report on Patentability dated Sep. 29, 2016.
PCT/US2015/021051 International Search Report and Written Opinion dated Sep. 3, 2015.
PCT/US2015/026679 International Preliminary Report on Patentability dated Nov. 3, 2016.
PCT/US2015/026679 International Search Report and Written Opinion dated Aug. 27, 2015.
U.S. Appl. No. 15/105,941 Office Action dated Jun. 28, 2019.
PCT/US2017/013262 International Search Report and Written Opinion dated May 24, 2017.
PCT/US2017/013264 International Search Report and Written Opinion dated May 16, 2017.
U.S. Appl. No. 15/126,709 Office Action dated Jul. 11, 2017.
PCT/US2017/013262 International Preliminary Report on Patentability dated Jul. 26, 2018.
PCT/US2017/013264 International Preliminary Report on Patentability dated Jul. 26, 2018.
U.S. Appl. No. 15/105,941 Office Action dated Sep. 21, 2018.

* cited by examiner

Partitions Inserted Into Totes

- At partition forming station, identical wall/partition units get inserted into bottom of tote.
- They are removed to "reset" the tote, tote ready for new partition configuration Side Top There are many ways to do this...

Partitions Inserted Into Totes
- Meltable glue/solder/wax 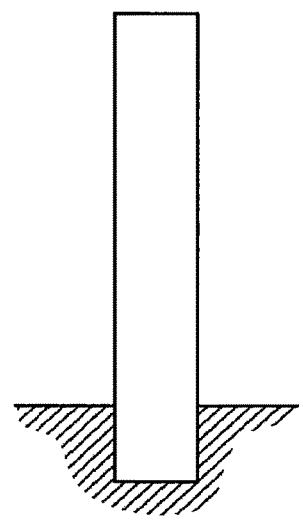 EA 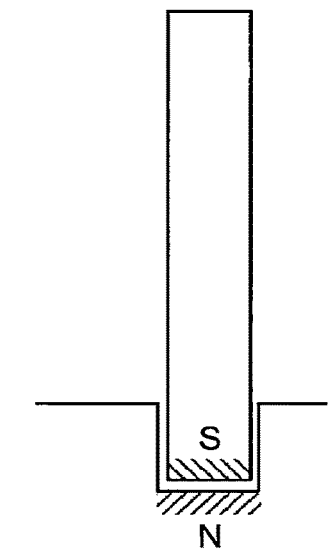 Magnetic
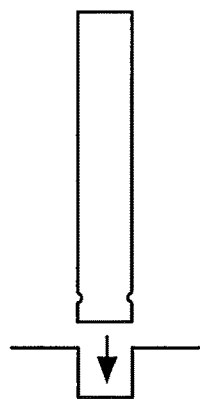
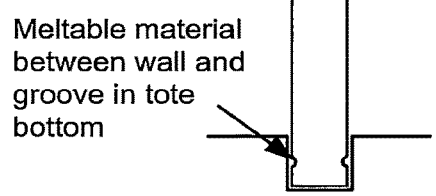 Meltable material between wall and groove in tote bottom
*FIG. 13*

Slide Partitions Into Totes
Partitions are slid in from the side of the tray
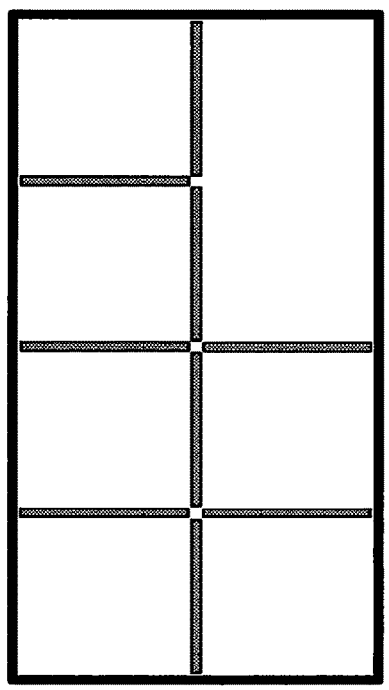
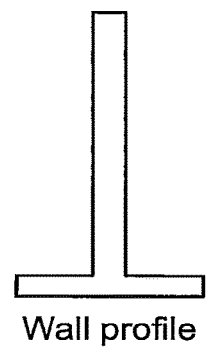
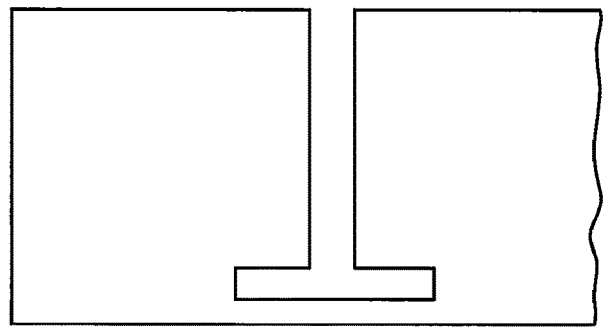
Wall profile
Tray formed with slide in partitions
Cut out in side of tray
FIG. 14

Folding Partitions

- Partitions that are built into tote

There are many ways to do this...

Folding Partitions
- Air pressure and closable valves
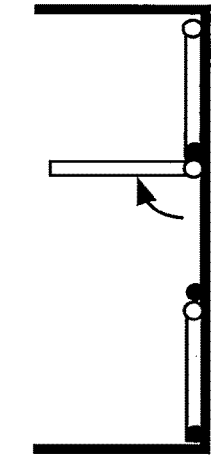
Insert or remove air from ports. Close ports to lock walls in place.
Push button latches and spring-loaded walls
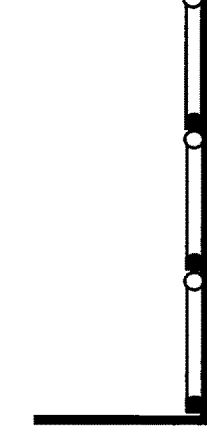
Push to release wall
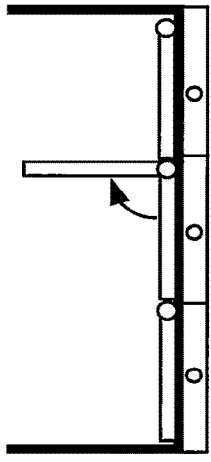
Stiff wall hinges. Actuation needed to repositon.
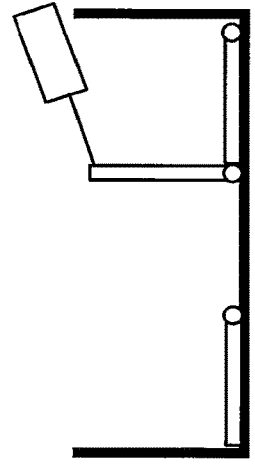
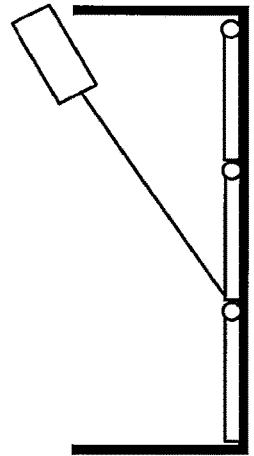
FIG. 16

Folding Partitions
- EA or magnetic latching to choose which walls will be put up.
1. Lock walls that you want to keep down.
2. Invert Box. Desired walls fall down. They are bi-stable so...
3. When you flip the box right-side up again, the desired walls stay up.
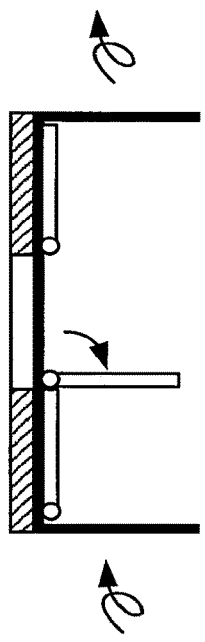
With EA or magnetic floor in bottom or below tote...
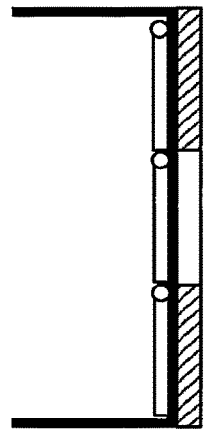
With EA or magnetic latching to the bottom of the tote...
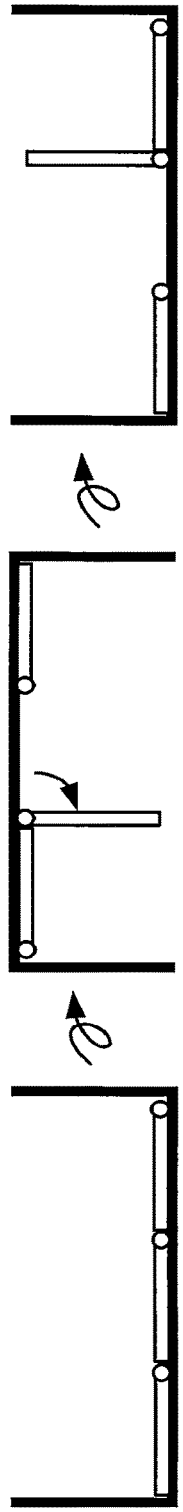
FIG. 17

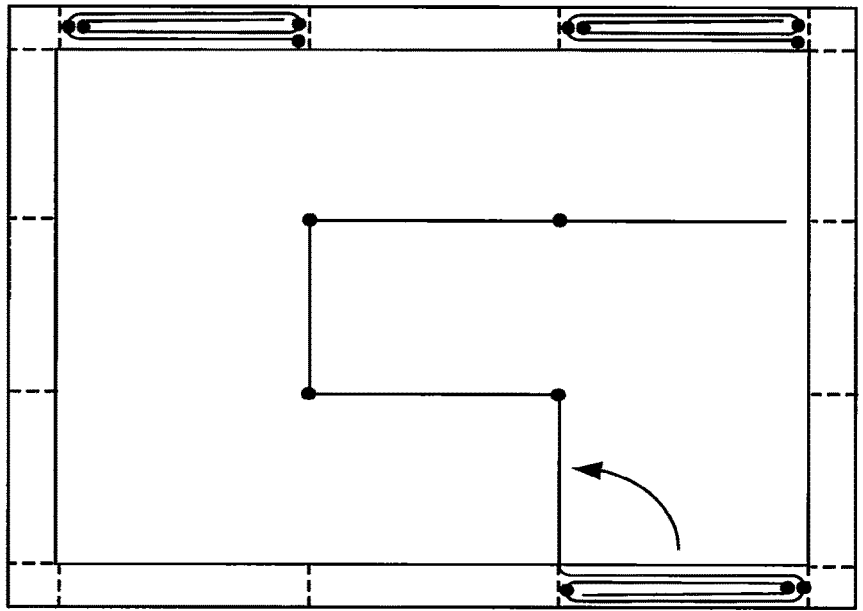
Folding Partitions
- Partitions folded into outer walls of tote
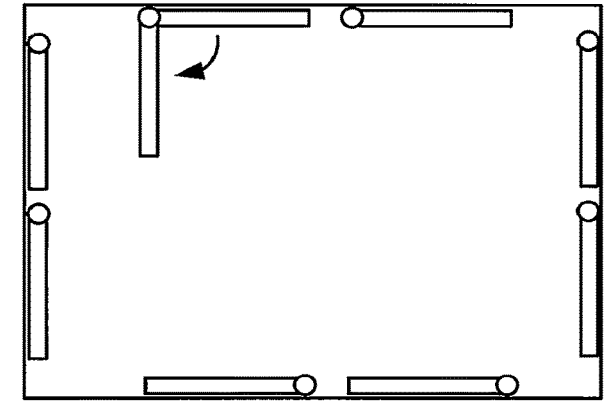
Chain of walls stowed away in the thickness of the outer walls of tote. Walls that are hinged together. Chain is "unspooled" to form different partition shapes.
Hinges and end of chain lock into bottom of tray.
Walls that fold into tote with lockable hinges or latches to keep them in place.
FIG. 19

Spooled Partitions
- Spooled walls stowed in outer walls of tote.
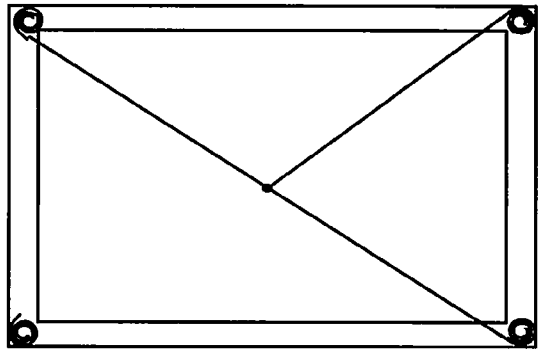
Spools are stowed away. Can be spring-loaded, like a tape measure.
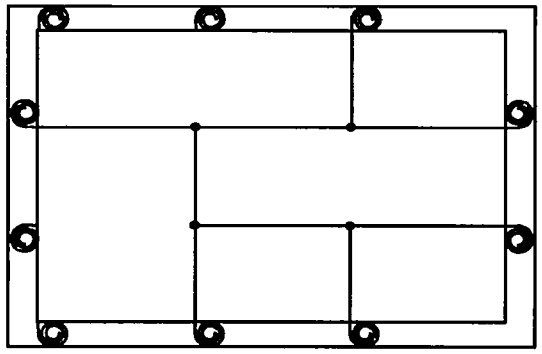
Machine grabs end of walls and pulls them straight out to achieve desired partitions. Ends of walls are pinned/mechanically attached to the bottom of tote or to the sides of other walls.
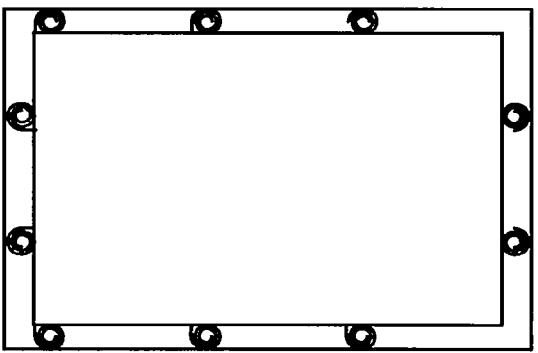
Diagonal walls can be made.
*FIG. 23*

Single Snake-able Partitions

Flexible wall is stored with the tray and secured via a slot
Flexible wall is 're-weaved' through the slotted grid in the base to form a new partition configuration Flexible wall Flexible wall forming partitions Section of base plate showing slot and flexible wall

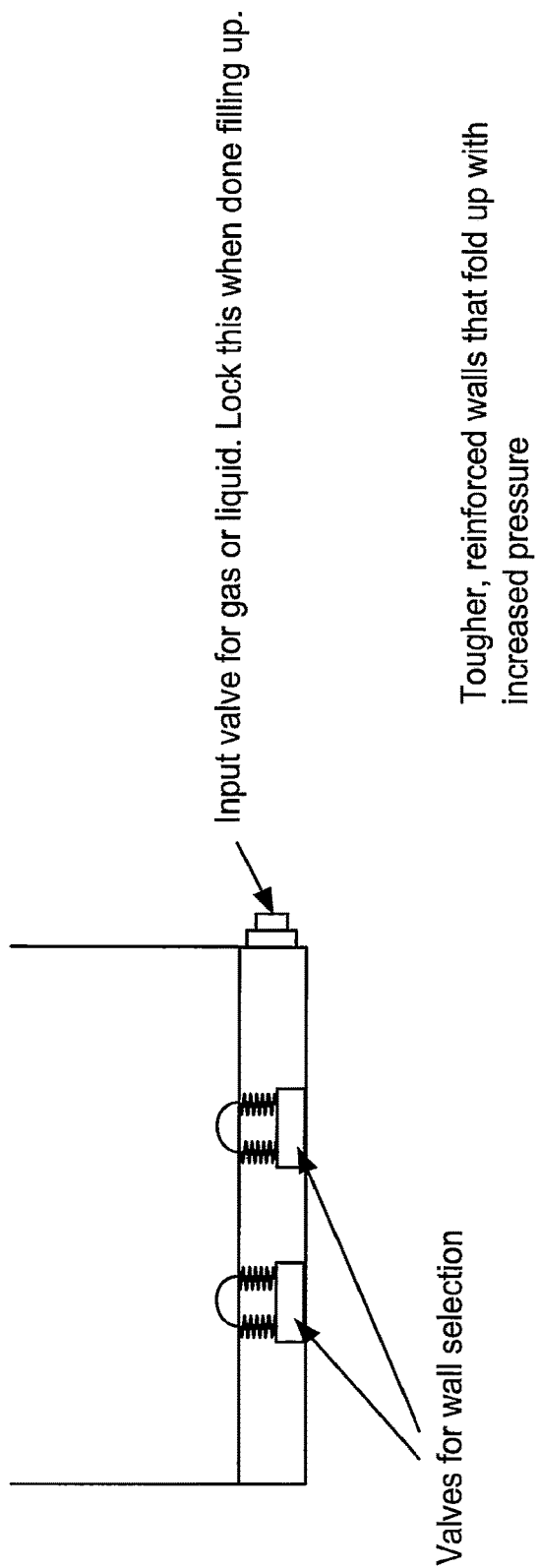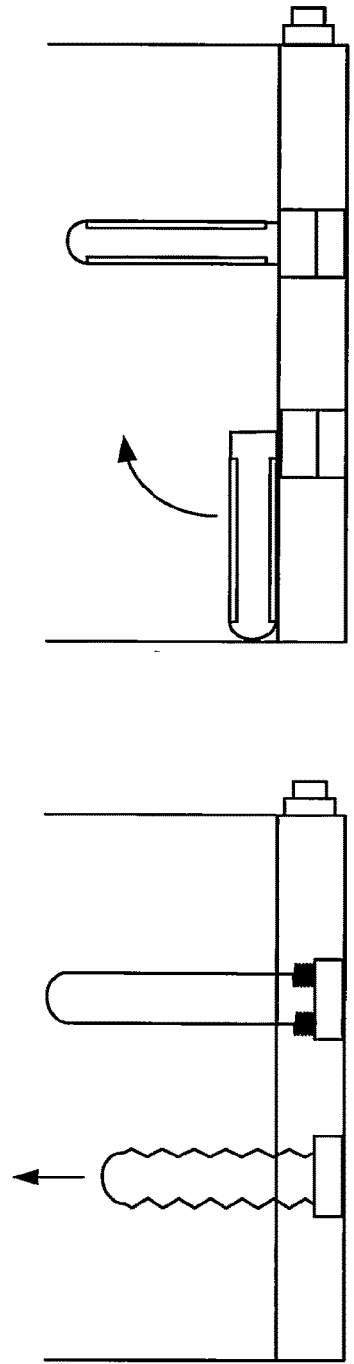
FIG. 26

Made from Scratch Container

Wax is melted and poured into a reconfigurable mold
Molded tote is melted after use to be reconfigured Made from Scratch Container Tote is formed by 3d printing the walls on a base plate
After use, the walls are melted and reformed into stock material for
the 3d printer Gel Trays Tray is filled with a gel like material.
Product is pressed into the material and partially encapsulated. The gel is temporally hardened to secure the product. The gel is locally softened to release a single product when needed.

Lid Attached to Tote – Lockable Hinges
- Push button
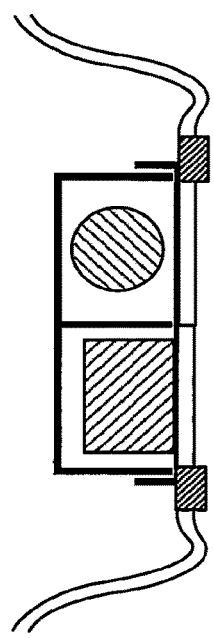
Pneumatic release
Cable release
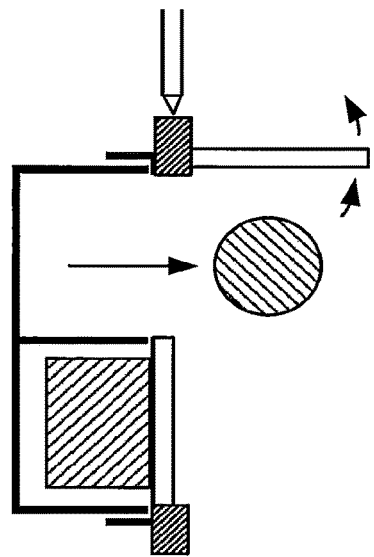
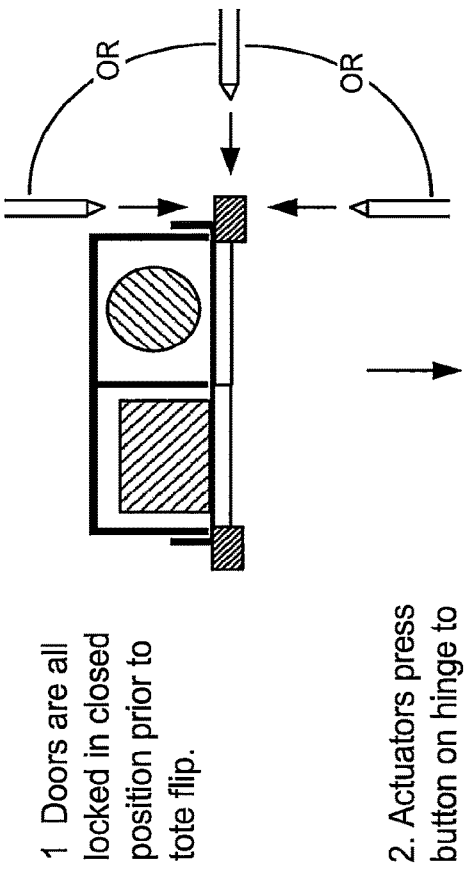
1. Doors are all locked in closed position prior to tote flip.
2. Actuators press button on hinge to unlock hinge.
3. Part is released with gravity.
2. Hinge is unlocked with pneumatic or push/pull cable. This means the lines need to be connected to the lid.
FIG. 34

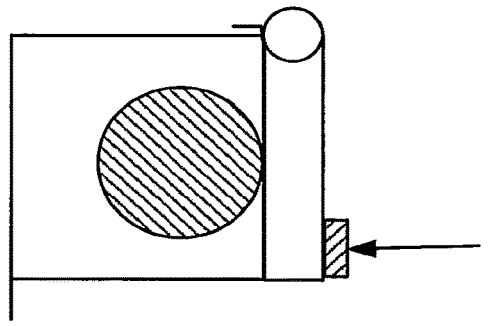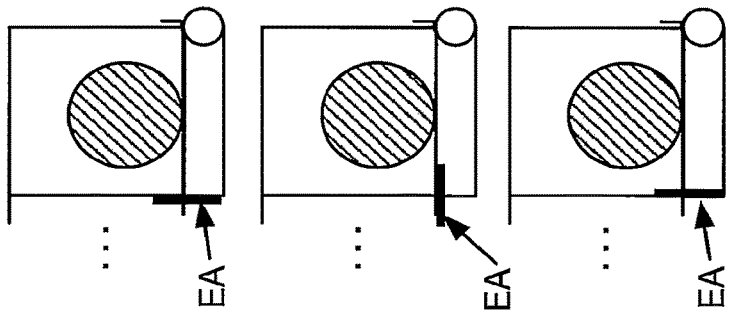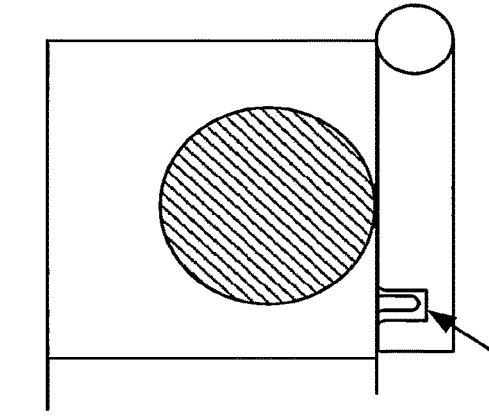
FIG. 38

Lid Attached to Tote – Segment EA Lid Panels

Lid is formed from sheets of material with EA edges
EA edges are activated to secure the bin and deactivated during product release

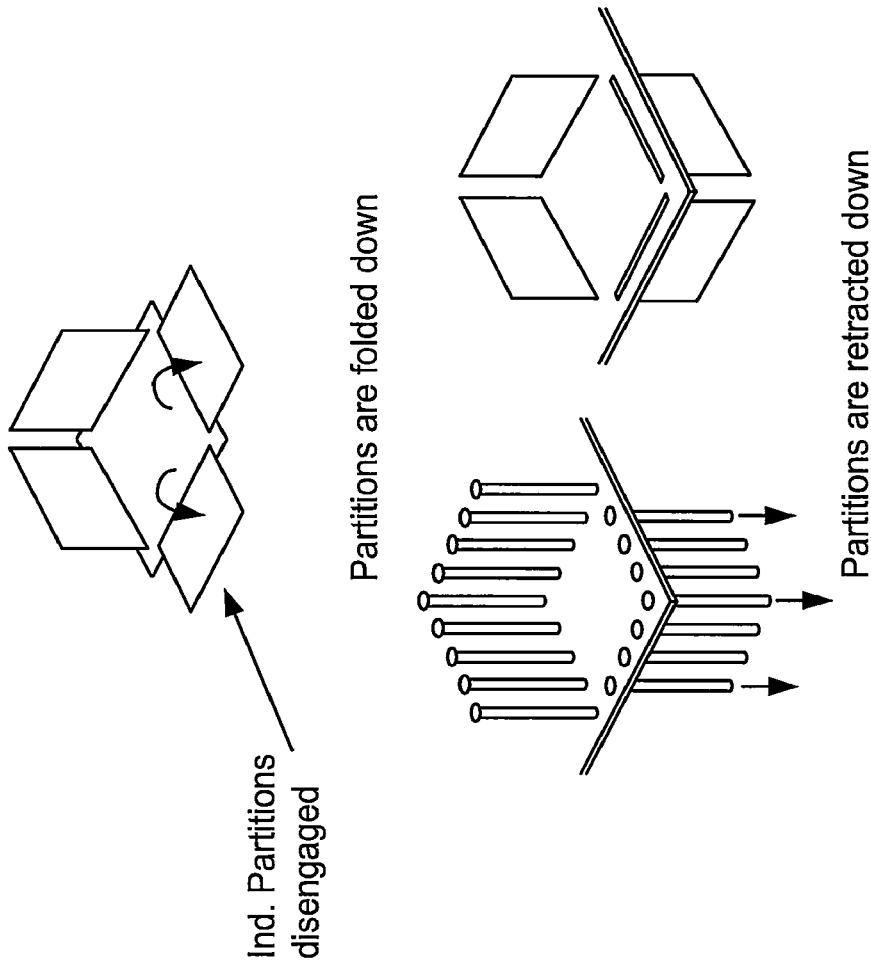
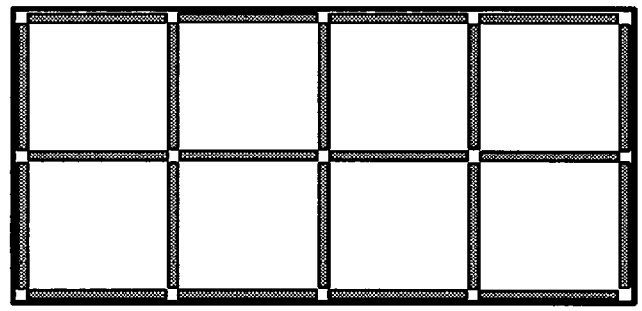
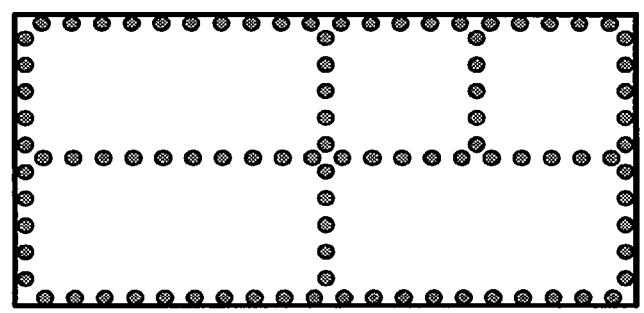
FIG. 42

NO Lid – Tote with Removable Bottom

Reconfigurable totes are passed over a smart dispenser with individual release doors. The smart dispenser is configured to match the incoming reconfigurable tote.
The floor of the incoming tote is removed and all the products falls into their individual compartments in the smart dispenser. The smart dispenser then individually releases product to the shipping box.

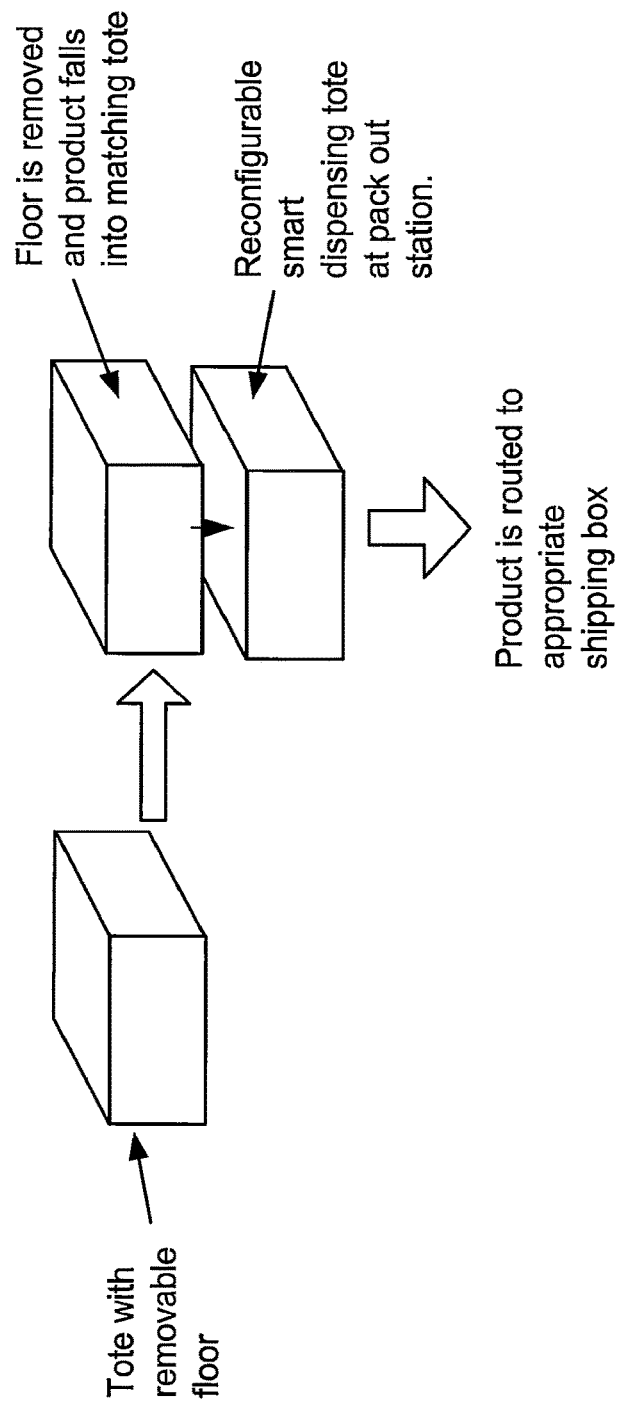

FIG. 44

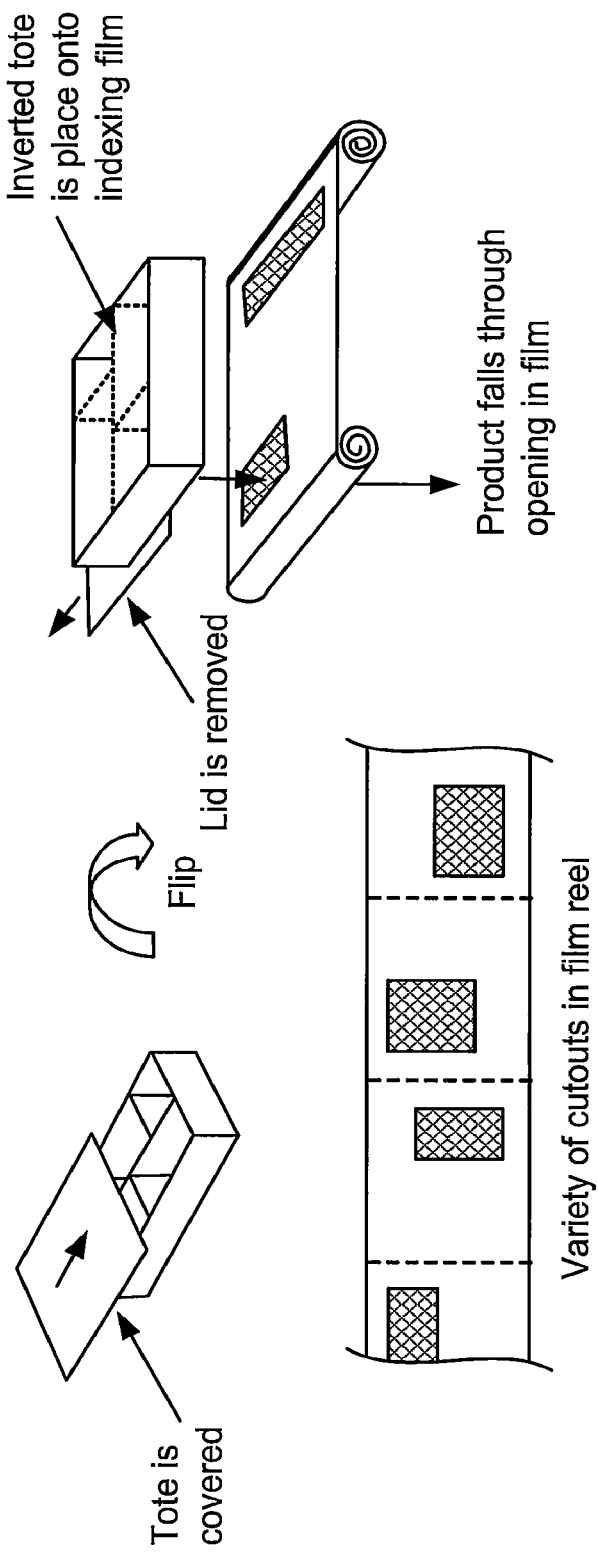

NO Lid – Aperture Cover Plate

Two sets of plates are arranged to cover the tote. The tote is then inverted. The sets of plates reposition themselves to form an opening that matches the corresponding partition and releases a product.

Reconfigured Tote

Plates move independently

Opening formed by plates where product falls through

Path Switching Chutes

Items are diverted into the appropriate shipping boxes using movable vanes EA could be used to intelligently control the decent of the product along the chutes

AUTOMATED ITEM HANDLING WITH RECONFIGURABLE TOTES

CROSS-REFERENCE TO RELATED APPLICATIONS

This application is a Continuation of International Patent Application Number PCT/US2015/026679, entitled "AUTOMATED ITEM HANDLING WITH RECONFIGURABLE TOTES", filed on Apr. 20, 2015, which claims the benefit of U.S. Provisional Application No. 61/982,272, filed on Apr. 21, 2014, for which each application is incorporated herein by reference in its entirety.

BACKGROUND OF THE INVENTION

Provided herein are automated manufacturing and material handling. More particularly, the embodiments herein relates to a system for the automated configuration, transport, storage, management and delivery of items utilizing reconfigurable bins, totes or containers constructed, reconstructed and transported with automated warehousing systems in real time where the tote is optimally manipulated as part of a just-in-time warehousing operation for material storage and handling.

Substantial developments have been made in the industrial handling of various materials and items, particularly in the area of automated systems. For example, various types of robotics and other automated systems are now used in order to "pick and place" objects during many manufacturing and other materials handling processes. Such robotics and other systems can include robot arms that, for example, grip, lift and/or place an object as part of a designated process. Other manipulations and materials handling techniques can also be accomplished using automated systems.

Despite many advances over the years in this field, many limitations still persist as to how items are handled, stored or transported. Continuing limitations exist in the areas of spatial optimization of storage areas or storage density, transport mechanisms for material throughput, and automated sorting of materials. Many of these "each picking" operations are manually intensive, involve high costs and continue to have generally low throughput. Certain approaches revolve around 3D vision and robotic gripping solutions, and these approaches are typically not general purpose due to the wide variety of parts often numbering greater than 1 million SKU's comprising a myriad of changing dimensions and colors, often the result of manufacturers unannounced or running design changes.

Provided herein are storage, handling, organization, sorting and metering systems that can complement or replace existing inefficient manual and automated manufacturing and material handling systems. Provided herein are solutions to automated material handling comprising systems that allow automated "each handling" without requiring the complexity of robotic grasping.

Provided herein are numerous examples of material handling systems comprising pre-configurable and reconfigurable transport containers, automated configuration stations, and order processing systems utilizing variants of "just-in-time" methods and associated "real time" material handling systems that utilize such containers. In particular, containers may be individually configured or customized according to specific lot sizes to more efficiently and optimally contain, store and distribute articles as a component of a picking system. Configurable containers or "totes" may be customized on a per-order basis to create optimally configured containers that maximize the use of space in a container, on a single-item-per-space basis, regardless of item size or volume, by customizing the size of each space within a container or tote.

Provided herein is a system for the automated configuration, transport, storage, management and delivery of items comprising: a container configuration station for configuring optimized containers comprising: an automated assembly device, wherein the automated assembly device is adapted to optimally configure a reconfigurable container based on the number, size and volume of items according to specific ordering information; the reconfigurable containers comprising one or more optimized containment areas; and a means for moving the assembled container to the next step in an automated process. Provided herein is a system for the automated configuration, transport, storage, management and delivery of items comprising: a container configuration station; an automated assembly device adapted to optimally configure a reconfigurable container at the container configuration station based on the number, size and volume of items according to specific ordering information thereby generating an optimally configured container, the optimally configured container comprising one or more optimized containment areas; and an assembled container transporter configured to transport the optimally configured container to the next step in an automated process.

In some embodiments, the reconfigurable container comprises configurable, positionable and/or assemblable partitioning units. In some embodiments, the optimized containment areas comprise configurable, positionable and/or assemblable partitioning units. In some embodiments, the reconfigurable container consists of configurable, positionable and/or assemblable partitioning units. In some embodiments, the optimized containment areas are configured for the optimal storage and management of items. In some embodiments, the optimized containment areas are configured for the optimal transport and management of items to be selectively picked from storage inventory to fulfill orders. In some embodiments, the system further comprises a partition removal station, wherein the partitioning units are removed when the optimally configured container has fulfilled an order or orders for which it was originally configured, thereby restoring the optimally configured container to an un-configured state. In some embodiments, the system further comprises a partition removal station, wherein the partitioning units are removed when the optimally configured container has fulfilled an order or orders for which it was originally configured, thereby restoring the optimally configured container to an un-configured state, wherein the resulting reconfigurable container and/or partitioning units are returned to an available inventory for a future reconfiguration. In some embodiments, each containment area holds one item. In some embodiments, each optimally configured container is assigned a unique identification for each assembled configuration of the container. In some embodiments, the system further comprises an ordering system. In some embodiments, the system further comprises a release surface addressable to each optimized containment area. In some embodiments, the reconfigurable container comprises configurable, positionable and/or assemblable partitioning units. In some embodiments, the optimized containment areas comprise configurable, positionable and/or assemblable partitioning units. In some embodiments, the optimized containment areas are configured for the optimal storage and management of items. In some embodiments, the optimized containment areas are configured for the optimal transport and management of items to be selectively picked from storage inventory to fulfill orders. In some embodiments, the system further comprises a partition removal station, wherein the partitioning units are removed when a reconfigurable container has fulfilled an order or orders for which it was originally configured. In some embodiments, the reconfigurable container and/or partitioning units are returned to an available inventory for a future reconfiguration. In some embodiments, each containment area holds one item. In some embodiments, each configured container is assigned a unique identification for each assembled configuration of the container. In some embodiments, the system further comprises an ordering system. In some embodiments, the system further comprises a release surface addressable to each optimized containment area which can be actuated to controllably dispense each item as needed into an awaiting chute or order fulfilment container.

Provided herein is a method of using a system for the automated configuration, transport, storage, management and delivery of items comprising: providing a container configuration station for configuring containers comprising: providing an automated assembly device adapted to optimally configure a configurable container based on the number, size and volume of items according to specific ordering information; supplying configurable containers comprising one or more optimized containment areas; and providing a means for transporting the assembled configurable container to the next step in an automated process. Provided herein is a method of using a system for the automated configuration, transport, storage, management and delivery of items comprising: providing a container configuration station for configuring containers; providing an automated assembly device; the automated assembly device optimally configuring a reconfigurable container at the container configuration station based on the number, size and volume of items according to specific ordering information, thereby generating an optimally configured container comprising optimized containment areas; and providing a means for transporting the assembled configurable container to the next step in an automated process. In some embodiments, the method comprises providing configurable, positionable and/or assemblable partitioning units. In some embodiments, the optimally configured container comprises configurable, positionable and/or assemblable partitioning units. In some embodiments, the reconfigurable container consists of configurable, positionable and/or assemblable partitioning units. In some embodiments, the optimized containment areas are configured in the optimally configured container for the optimal storage and management of items. In some embodiments, the optimized containment areas are configured for the optimal transport and management of items to be selectively picked from storage inventory to fulfill orders. In some embodiments, the method comprises providing a partition removal station, wherein the partitioning units are removed when an optimally configured container has fulfilled an order or orders for which it was originally configured. In some embodiments, the reconfigurable container and/or partitioning units are returned to an available inventory for a future reconfiguration. In some embodiments, each containment area is configured to hold one item. In some embodiments, each optimally configured container is assigned a unique identification for each assembled configuration of the container. In some embodiments, the method further comprises: providing an ordering system. In some embodiments, the method further comprises providing a release surface addressable to each optimized containment area.

Provided herein is a system for the automated configuration, transport, storage, management and delivery of items comprising: an ordering system; a container configuration station for configuring a configurable container comprising: an automated assembly device to optimally configure a configurable container according to specific ordering information provided by the ordering system; the configurable container; and configurable partitioning units; wherein the configurable partitioning units are positionable within the configurable container by the automated assembly device to create optimized containment areas based on the number, size and volume of items to be placed in the containment areas according to the specific ordering information, for the optimal transport, storage and management of said items, and a means to move the assembled configurable container to the next step in an automated process. In some embodiments, the system further comprises a partition removal station, wherein the partitioning units are removed when a reconfigurable container has fulfilled a task for which it was originally configured. In some embodiments, the reconfigurable container and or configurable partitioning units are returned to an available inventory for a future reconfiguration. In some embodiments, each containment area holds one item. In some embodiments, each configured container is assigned a unique identification for each configuration of the container. In some embodiments, each configurable container further comprises a release surface addressable to each optimized containment area which can be actuated to controllably dispense each item as needed into an awaiting chute or order fulfilment container.

Provided herein is a system for the automated configuration, transport, storage, management and delivery of items comprising: an ordering system; a container configuration station for configuring a configurable container comprising: an automated assembly device to optimally configure the configurable container according to specific ordering information provided by the ordering system; the configurable container; and configurable partitioning units; wherein the configurable partitioning units are positionable within the configurable container by the automated assembly device to create optimized containment areas based on the number, size and volume of items to be placed in the containment areas according to the specific ordering information, for the optimal transport, storage and management of said items thereby generating the assembled configurable container, and a means to move the assembled configurable container to the next step in an automated process. In some embodiments, the system further comprises a partition removal station, wherein the partitioning units are removed when the assembled configurable container has fulfilled a task for which it was originally configured. In some embodiments, the configurable container and or configurable partitioning units are returned to an available inventory for a future reconfiguration. In some embodiments, each containment area holds one item. In some embodiments, each configured container is assigned a unique identification for each configuration of the container. In some embodiments, each configurable container further comprises a release surface addressable to each optimized containment area. In some embodiments of the method, the reconfigurable container comprises: providing and using configurable, positionable and/or assemblable partitioning units. In some embodiments, the optimized containment areas comprise using configurable, positionable and/or assemblable partitioning units. In some embodiments, the reconfigurable container consists of configurable, positionable and/or assemblable partitioning units. In some embodiments, the optimized containment areas are configured for the optimal storage and management of items. In some embodiments, the optimized containment areas are configured for the optimal transport and management of items to be selectively picked from storage inventory to fulfill orders. Still further, in some embodiments, comprise providing a partition removal station, wherein the partitioning units are removed when a reconfigurable container has fulfilled an order or orders for which it was originally configured. In some embodiments, the reconfigurable container and/or partitioning units are returned to an available inventory for a future reconfiguration. In some embodiments, each containment area is configured to hold one item. In some embodiments, each configured container is assigned a unique identification for each assembled configuration of the container. Still further, some embodiments comprise providing an ordering system. Further still, some embodiments comprise providing a release surface addressable to each optimized containment area which can be actuated to controllably dispense each item as needed into an awaiting chute or order fulfillment container.

Provided herein is a method of using a system for the automated transport, storage, management and delivery of items comprising: providing an ordering system; providing a container configuration station comprising an automated assembly device for optimally configuring a configurable container according to specific ordering information provided by the ordering system; positioning a configurable container in the container configuration station; providing configurable partitioning units; and causing the configurable partitioning units to be optimally positioned within the configurable container by the automated assembly device; wherein the partitioning units are positioned in to create optimized containment areas based on the number size and volume of items to be placed in the containment areas according to the specific ordering information, for the optimal transport, storage and management of said items; and providing a means to move the assembled configurable container to the next step in an automated process. Provided herein is a method of using a system for the automated transport, storage, management and delivery of items comprising: providing an ordering system; providing a container configuration station comprising an automated assembly device for optimally configuring a configurable container according to specific ordering information provided by the ordering system; positioning a configurable container in the container configuration station; providing configurable partitioning units; and causing the configurable partitioning units to be optimally positioned within the configurable container by the automated assembly device thereby generating an assembled configurable container, wherein the partitioning units are positioned in to create optimized containment areas based on the number size and volume of items to be placed in the containment areas according to the specific ordering information, for the optimal transport, storage and management of said items; and providing a means to move the assembled configurable container to the next step in an automated process. In some embodiments, the method comprises providing a partition removal station, wherein the partitioning units are removed from a assembled configurable container when the configured container has fulfilled a task for which it was originally configured. In some embodiments, the configurable container and or configurable partitioning units are returned to an available inventory for a future reconfiguration. In some embodiments, the configurable container is assembled for an inventory storage application. In some embodiments, the configurable container is assembled for a unique fulfillment order. In some embodiments, each containment area holds one item. In some embodiments, each assembled configurable container is assigned a unique identification for each configuration of the container. In some embodiments, the method further comprises: providing a release surface addressable to each optimized containment area. In some embodiments, the method further comprises providing a partition removal station, wherein the partitioning units are removed from a reconfigurable container when the configured container has fulfilled a task for which it was originally configured. In some embodiments, the reconfigurable container and or configurable partitioning units are returned to an available inventory for a future reconfiguration. In some embodiments, a reconfigurable container is assembled for an inventory storage application. In some embodiments, a reconfigurable container is assembled for a unique fulfillment order. In some embodiments, each containment area holds one item. In some embodiments, each configured container is assigned a unique identification for each configuration of the container. In some embodiments, the method further comprises providing a release surface addressable to each optimized containment area which can be actuated to controllably dispense each item as needed into an awaiting chute or order fulfilment container.

Provided herein is a system for configuring a reconfigurable container comprising: a container configuration station comprising an automated assembly device; and configurable partitioning units; wherein the configurable partitioning units are positionable and assemblable by the automated assembly device to form a configured container comprising optimized containment areas based on the number, sizes and volumes of items for which the container is configured.

Provided herein is a system for configuring a reconfigurable container comprising: a container configuration station comprising an automated assembly device; and configurable partitioning units; wherein the configurable partitioning units are positionable and assemblable by the automated assembly device to form a configured container comprising optimized containment areas based on the number, sizes and volumes of items for which the container is configured. In some embodiments, the system further comprises a partition removal station, wherein the configurable partitioning units are disassembled when a configured container has fulfilled a task for which it was originally configured. In some embodiments, the configurable partitioning units are returned to an available inventory for a future reconfiguration. In some embodiments, each containment area holds one item. In some embodiments, each containment area further comprises an addressable release surface. In some embodiments, each configured container is assigned a unique identification for each configuration of the container. In some embodiments, each configured container further comprises a release surface addressable to each optimized containment area. In some embodiments, the system further comprises a partition removal station, wherein the configurable partitioning units are disassembled when a configured container has fulfilled a task for which it was originally configured. In some embodiments, each configurable partitioning units are returned to an available inventory for a future reconfiguration. In some embodiments, each containment area holds one item. In some embodiments, each containment area further comprises an addressable release surface. In some embodiments, each configured container is assigned a unique identification for each configuration of the container. In some embodiments, each configured container further comprises a release surface addressable to each optimized containment area which can be actuated to controllably dispense each item as needed into an awaiting chute or order fulfilment container.

Provided herein is a method of using a system for configuring a reconfigurable container comprising: providing a container configuration station comprising an automated assembly device; and providing configurable partitioning units to the configuration station; wherein the partitioning units are positioned and assembled by the automated assembly device to form a configured container comprising optimized containment areas based on the number, size and volume of items for which the container is configured. Provided herein is a method of using a system for configuring a reconfigurable container comprising: providing a container configuration station comprising an automated assembly device; and providing configurable partitioning units to the configuration station; wherein the partitioning units are positioned and assembled by the automated assembly device to form a configured container comprising optimized containment areas based on the number, size and volume of items for which the container is configured. In some embodiments, the method further comprises: providing a partition removal station, wherein the configurable partitioning units are disassembled when a configured container has fulfilled a task for which it was originally configured. In some embodiments, the configurable partitioning units are returned to an available inventory for reconfiguration. In some embodiments, a reconfigurable container is assembled for an inventory storage application. In some embodiments, a reconfigurable container is assembled for a unique fulfillment order. In some embodiments, each containment area holds one item. In some embodiments, each containment area further comprises an addressable release surface. In some embodiments, each configured container further comprises an addressable release surface. In some embodiments, each configured container is assigned a unique identification for each configuration of the container. In some embodiments, the method further comprises providing a partition removal station, wherein the configurable partitioning units are disassembled when a configured container has fulfilled a task for which it was originally configured. In some embodiments, the configurable partitioning units are returned to an available inventory for reconfiguration. In some embodiments, a reconfigurable container is assembled for an inventory storage application. In some embodiments, a reconfigurable container is assembled for a unique fulfillment order. In some embodiments, each containment area holds one item. In some embodiments, the method provides that each containment area further comprises an addressable release surface which can be actuated to controllably dispense each item as needed into an awaiting chute or order fulfilment container. In some embodiments, each configured container further comprises an addressable release surface which can be actuated to controllably dispense each item as needed into an awaiting chute or order fulfilment container. In some embodiments, each configured container is assigned a unique identification for each configuration of the container.

Provided herein is a system for the automated configuration of a configurable container and selection of items to fill orders comprising: an ordering system; a computer-implemented system comprising: a digital processing device comprising an operating system configured to perform executable instructions and a memory; a computer program including instructions executable by the digital processing device to process an incoming order and determine the requirements for filling the incoming order comprising: a first software module configured to determine an optimized containment area configuration for a configurable container based on the number, size and volume of items in one or more incoming orders; a second software module configured to manipulate an automated assembly device to assemble the components of the configurable container; a third software module configured to determine an optimal pick-order from an inventory and routing to fill the incoming order; a fourth software module configured to determine an optimal routing release sequence for the assembled configurable container containing the picked items for delivery of the picked order; and a means to move the assembled configurable container to a next step in the optimal routing an automated process. In some embodiments, the system comprises a container configuration station for configuring a configurable container comprising: an automated assembly device to optimally configure the configurable container according to specific ordering information of an incoming order and the configuration determined by the first software; the configurable container comprising one or more addressable release surfaces; and configurable partitioning units; wherein the partitioning units are positionable within the configurable container by the automated assembly device to create optimized containment areas based on instruction provided by the second software module, and wherein each optimized containment area is accessible by an addressable release surface. In some embodiments, the system further comprises a release station for releasing the picked items from the configurable container comprising an automated release device; wherein the configurable container is delivered to the release station and the automated release device is configured to cause the selective release of one or more of the addressable release surfaces, wherein the item held in the containment area where the addressable release surfaces of the configured container is released, will drop into an awaiting pick container or chute. In some embodiments, the system comprises a third software module, having determined an optimal pick-order from the inventory and routing to fill the incoming order, provides executable instructions to the means for moving the assembled container. In some embodiments, the system comprises a fourth software module, having determined an optimal routing for the assembled configurable container containing the picked items, provides executable instructions to the means for moving the assembled container for delivery of the picked order. In some embodiments, the configurable container comprising an addressable release surface that releases items in the optimized containment areas when the addressable release surfaces are activated by the release station according to the routing release sequence determined by the fourth software module. In some embodiments, the one or more addressable release surfaces of the configurable container comprises: a top surface; an intermediate surface; and a bottom surface. In some embodiments, each optimized containment area is configured to hold one item. In some embodiments, each configured container is assigned a unique identification for each configuration of the container. In some embodiments, each configured container further comprises a containment surface, wherein the containment surface may be configured to cover or enclose the entire container. A containment surface can be permanent or temporary. A containment surface can be a top surface, bottom surface or intermediate layer surface.

Provided herein is a system for the automated release of items from a configurable container comprising: a configurable container comprising: multiple containment areas of optimal size based on the number, size and volume of items therein; at least one containment surface comprising addressable releasable openings matching the configuration of the multiple containment areas; and a release station comprising an automated device configured to cause the selective release of one or more of the at least one addressable releasable openings of the containment surface, wherein, items held in the containment areas where the addressable releasable opening of the containment surface is activated and released will drop into an awaiting pick container or chute. Provided herein is a method of using a system for the automated release of items from a configurable container comprising: providing a configurable container comprising multiple containment areas of optimal size based on the number, size and volume of items therein; providing at least one containment surface on the configurable container comprising addressable releasable openings matching the configuration of the multiple containment areas; providing a release station comprising an automated device configured to cause the selective release of one or more of the at least one addressable releasable openings of the containment surface, activating at least one addressable releasable opening causing the opening to release the item held therein, wherein, the item will drop into an awaiting pick container or chute.

Provided herein is a method of automating the storage, and picking of inventory comprising: providing a configurable container comprising multiple containment areas for optimal individual object storage based on item number, size and volume; providing at least one containment surface on the configurable container comprising releasable openings to match configuration of the multiple containment areas; providing an inventory system for recording the contents of each containment area within each configurable container and inventory storage locations thereof; and providing an order filling system configured to selectively pick items from the recorded locations of the inventory storage locations; directing an automated picking system to release the releasable opening of the at least one containment surface of any selected configurable container to allow the picking of the item contained therein; and depositing the item into an awaiting pick container or chute.

Provided herein is system for the configuration of reconfigurable containers comprising: an ordering system; a computer-implemented system comprising: a digital processing device comprising an operating system configured to perform executable instructions and a memory; a computer program including instructions executable by the digital processing device to process an incoming order and determine the requirements for filling one or more incoming orders from the ordering system comprising a fifth software module configured to determine an optimized number of configurable containers and the containment areas thereof, based on the number, size and volume of items in the incoming order; a sixth software module configured to manipulate an automated assembly device to assemble components of the configurable transport container as needed, according to the configuration requirements provided by the fifth software module; a seventh software module configured to identify a used assembled reconfigurable container and provide instruction to an automated disassembly device to disassemble the components of the configurable transport container; an eighth software module configured to provide instruction to a transport means for the return of a disassembled configurable container and/or the components thereof to an inventory location; and a means to move a reconfigurable container or the components thereof to an inventory location. In some embodiments, the system comprises a container configuration station for configuring a configurable container comprising: an automated assembly device to optimally configure the configurable container according to specific ordering information of an incoming order; a configurable container capable of comprising: multiple containment areas of optimally size based on the number, size and volume of items to be held therein; and at least one containment surface comprising addressable releasable openings matching the configuration of the multiple containment areas. In some embodiments, the system further comprises a container disassembly station, wherein the components of a reconfigurable container are disassembled when a configured container has fulfilled a task for which it was originally configured. In some embodiments, the disassembled components of a reconfigurable container are returned to an available inventory for a future reconfiguration. In some embodiments, each containment area holds one item. In some embodiments, the configurable container further comprises a containment surface. In some embodiments, each configured container is assigned a unique identification for each configuration of the container. In some embodiments, the system comprises a used reconfigurable transport container; a transport configuration station for reconfiguring a used reconfigurable transport container comprising: a disassembly device for removing existing optimized containment areas of the configurable transport container as directed by instructions provided by a seventh software module; an automated assembly device to optimally reconfigure the used reconfigurable container according to specific ordering information of one or more incoming orders and the configuration determined by the fifth software module; and a means for creating new optimized containment areas based on the number, size and volume of items to be held therein as determined by the sixth software module. In some embodiments, the disassembled components of a reconfigurable container are returned to an available inventory for a future reconfiguration. In some embodiments, each containment area holds one item. In some embodiments, each reconfigured container further comprises at least one addressable releasable opening matching the configuration of each containment area; the configurable container further comprises a containment surface. In some embodiments, each configured container is assigned a unique identification for each reconfiguration of the container. In some embodiments, the containment surface comprises: a top surface; an intermediate surface; and a bottom surface. In some embodiments, the releasable openings of the containment surface are releasably lockable. In some embodiments, the releasable openings of the containment surface are activated by a release station.

Provided herein is a method of recycling used reconfigurable containers comprising: receiving one or more incoming order from an ordering system; providing a used reconfigurable container; providing a container reconfiguration station; delivering the used transport container to the transport configuration station; providing a means for evaluating the configuration of containment areas within the used reconfigurable container relative to the requirements of the new incoming orders; providing a means for determining the optimal configuration of the containment areas required in the reconfigurable container based on number size and volume of items needed to satisfy the new incoming orders; removing existing containment areas and forming new containment areas to optimally reconfigure the used configurable transport container to satisfy the new incoming order; providing releasable openings configured to have movable sections matching the size of each new containment area; and delivering the reconfigured transport to a picking station for processing of the new incoming order. In some embodiments, the ordering system comprises: providing a computer-implemented system comprising: a digital processing device comprising an operating system configured to perform executable instructions and a memory; and providing a computer program including instructions executable by the digital processing device to process one or more incoming orders and in real time determine the requirements for filling the incoming order comprising: a fifth software module configured to determine an optimized containment area configuration for a used reconfigurable transport container based on the incoming order; a sixth software module configured to manipulate an automated assembly device to remove existing containment areas and form new containment areas in a reconfigurable transport container as needed, according to the configuration requirements provided by the fifth software module; a seventh software module configured to determine an optimal pick-order from an inventory and optimal routing to fill the new incoming order; an eighth software module configured to determine an optimal routing release sequence for the reassembled reconfigurable container containing the picked items for delivery of the picked order; and providing a means to move the reassembled reconfigurable container to a next step in the optimal routing of an automated process as determined by the seventh and eighth software modules. In some embodiments, the used reconfigurable transport container has been previously configured with a partitioning arrangement adapted to satisfy another order. In some embodiments, the means for evaluating the used container to satisfy the new incoming order comprises: a human; a template; an optical system; and a combination thereof. In some embodiments, the non-limiting means for moving the reassembled reconfigurable transport comprises: a human; a cart; a robot; a conveyor; an automated transport device; and a combination thereof.

Provided herein is a configurable container adapted for automated picking systems comprising: assemblable sub-units configured to hold an item, wherein the sub-units can be configurable to be assembled to each other to form a nested container, wherein the assembled sub-units are optimally configured and positioned based on number, size and volume to create multiple containment areas within the container and configured to receive and retain an optimized number of items for an order or orders; and each container a containment surface comprising releasable openings configured to have movable sections matching the size of each assembled sub-unit; wherein the items held within each assembled sub-unit can be selectively picked during automated order picking operations, allowing only the item contained therein to be released when the releasable opening of a specific assembled sub-unit is released. In some embodiments, the releasable openings of the containment surface are lockable. In some embodiments, the assemblable sub-units are configured to optimal receive and constrain an item based on number, size and volume. In some embodiments, the assemblable sub-units are configured to be uniform in one dimension. In some embodiments, the assemblable sub-units are configured to have a common assembly feature. In some embodiments, the assemblable sub-units are adapted for use by an order processing system. In some embodiments, each containment area holds one item. In some embodiments, each nested container is assigned a unique identification for each configuration of the container.

Provided herein is a method of using a configurable transport container adapted for automated picking systems comprising: providing two or more assemblable sub-units, each optimally configured to hold an item based on number, size and volume for an order or orders; positioning the assemblable sub-units based on item number, size and volume to form multiple containment areas in an optimal configuration; assembling the sub-units to each other to create nested container comprising containment areas configured to receive and retain an optimized number of items, and providing a containment surface comprising lockable and releasable openings configured to have movable sections matching the size of each assembled sub-unit, wherein the items held within each assembled sub-unit can be selectively picked during automated order picking operations; providing a means for unlocking the releasable opening, allowing only the item contained therein to be released when the releasable opening of a specific assembled sub-unit is released; depositing the item into an awaiting pick container or chute. In some embodiments of the method, the assemblable sub-units are adapted for use with an order processing system.

Provided herein is a configurable container adapted for automated picking systems comprising: assemblable sub-units configured to hold an item, wherein the sub-units can be configurable to be assembled to each other to form a nested container, wherein the assembled sub-units are optimally configured and positioned based on number, size and volume to create multiple containment areas within the container and configured to receive and retain an optimized number of items for an order or orders; wherein the items held within each assembled sub-unit can be selectively picked during automated order picking operations, wherein the automated picking station provides preconfigured releasable lid configurations for allowing only the item contained therein to be released when the releasable lid of a specific assembled sub-unit is released.

Provided herein is a configurable container adapted for automated picking systems with an ordering system comprising: a configurable container; assemblable sub-units, smaller than the configurable container and configured to hold one item, wherein the sub-units are configurable to be assembled to each other to create optimal containment areas within the transport container to satisfy orders provided by the ordering system, wherein the assemblable sub-units are optimally configured and positioned based on the number, size and volume of the items in the order to create optimized containment areas within the transport container to receive and retain optimized numbers of items to satisfy the order; and each transport container comprises a containment surface comprising releasably lockable openings configured to have movable sections matching the size of each assembled sub-unit; wherein the items held within each assembled sub-unit can be selectively picked during automated order picking operations, allowing only the item contained therein to be released when the releasably lockable opening of a specific assembled sub-unit is released. In some embodiments, the sub-units are configured to divide the volume of the of the configurable transport container into two sections along a first plane. In some embodiments, the two sections are not equal in size or volume. In some embodiments, the sub-units are configured to divide the two sections into one or more additional sections along at least a second intersecting plane. In some embodiments, the at least second intersecting plane comprises: a horizontal plane; a transverse plane; an oblique plane; and a diagonal plane. In some embodiments, the sub-units are configured to divide the volume of the of the configurable transport container only along a first plane. In some embodiments, the at least second intersecting plane comprises: a horizontal plane; a transverse plane; an oblique plane; and a diagonal plane.

Provided herein is a method of making a configurable container adapted for automated picking systems with an ordering system comprising: providing a configurable container; providing assemblable sub-units, smaller than the configurable container and configured to hold one item, positioning and assembling the assemblable sub-units based on the number, size and volume of the items in the order to create optimized containment areas to satisfy the order; and providing a containment surface for the transport container comprising releasably lockable openings configured to have movable sections matching the size of each assembled sub-unit.

SUMMARY OF THE INVENTION

An aspect of the present disclosure provides a system for the automated configuration, transport, storage, management and delivery of one or more items. The system comprises a container configuration station; an automated assembly device adapted to optimally configure a reconfigurable container at the container configuration station based on the number, size and volume of the one or more items according to a first set of ordering information thereby generating an optimally configured reconfigurable container, wherein the optimally configured reconfigurable container comprises one or more optimized containment areas; and an assembled container transporter configured to transport the optimally configured reconfigurable container to a next step in an automated process. In some embodiments, the reconfigurable container comprises configurable, positionable or assemblable partitioning units or combinations thereof. In some embodiments, the one or more optimized containment areas comprise configurable, positionable or assemblable partitioning units or combinations thereof. In some embodiments, the reconfigurable container consists of configurable, positionable or assemblable partitioning units or combinations thereof. In some embodiments, one or more optimized containment areas are configured for optimal storage and management of the one or more items. In some embodiments, the one or more optimized containment areas are configured for optimal transport and management of the one or more items picked from a storage inventory to fulfill an order. In some embodiments, the system further comprises a partition removal station, wherein partitioning units are removed when the reconfigurable container fulfills an order, thereby restoring the reconfigurable container to an un-configured state. In some embodiments, the system further comprises a partition removal station, wherein partitioning units are removed when the reconfigurable container fulfills an order, thereby restoring the reconfigurable container to an un-configured state, wherein the reconfigurable container or partitioning units return to a storage inventory for a future reconfiguration. In some embodiments, each of the one or more optimized containment areas holds at least a first item. In some embodiments, the reconfigurable container is assigned a unique identification for each of one or more assembled configurations of the reconfigurable container. In some embodiments, the system further comprises an ordering system. In some embodiments, the system further comprises a release surface addressable to each of one or more optimized containment areas.

Another aspect of the present disclosure provides a method of using a system for the automated configuration, transport, storage, management and delivery of one or more items. The method comprises providing a container configuration station for configuring containers; providing an automated assembly device; wherein the automated assembly device optimally configures a reconfigurable container at the container configuration station based on the number, size or volume of the one or more items according to a first set of ordering information, thereby generating an optimally configured reconfigurable container comprising one or more optimized containment areas; and providing a means for transporting the optimally configured reconfigurable container to a next step in an automated process. In some embodiments, the method further comprises providing configurable, positionable or assemblable partitioning units or combinations thereof. In some embodiments, the reconfigurable container comprises configurable, positionable or assemblable partitioning units or combinations thereof. In some embodiments, the reconfigurable container consists of configurable, positionable or assemblable partitioning units or combinations thereof. In some embodiments, the one or more optimized containment areas are configured in the reconfigurable container for optimal storage and management of the one or more items. In some embodiments, the one or more optimized containment areas are configured for optimal transport and management of the one or more items picked from a storage inventory to fulfill an order. In some embodiments, the method further comprises providing a partition removal station, wherein one or more partitioning units are removed when the reconfigurable container fulfills an order. In some embodiments, the reconfigurable container or one or more partitioning units return to a storage inventory for a future reconfiguration. In some embodiments, each of the one or more optimized containment areas holds at least a first item. In some embodiments, the reconfigurable container is assigned a unique identification for each of one or more assembled configurations of the reconfigurable container. In some embodiments, the method further comprises providing an ordering system. In some embodiments, the method further comprises providing a release surface addressable to each of the one or more optimized containment areas.

Another aspect of the present disclosure provides a system for the automated configuration, transport, storage, management and delivery of one or more items. The system comprises an ordering system; a container configuration station for configuring a reconfigurable container comprising; an automated assembly device to optimally configure the reconfigurable container according to a first set of ordering information provided by the ordering system; the reconfigurable container; and configurable partitioning units; wherein the configurable partitioning units are positioned within the reconfigurable container by the automated assembly device to create one or more optimized containment areas based on the number, size and volume of the one or more items placed in the one or more optimized containment areas according to the first set of ordering information, for the optimal transport, storage and management of said one or more items thereby generating an assembled reconfigurable container; and a means to move the assembled reconfigurable container to a next step in an automated process. In some embodiments, the system further comprises a partition removal station, wherein the configurable partitioning units are removed when the reconfigurable container fulfills a task. In some embodiments, the reconfigurable container or configurable partitioning units return to a storage inventory for a future reconfiguration. In some embodiments, each of the one or more optimized containment areas holds at least a first item. In some embodiments, the reconfigurable container is assigned a unique identification for each configuration of the reconfigurable container. In some embodiments, the reconfigurable container further comprises a release surface addressable to each of the one or more optimized containment areas.

Another aspect of the present disclosure provides a method of using a system for the automated transport, storage, management and delivery of one or more items. The method comprises providing an ordering system; providing a container configuration station comprising an automated assembly device for optimally configuring a reconfigurable container according to a first set of ordering information provided by the ordering system; positioning the reconfigurable container in the container configuration station; providing configurable partitioning units; and causing the configurable partitioning units optimally positioned within the reconfigurable container by the automated assembly device thereby generating an assembled reconfigurable container, wherein the configurable partitioning units are positioned to create optimized containment areas based on the number, size, and volume of the one or more items placed in the optimized containment areas according to the first set of ordering information, for optimal transport, storage and management of said one or more items; and providing a means to move the assembled reconfigurable container to a next step in an automated process. In some embodiments, the method further comprises providing a partition removal station, wherein the one or more partitioning units are removed from the reconfigurable container when the reconfigurable container fulfills a task. In some embodiments, the reconfigurable container and or configurable partitioning units return to a storage inventory for a future reconfiguration. In some embodiments, the reconfigurable container is assembled for an inventory storage application. In some embodiments, the reconfigurable container is assembled for an order. In some embodiments, each of the optimized containment areas holds at least a first item. In some embodiments, the reconfigurable container is assigned a unique identification for each configuration of the reconfigurable container. In some embodiments, the method further comprises providing a release surface addressable to each of the optimized containment areas.

Another aspect of the present disclosure provides a system for configuring a reconfigurable container. The system comprises a container configuration station comprising an automated assembly device; and configurable partitioning units; wherein the configurable partitioning units are positioned or assembled by the automated assembly device to form the reconfigurable container comprising optimized containment areas based on the number, sizes and volumes of one or more items for which the reconfigurable container is configured. In some embodiments, the system further comprises a partition removal station, wherein the configurable partitioning units disassemble when a reconfigurable container fulfills a task. In some embodiments, the configurable partitioning units return to a storage inventory for a future reconfiguration. In some embodiments, each of the optimized containment areas holds at least a first item. In some embodiments, each of the optimized containment areas further comprises an addressable release surface. In some embodiments, the reconfigurable container is assigned a unique identification for each configuration of the reconfigurable container. In some embodiments, the reconfigurable container further comprises a release surface addressable to each of the optimized containment areas.

Another aspect of the present disclosure provides a method of using a system for configuring a reconfigurable container. The method comprises providing a container configuration station comprising an automated assembly device; and providing configurable partitioning units to the container configuration station; wherein the configurable partitioning units are positioned and assembled by the automated assembly device to form the reconfigurable container comprising optimized containment areas based on the number, size and volume of one or more items for which the reconfigurable container is configured. In some embodiments, the method further comprises providing a partition removal station, wherein the configurable partitioning units disassemble when the reconfigurable container fulfills a task. In some embodiments, the configurable partitioning units return to a storage inventory for reconfiguration. In some embodiments, the reconfigurable container is assembled for an inventory storage application. In some embodiments, the reconfigurable container is assembled for an order. In some embodiments, each of the optimized containment areas holds at least a first item. In some embodiments, each of the optimized containment areas further comprises an addressable release surface. In some embodiments, the reconfigurable container further comprises an addressable release surface. In some embodiments, the reconfigurable container is assigned a unique identification for each configuration of the reconfigurable container.

Another aspect of the present disclosure provides for a system for the automated configuration of a reconfigurable container and selection of one or more items to fulfill an order. The system comprises an ordering system; a computer-implemented system comprising a digital processing device comprising an operating system configured to perform executable instructions and a memory; a computer program including instructions executable by the digital processing device to process an order and determine requirements for fulfilling the order comprising a first software module configured to determine an optimized containment area configuration for the reconfigurable container based on the number, size and volume of the one or more items in the order; a second software module configured to manipulate an automated assembly device to assemble the components of the reconfigurable container; a third software module configured to determine an optimal pick-order from a storage inventory and an optimal routing to fulfill the order; a fourth software module configured to determine an optimal routing release sequence for the reconfigurable container containing the one or more items picked for delivery of the order; and a means to move the reconfigurable container to a next step of the optimal routing release sequence of an automated process. In some embodiments, the system further comprises a container configuration station for configuring the reconfigurable container comprising an automated assembly device to optimally configure the reconfigurable container according to a first set of ordering information of the order, wherein configuration is determined by the first software module; the reconfigurable container comprising one or more addressable release surfaces; and configurable partitioning units, wherein the configurable partitioning units are positioned within the reconfigurable container by the automated assembly device to create optimized containment areas based on instruction provided by the second software module, and wherein each of the optimized containment areas is accessible by at least one of the one or more addressable release surfaces. In some embodiments, the system further comprises a release station for releasing the one or more items picked from the reconfigurable container comprising an automated release device, wherein the reconfigurable container is delivered to the release station and the automated release device causes the release of at least one of the one or more addressable release surfaces, wherein a first item held in one of the optimized containment areas drops into a pick container or chute after release of the addressable release surfaces. In some embodiments, the third software module determines an optimal pick-order from the storage inventory and the optimal routing to fulfill the order and provides executable instructions to the means for moving the assembled container. In some embodiments, the fourth software module provides executable instructions to the means for moving the reconfigurable container. In some embodiments, the reconfigurable container releases the one or more items picked in each of the optimized containment areas when the one or more addressable release surfaces activates by the release station according to the optimal routing release sequence. In some embodiments, the one or more addressable release surfaces of the reconfigurable container further comprise a top surface; an intermediate surface; and a bottom surface. In some embodiments, each of the optimized containment areas holds at least a first item. In some embodiments, the reconfigurable container is assigned a unique identification for each configuration of the reconfigurable container. In some embodiments, the reconfigurable container further comprises a containment surface.

Another aspect of the present disclosure provides a system for the automated release of one or more items from a reconfigurable container. The system comprises the reconfigurable container comprising multiple containment areas of optimal size based on the number, size and volume of the one or more items therein; at least one containment surface comprising addressable releasable openings matching the configuration of the multiple containment areas; and a release station comprising an automated device configured to release one or more of the addressable releasable openings of the at least one containment surface, wherein the one or more items held in the multiple containment areas drop into a pick container or chute.

Another aspect of the present disclosure provides a method of using a system for the automated release of one or more items from a reconfigurable container. The method comprises providing the reconfigurable container comprising multiple containment areas of optimal size based on the number, size and volume of the one or more items therein; providing at least one containment surface on the reconfigurable container comprising addressable releasable openings matching the configuration of the multiple containment areas; providing a release station comprising an automated device configured to release one or more of the addressable releasable openings of the at least one containment surface; and activating at least one addressable releasable opening causing the at least one addressable releasable opening to release at least one of the one or more items held therein, wherein, the at least one of the one or more items drops into a pick container or chute.

Another aspect of the present disclosure provides a method of automating the storage and picking of storage inventory. The method comprises providing a reconfigurable container comprising multiple containment areas for optimal individual object storage based on item number, size and volume; providing at least one containment surface on the reconfigurable container comprising releasable openings to match configuration of the multiple containment areas; providing a storage inventory system for recording the contents of each of the multiple containment areas within the reconfigurable container and inventory storage locations thereof; providing an order filling system configured to pick one or more items from one or more recorded locations of the inventory storage locations; directing an automated picking system to release at least one of the releasable openings of the at least one containment surface of the reconfigurable container to allow picking of the one or more items contained therein; and depositing the one or more items into an awaiting pick container or chute.

Another aspect of the present disclosure provides a system for the configuration of one or more reconfigurable containers. The system comprises an ordering system; a computer-implemented system comprising a digital processing device comprising an operating system configured to perform executable instructions and a memory; a computer program including instructions executable by the digital processing device to process an order and determine configuration requirements for fulfilling the order from the ordering system comprising a fifth software module configured to determine an optimized number of the one or more reconfigurable containers and the containment areas thereof, based on the number, size and volume of the one or more items in the order; a sixth software module configured to manipulate an automated assembly device to assemble components of each of the one or more reconfigurable containers, according to the configuration requirements provided by the fifth software module, which generates one or more assembled reconfigurable containers; a seventh software module configured to identify a used assembled reconfigurable container when the used assembled configured container fulfills a task, and provide instruction to an automated disassembly device to disassemble the components of the used assembled reconfigurable transport container which thereby generates a disassembled reconfigurable container and components thereof; an eighth software module configured to provide instruction to a transport means for the return of the disassembled reconfigurable container and/or the components thereof to an inventory storage location; and a means to move the disassembled reconfigurable container or the components thereof to an inventory storage location. In some embodiments, the system further comprises a container configuration station for configuring the reconfigurable container comprising an automated assembly device to optimally configure the reconfigurable container according to a first set of ordering information of the order; and the reconfigurable container capable of comprising multiple containment areas of optimally size based on the number, size and volume of the one or more items held therein, and at least one containment surface comprising addressable releasable openings matching the configuration of the multiple containment areas. In some embodiments, the system further comprises a container disassembly station, wherein the components of the used assembled container are disassembled when the assembled configured container fulfills a task. In some embodiments, the components return to a storage inventory for a future reconfiguration. In some embodiments, each containment area holds at least a first item. In some embodiments, the reconfigurable container further comprises a containment surface. In some embodiments, each of the one or more reconfigurable containers is assigned a unique identification for each configuration of the one or more reconfigurable containers. In some embodiments, the system further comprises a used reconfigurable transport container; a transport configuration station for reconfiguring the used reconfigurable transport container comprising a disassembly device for removing existing optimized containment areas of the used reconfigurable transport container as directed by instructions provided by a seventh software module; an automated assembly device to optimally reconfigure the used reconfigurable container according to a first set of ordering information of the order and the configuration determined by the fifth software module; and a means for creating new optimized containment areas based on the number, size and volume of the one or more items held therein as determined by the sixth software module. In some embodiments, the components return to a storage inventory for a future use. In some embodiments, each containment area holds at least a first item. In some embodiments, each reconfigured container further comprises at least one addressable releasable opening matching the configuration of each containment area. In some embodiments, the used reconfigurable container further comprises a containment surface. In some embodiments, each configured container is assigned a unique identification for each reconfiguration of the container. In some embodiments, the containment surface further comprises a top surface; an intermediate surface; and a bottom surface. In some embodiments, the releasable openings of the containment surface are releasably lockable. In some embodiments, the releasable openings of the containment surface are activated by a release station.

Another aspect of the present disclosure provides a method of recycling used reconfigurable containers. The method comprises receiving an order from an ordering system; providing a used reconfigurable container; providing a container reconfiguration station; delivering the used reconfigurable container to the container reconfiguration station; providing a means for evaluating configuration of a first set of containment areas within the used reconfigurable container relative to requirements of the order; providing a means for determining optimal configuration of the first set of containment areas in the used reconfigurable container based on number size and volume of one or more items needed to fulfill the order; removing the first set of containment areas and forming a second set of containment areas to optimally reconfigure the used reconfigurable container to fulfill the order; providing releasable openings configured to have movable sections matching the size of each of the second set of containment areas; and delivering the used reconfigurable container to a picking station for processing of the order. In some embodiments, the ordering system further comprises providing a computer-implemented system comprising a digital processing device comprising an operating system configured to perform executable instructions and a memory; and providing a computer program including instructions executable by the digital processing device to process the order and in real time determine the requirements for fulfilling the order comprising a fifth software module configured to determine an optimized containment area configuration for the used reconfigurable container based on the order; a sixth software module configured to manipulate an automated assembly device to remove the first set of containment areas and form the second set of containment areas in the used reconfigurable container, according to the optimized containment area configuration provided by the fifth software module; a seventh software module configured to determine an optimal pick-order from a storage inventory and an optimal routing to fulfill the optimal pick-order; an eighth software module configured to determine an optimal routing release sequence for the used reconfigurable container containing the one or more items picked for delivery of the optimal pick-order; and providing a means to move the used reconfigurable container to a next step in the optimal routing release sequence of an automated process as determined by the seventh and eighth software modules. In some embodiments, the used reconfigurable container was previously configured with a partitioning arrangement adapted to fulfill a first order. In some embodiments, the means for evaluating the used reconfigurable container to fulfill the order comprises a human; a template; an optical system or combinations thereof. In some embodiments, the means for moving the used reconfigurable container comprises a human; a cart; a robot; a conveyor; an automated transport device or combinations thereof.

Another aspect of the present disclosure provides a reconfigurable container adapted for automated picking systems. The reconfigurable container comprises sub-units configured to hold an item, wherein the sub-units assemble to each other to form a nested container, wherein the sub-units are optimally configured and positioned based on number, size, and volume to create multiple containment areas within the nested container and receive and retain an optimized number of one or more items for one or more orders, wherein the nested container comprises a containment surface comprising releasable openings configured to have movable sections matching the size of each of the sub-units, and wherein the one or more items held within each of the sub-units is picked during automated order picking operations, to release the one or more items contained therein when one or more of the releasable openings of a first sub-unit is released. In some embodiments, the releasable openings of the containment surface are lockable. In some embodiments, the sub-units optimally receive and constrain one or more items based on number, size and volume. In some embodiments, the sub-units are uniform in one dimension. In some embodiments, the sub-units have a common assembly feature. In some embodiments, the sub-units are adapted for use by an order processing system. In some embodiments, each of the multiple containment areas holds at least a first item. In some embodiments, the nested container is assigned a unique identification for each configuration of the nested container.

Another aspect of the present disclosure provides a method of using a reconfigurable transport container adapted for automated picking systems. The method comprises providing two or more sub-units, each of the two or more sub-units holds one or more items based on number, size, and volume for an order; positioning the two or more sub-units based on the one or more items number, size, and volume to form multiple containment areas in an optimal configuration; assembling the sub-units to each other to create nested container comprising the multiple containment areas configured to receive and retain an optimized number of one or more items, and providing a containment surface comprising lockable and releasable openings configured to have movable sections matching the size of each of the two or more sub-units, wherein the one or more items held within each of the two or more sub-units are picked during automated order picking operations; providing a means for unlocking the lockable and releasable openings to release the one or more items contained therein when one of the lockable and releasable openings of a first sub-unit is released; and depositing the one or more items into a pick container or chute. In some embodiments, the two or more sub-units are adapted for use with an order processing system.

Another aspect of the present disclosure provides a reconfigurable container adapted for automated picking systems with an ordering system. The reconfigurable container comprises the reconfigurable container; sub-units, smaller than the reconfigurable container and configured to hold at least a first item, wherein the sub-units assemble to each other create optimized containment areas within a transport container to fulfill an order provided by the ordering system, wherein the sub-units are optimally configured and positioned based on the number, size and volume of one or more items in an order to create the optimized containment areas within the transport container to receive and retain optimized numbers of the one or more items to fulfill the order; and wherein each transport container comprises a containment surface comprising releasably lockable openings configured to have movable sections matching the size of each of the sub-units; wherein the one or more items held within each of the sub-units is picked during automated order picking operations to release a first item contained therein when one of the releasably lockable openings of a first sub-unit is released. In some embodiments, the sub-units divide the volume of the transport container into two sections along a first plane. In some embodiments, the two sections are not equal in size or volume. In some embodiments, the sub-units divide the two sections into one or more additional sections along at least a second intersecting plane. In some embodiments, the at least second intersecting plane comprises a horizontal plane; a transverse plane; an oblique plane; or a diagonal plane.

Another aspect of the present disclosure provides a method of making a reconfigurable container adapted for automated picking systems with an ordering system. The method comprises providing the reconfigurable container; providing sub-units, smaller than the reconfigurable container and configured to hold at least a first item; positioning and assembling the sub-units based on the number, size and volume of the one or more items in an order to create optimized containment areas to fulfill the order; and providing a containment surface for a transport container comprising releasably lockable openings configured to have movable sections matching the size of each of the sub-units.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 13 is an illustration of various additional capture means for retaining the pins in the hole array; i.e.: meltable adhesive, electroadhesion, and magnetic.

FIG. 14 is an illustration of partitions that slide in from the side of the tray.

FIG. 16 is a variation of FIG. 15 illustrating foldable hinges driven or locked into position with pneumatics, hydraulics and springs, and stiff hinges requiring an actuator to reposition the hinged partition.

FIG. 17 is an illustration of hinged partitions that utilize electroadhesion and magnetics for activation and securing them into position.

FIG. 19 is an illustration of partitions that are incorporated into the walls of a tote and are extended to create individual containment areas.

FIG. 23 is an illustration of spooled dividers or partitions mounted or attachable to the side walls of a tote, and extendable to form configurable containment areas.

FIG. 26 is an illustration of inflatable walls.

FIG. 34 is an illustration of various types of "trap door" lids that could be utilized for these totes, including push-button activated hinges which may include pneumatically, hydraulically, electrically, EA or mechanically controlled push buttons or activators.

FIG. 38 is an illustration of various lockable latches on a variety of lid doors. These may include re-meltable glues, wax or solder that hardens to lock a latch. The use of EA interaction or even mechanical latches with a push button may also be applied.

FIG. 42 is an illustration of totes where the partitions are removed in the release station, allowing the items therein to slide or fall out. Totes are delivered to the release station on an incline, the retaining partition is removed, retracted, folded down, etc., and the items slide out and into a delivery bin or smart chute.

FIG. 44 is an illustration of a reconfigured tote having no lid; the reconfigurable totes are passed over a smart dispenser with individual release doors. The smart dispenser is configured to match the incoming reconfigurable tote. The floor of the incoming tote is removed and all the products fall into their individual compartments in the smart dispenser. The smart dispenser or smart chute then individually sorts releases product to the shipping box.

FIG. 45 is an illustration of a reconfigured tote having no lid: A plate is used to cover the tote. The tote is then inverted and a film with cutouts is indexed under the appropriate partition. The plate is removed and the product is released. The plate is reinserted and the film re-indexed until the tote is empty.

DETAILED DESCRIPTION OF THE INVENTION

Figure 1:
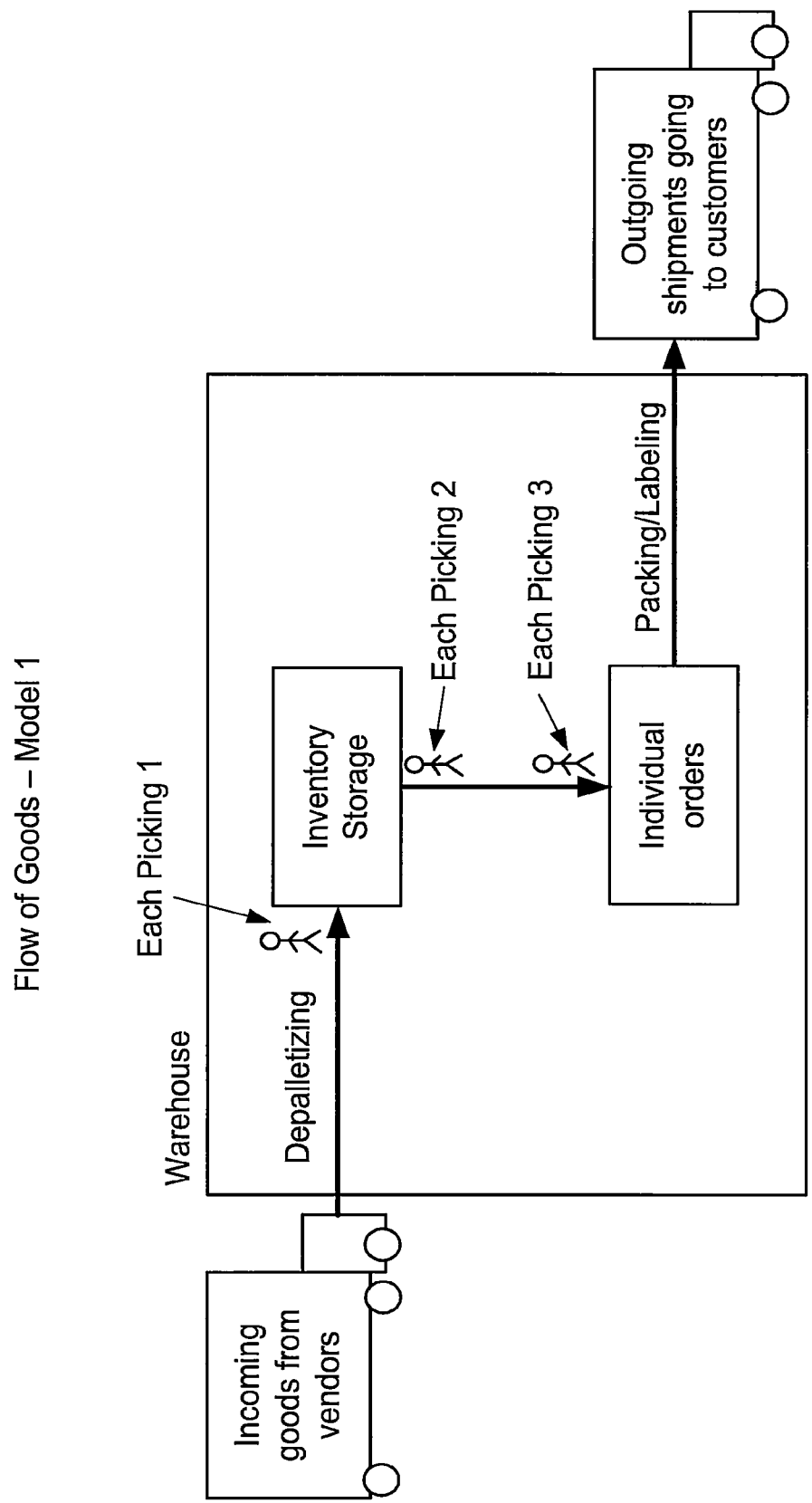
FIG. 1 is an illustrative flow diagram of a typical flow of goods in an "Each Picking" warehouse material handling operation.

Picking Systems are that they typically involve a high degree manual labor, high cost and relatively low throughput. In general, there are currently two categories of warehousing Pick Systems: 1. All manual warehouse picking systems involving the use of human operators for depalletizing incoming goods arriving from vendors/suppliers to a warehouse, where items must be removed from bulk pallets, broken down into smaller lots sizes and/or containers, cataloged and moved to cataloged warehouse inventory storage locations. Items are then "picked" in a second operation, again by humans, from those inventory locations to fulfill bulk and individual orders and finally, staged for separation, packaging, labeling and shipping; and 2. A partially automated warehouse where cases, shelves or items are brought to a human operator by one or more robots, an Automated Storage and Retrieval Systems (AS/RS), and/or conveyors. Even in this model, the items are typically then handled by manual operators for the "each pick" steps. The automation of this "each pick" operation in a space efficient fashion, without the complexity of robotic grasping and release, is a focus of the disclosure and embodiments provided herein.

As used herein, the term "tote" shall generally refer to a container. The container may be an open container or closed container, typically comprising a top or bottom. The container may be a single unit or may be a composite structure comprised of multiple units that have been assembled to create a larger container, wherein the individual units comprising the larger container may be of different sizes, shapes and volumes. A tote may comprise partitions which form dividers within the tote to create containment units within the tote. A tote may be a composite of multiple containers or containment units assembled together. The container may further comprise a lid or more than one lid.

As used herein, the term "partition" or "partitioning unit" generally refers to a configurable or reconfigurable dividing unit. A partition may be a containment unit. The dividing unit may a single wall, a pre-shaped series of walls, an interconnecting unit designed to be interconnected with another interconnecting unit, a flexible wall, a snake-able wall capable of following a track or being randomly positioned, a flexible wall mounted to a spool and capable of being extended to create a barrier by connecting to another wall or spool, a telescoping and/or sliding wall, an extendable accordion section, an inflatable wall, a series of two or more walls joined by a hinge, or a configurable pin wall wherein pins may be positioned in a perforated base, in any arrangement to create divided sections or spacers.

FIGS. 10-14 illustrate multiple variations of walls, dividers and pins, used alone or in combination to achieve this purpose.

FIGS. 15-19 illustrate multiple variations of hinged walls, dividers and lids that can be adapted and used alone or in combination to achieve these purposes.

Figure 20:
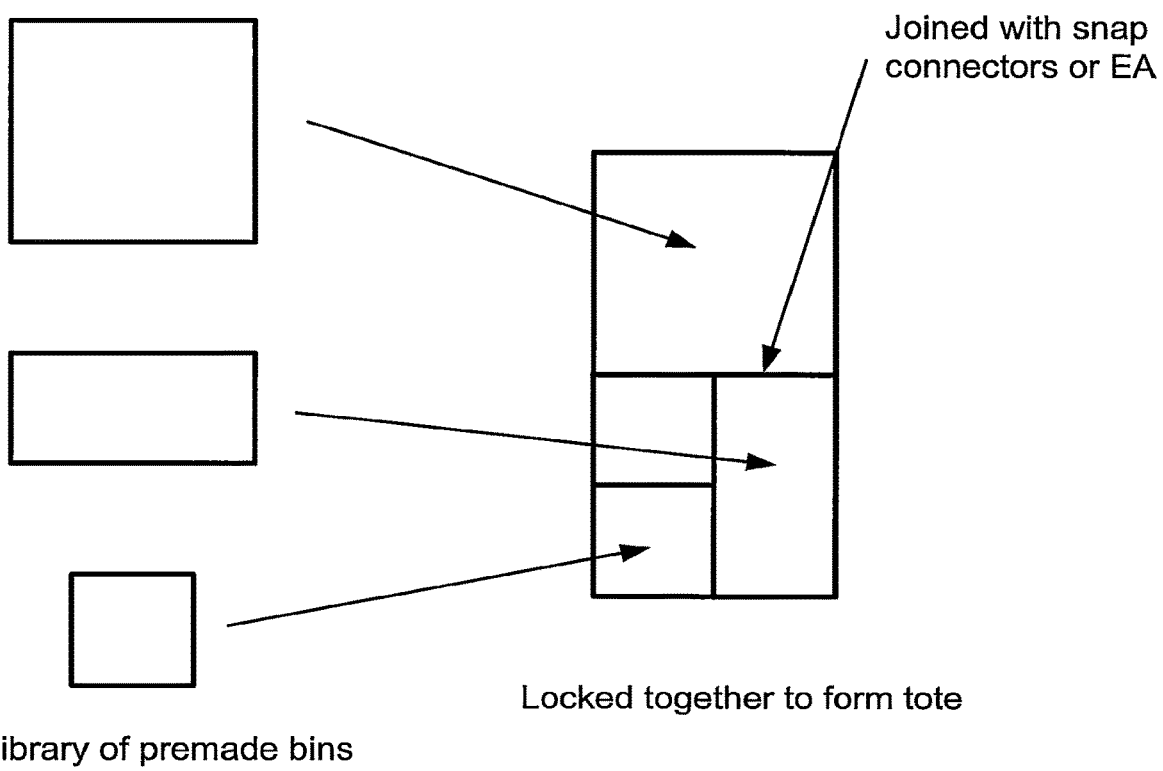
FIG. 20 is an illustration of pre-made bins or containment areas that are configurable, assemblable and attachable to each other to create a larger, customized tote.
Figure 21:
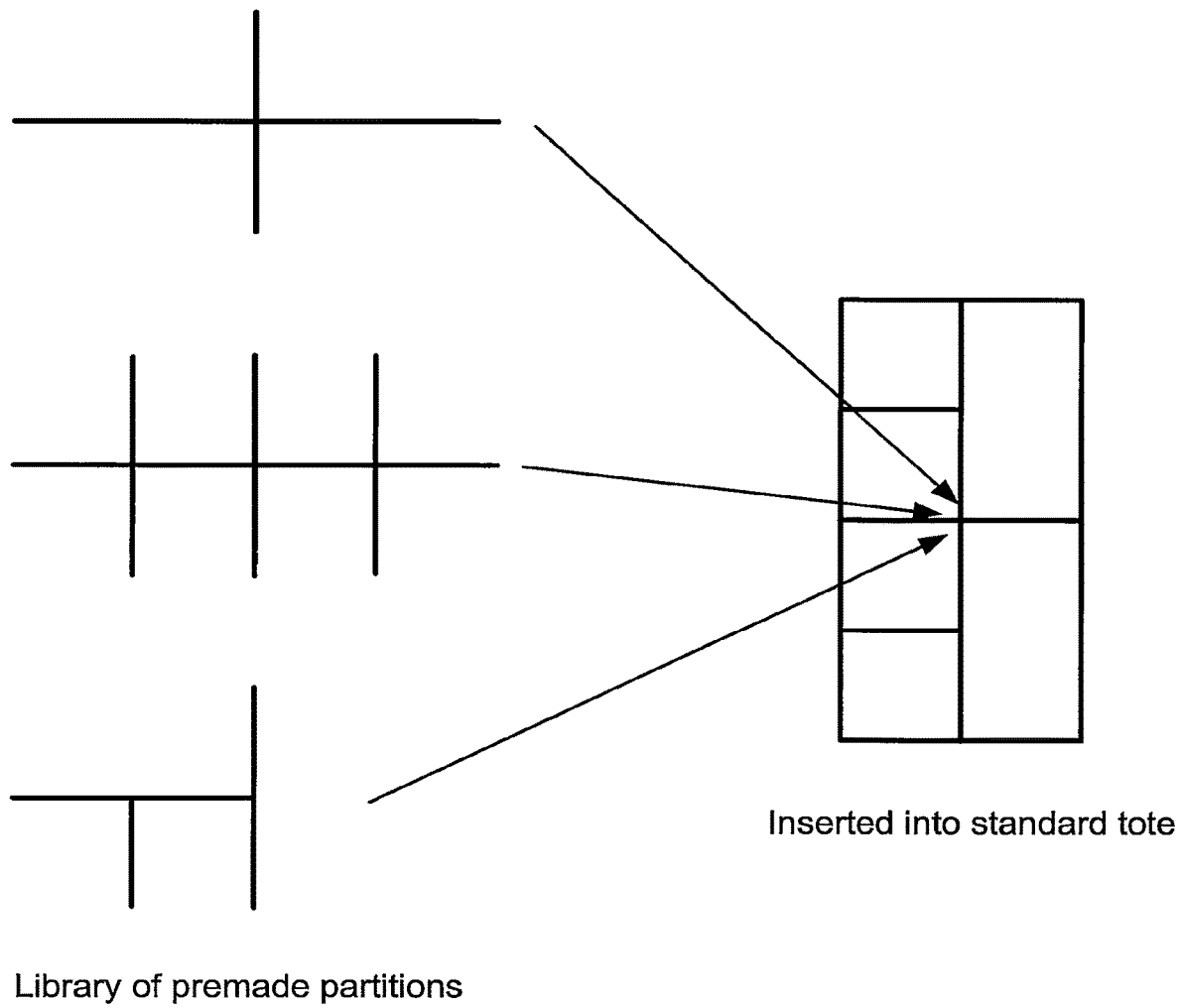
FIG. 21 is an illustration of pre-made divider or partition assemblies that can be inserted into the tote to form "standard" configurations and variations thereof.
Figure 22:
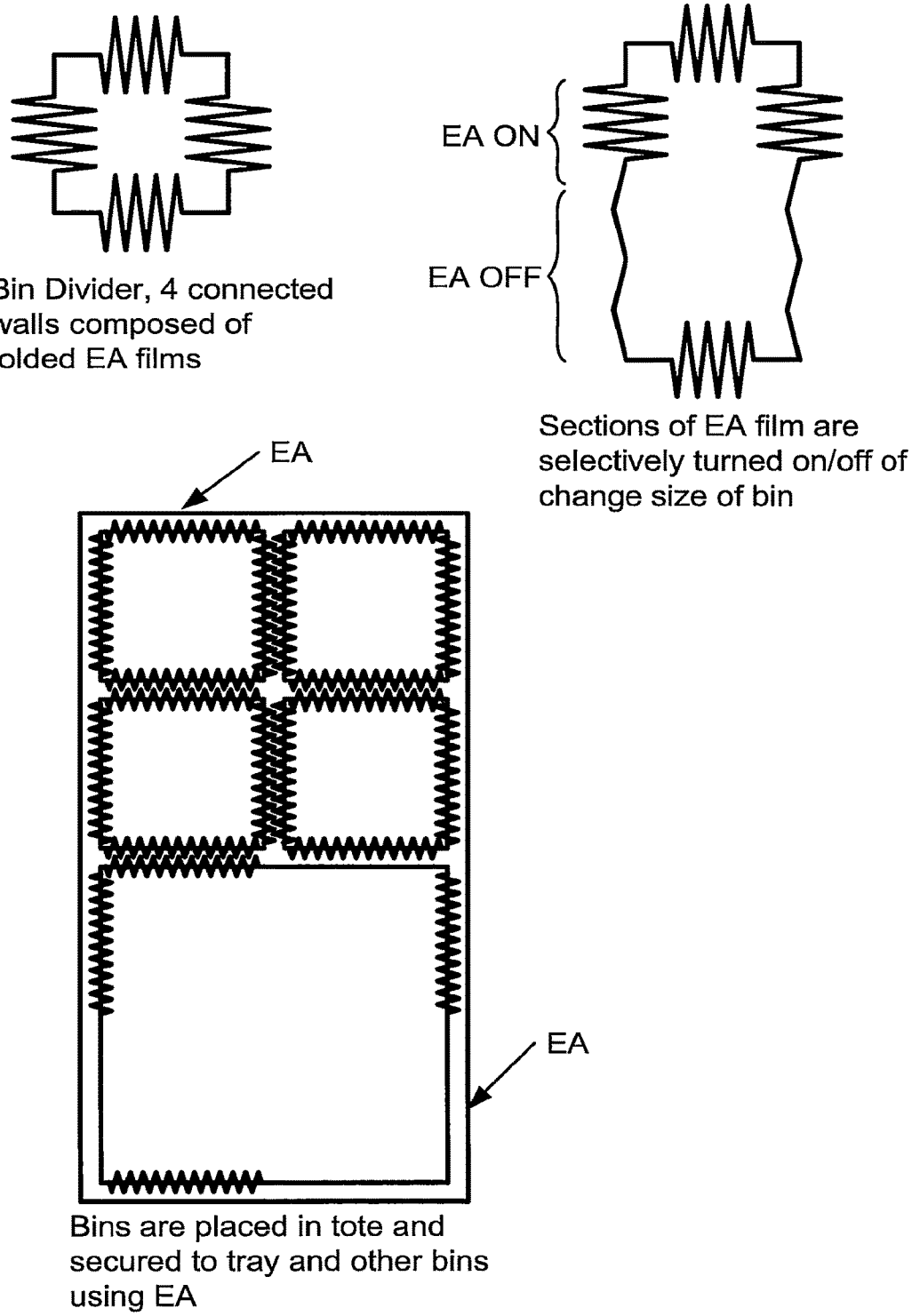
FIG. 22 is an illustration of another variation of an extendable partition, in the form of an accordion. The accordion wall can be stand-alone and drop into the tote or be extendable from the wall.
Figure 24:
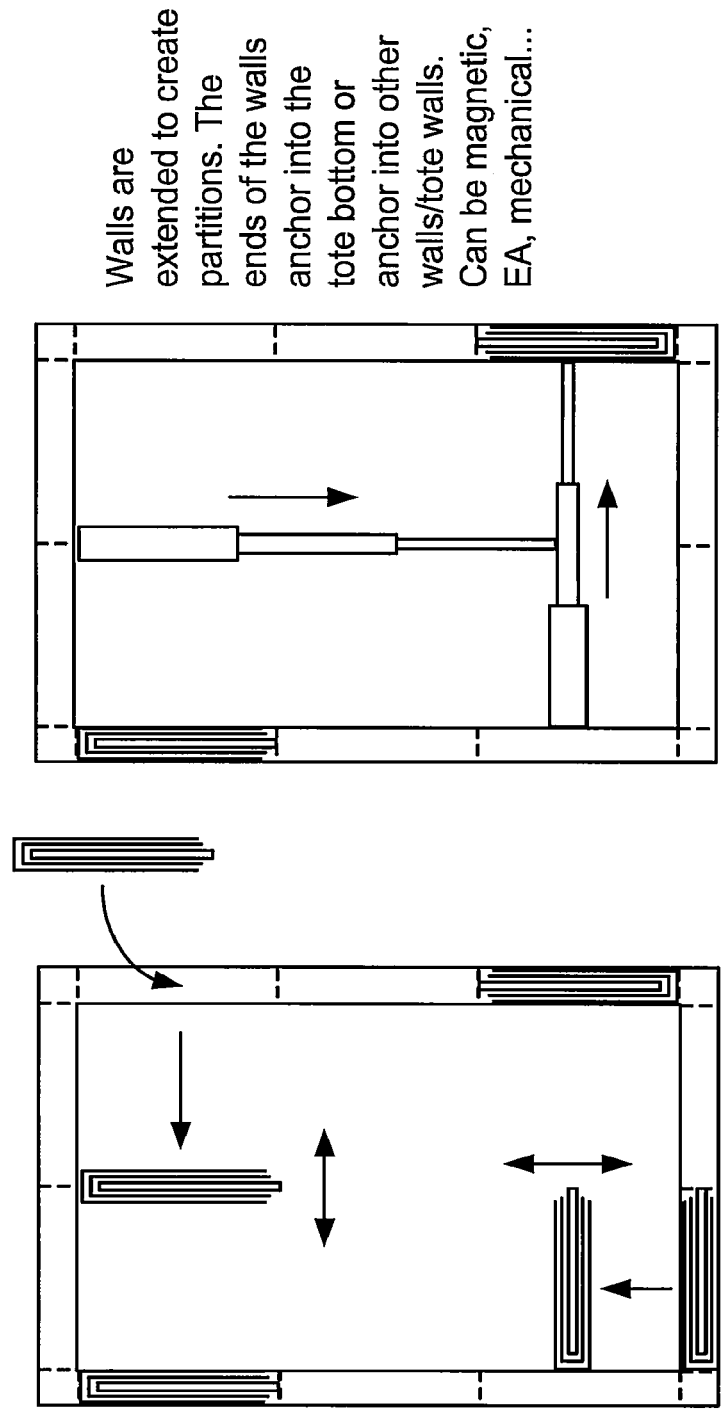
FIG. 24 is an illustration of nested telescoping dividers or partitions. They can be stand-alone and drop into the tote or be extendable from the wall. They may also be hinged to the wall.
Figure 25:
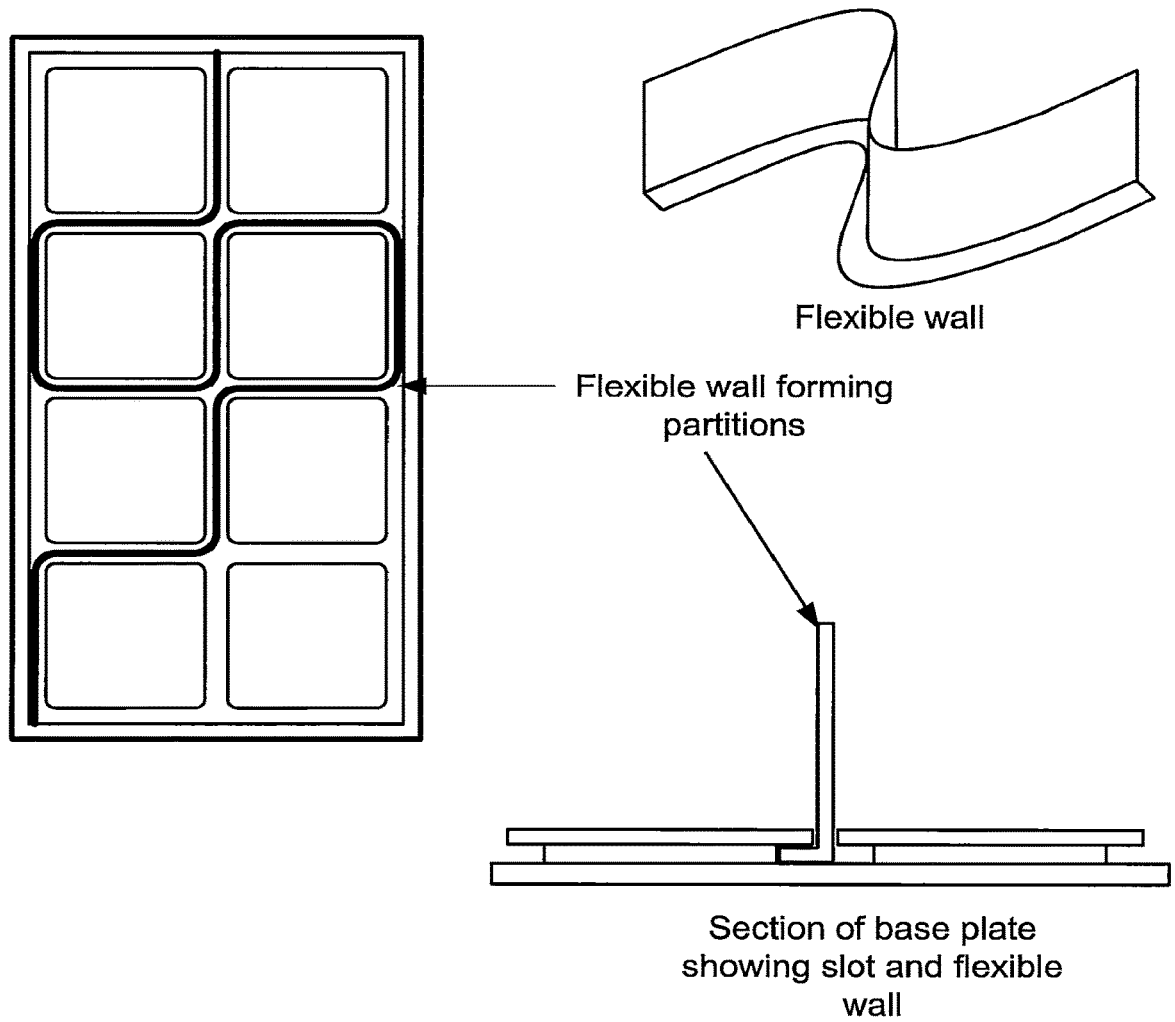
FIG. 25 is an illustration of a flexible barrier configured to be snakable or snake-like, following a nested track array that allows for variable containment are patterns.

FIGS. 20 and 21 are two more non-limiting illustrations of means for achieving partitions, utilizing pre-made components to either construct an entire tote with integral partitions, or to subdivide an existing tote.

FIGS. 22-25 illustrate several additional non-limiting examples of means for achieving "extendable" partitions, utilizing accordion dividers, spooled dividers, telescoping dividers, and snake-like dividers.

FIG. 26 is an illustration of the use of inflatable partitions. Inflatable partitions can include inflatable walls or pins.

Figure 27:
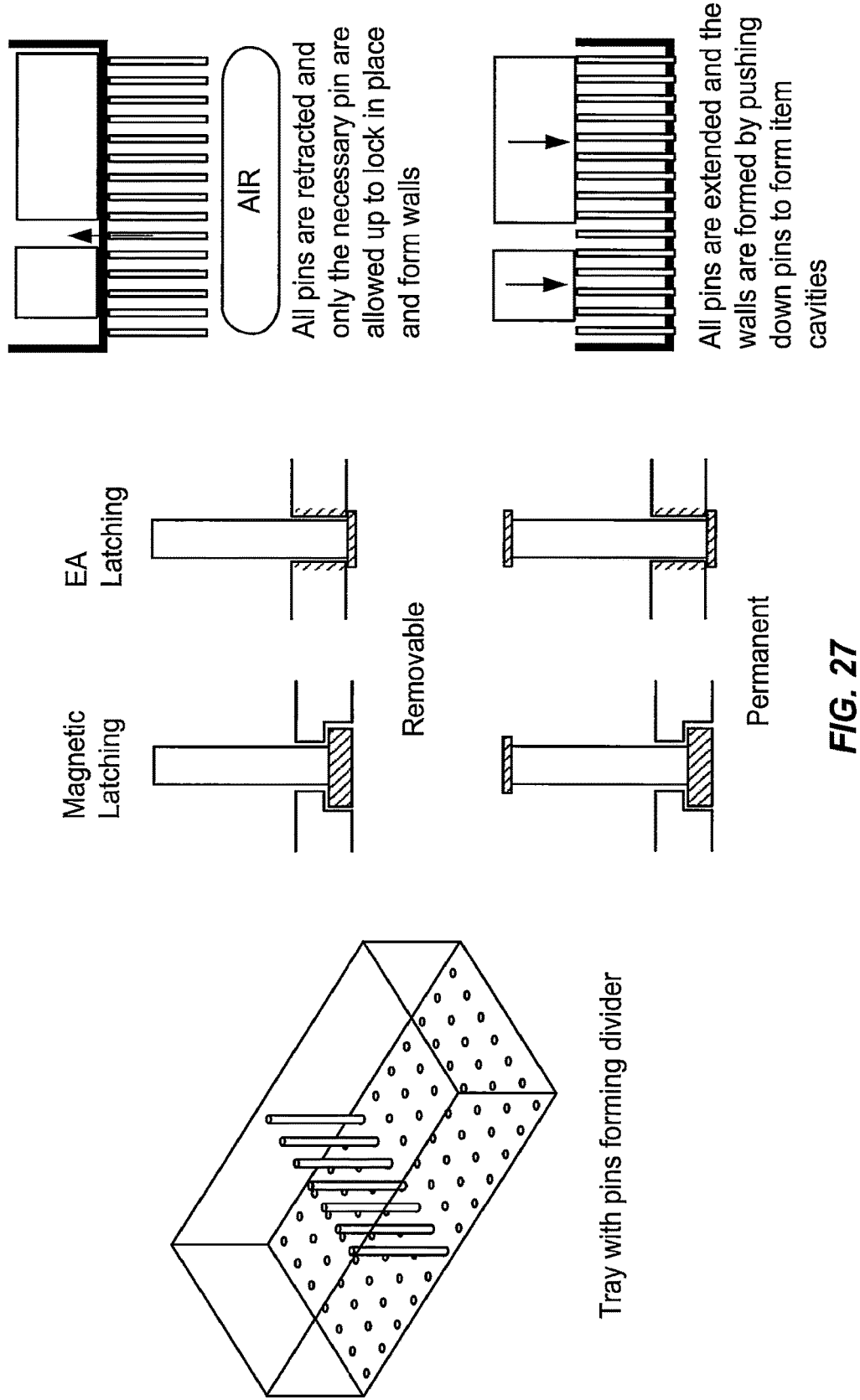
FIG. 27 is an illustration of a tote with a pin array in the bottom of the tote. Pins can be permanent or removable. Pins can be pneumatically, hydraulically, electrically, electroadhesive (EA) or mechanically controlled. In one variation, pins can be elevated to create walls. In another variation pins can be depressed to create cavities. In another variation pins can be raised en masse to raise an item up out of the tote or push it out of the tote.
Figure 28:
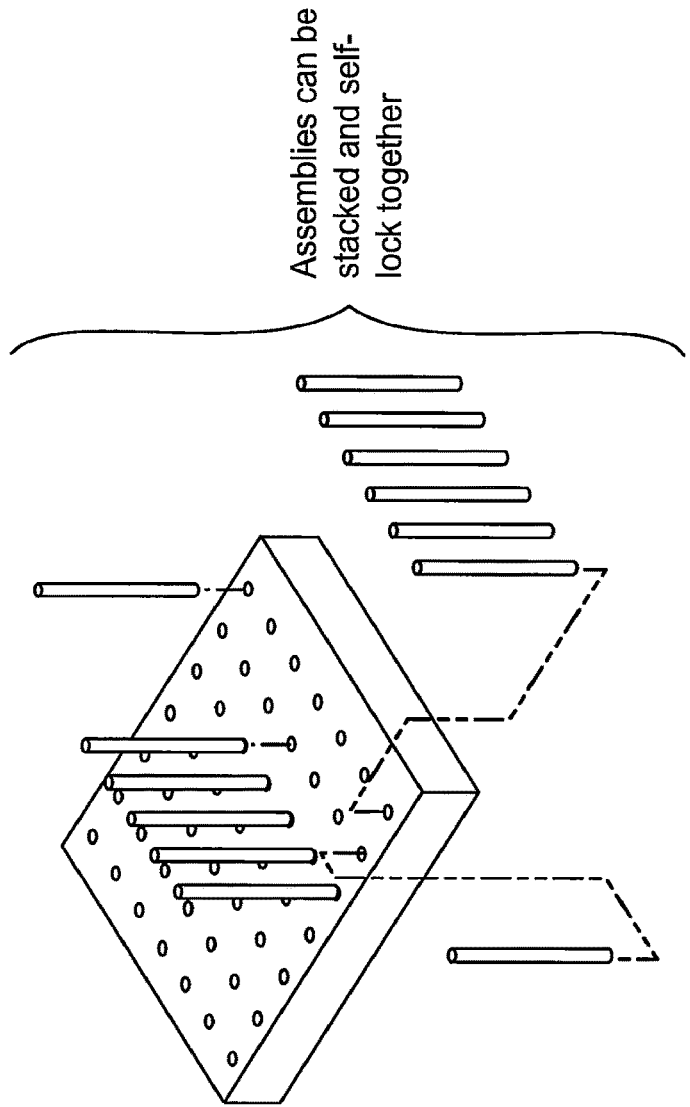
FIG. 28 is an illustration of using pins to create stackable layers.

FIGS. 27 and 28 illustrate examples of the use of pins for either partitions or spacing units. Pins can be placed in an array sheet comprising a "false" bottom that allows the pins beneath an item to be depressed into the false bottom, leaving the remaining pins to surround the item and create a dividing wall.

Alternatively, or cooperatively, pins can be used as "stand-offs" to create and support spaced layers, with or without intermediate lids, within a tote. Pins may simultaneously be utilized to create partitioning walls between items within each layer.

Figure 29:
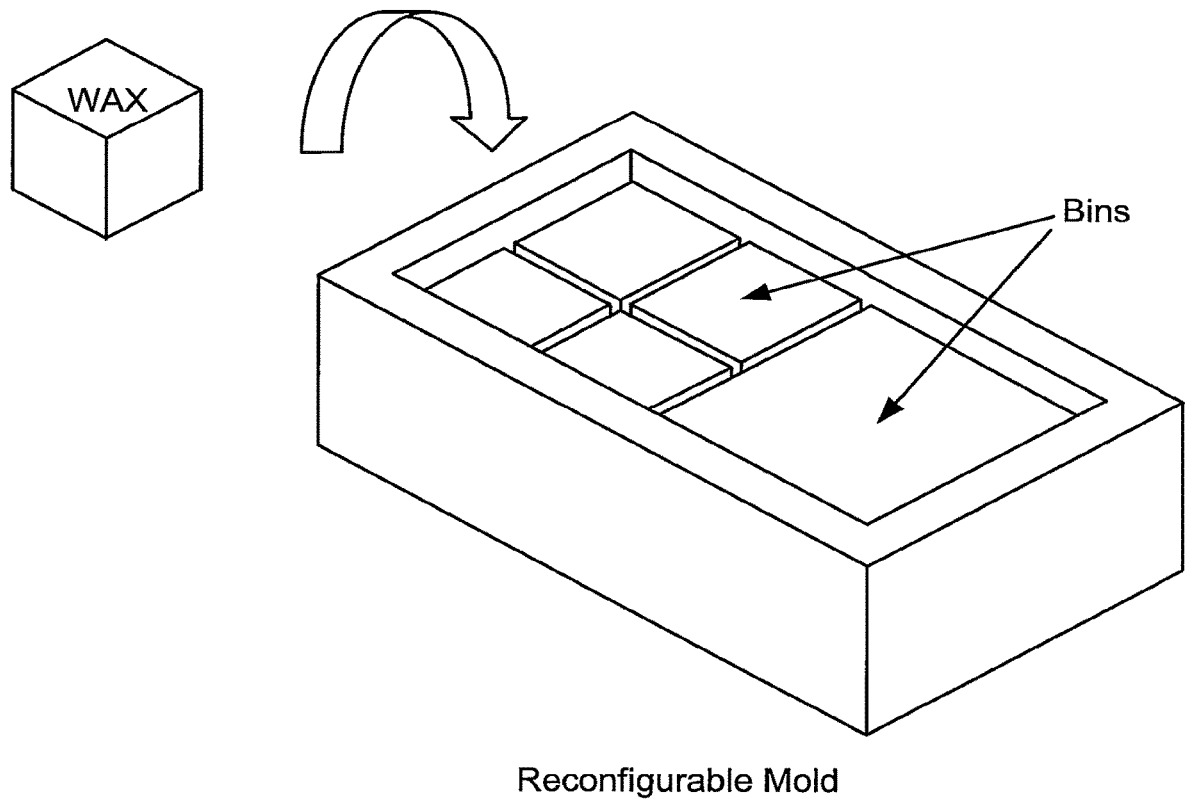
FIG. 29 is an illustration of using a meltable/remoldable material to form a reconfigurable mold.
Figure 30:
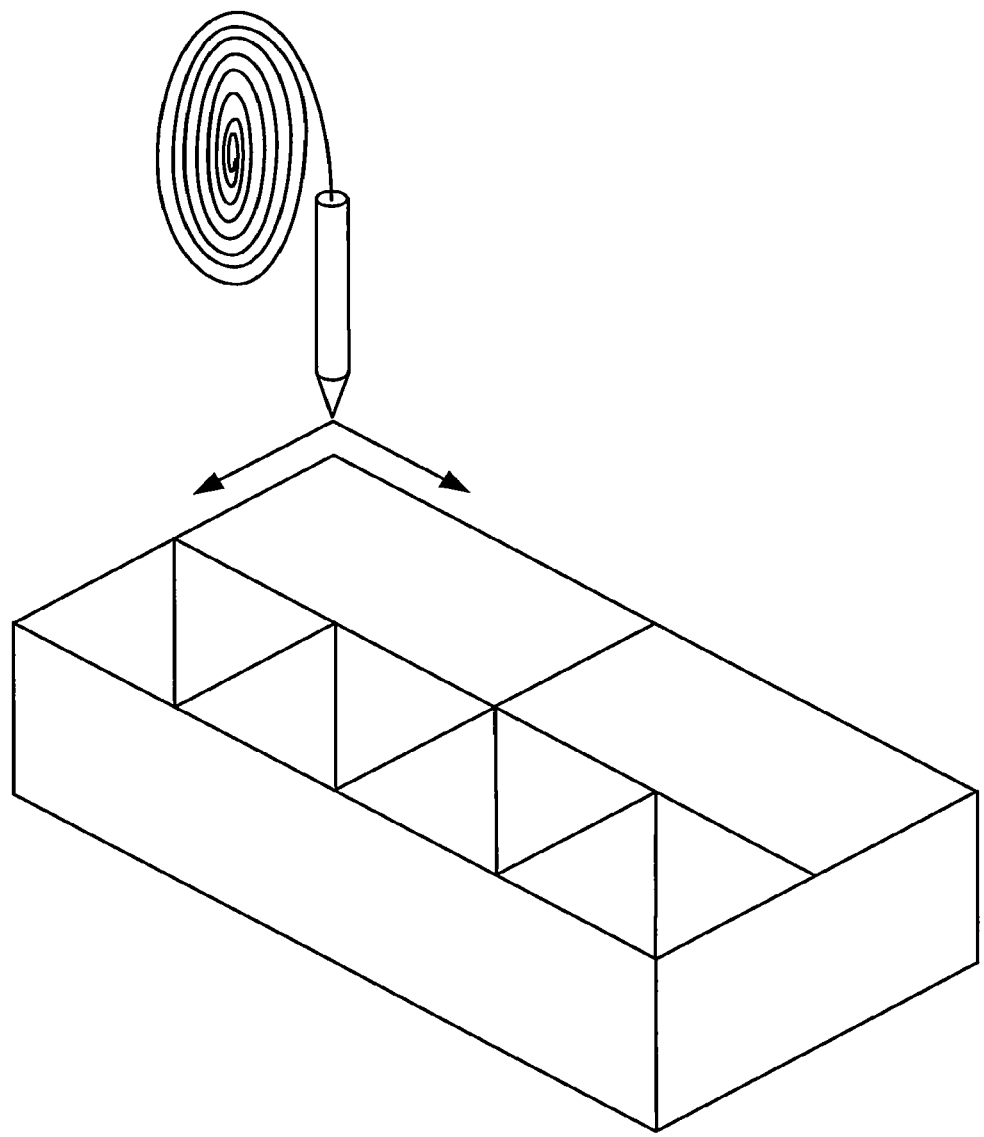
FIG. 30 is an illustration of using 3D printing technology to create a custom container and/or partitions.
Figure 31:
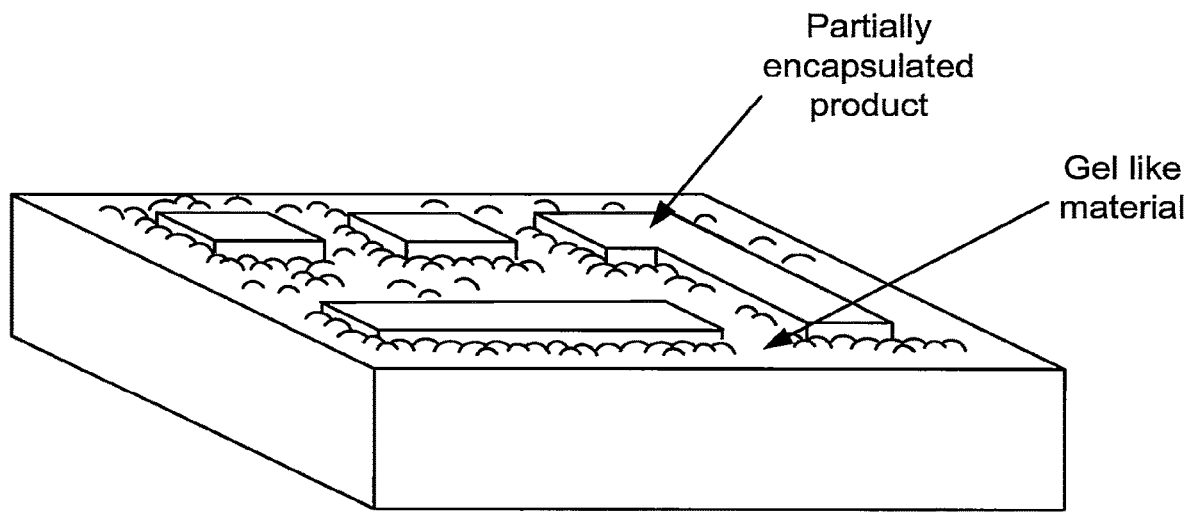
FIG. 31 is an illustration of using gel-like materials to form partitions and/or secure products in a container.

FIGS. 29-31 illustrate still other methods for creating partitioned totes utilizing formable materials, and 3D printing techniques.

As the term is used herein, a "lid" shall refer to a covering surface for a tote or container. The covering surface may be permanent, temporary or reconfigurable. A lid may be a top enclosure, bottom enclosure, or intermediate surface between layers of a container. A lid may be a divider between two or more layers of containment areas in a container. A lid may be a covering surface for an entire tote or container, or may comprise separate sections covering all or some of the containment areas in a container. A lid may be hinged to allow it to swing open. A lid may be configured to slide open from the side, top or bottom of a container. The lid may be configured as an accordion to compress in multiple layers upon itself. The lid may be configured as a rolling or sliding single, or multi-sectioned unit, similar to roll-top desk or garage door, where it can retract into another are of the container along a tracked path. A lid may be a flexible or fabric surface that can be pulled away. A lid may be separable from the container or compartment, or it may be integrally attached.

Figure 32:
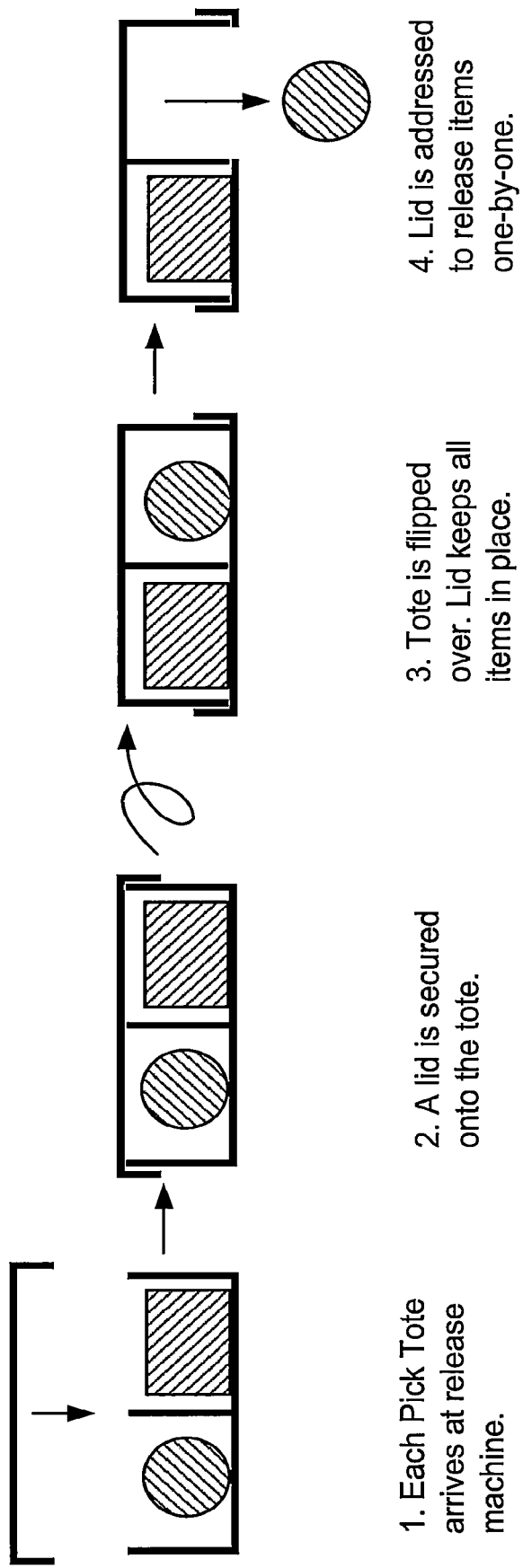
FIG. 32 is a general illustration of a tote inside of the release station comprising the attachment of a lid with a releasable section capable of being inverted and selectively opened to release products.
Figure 33:
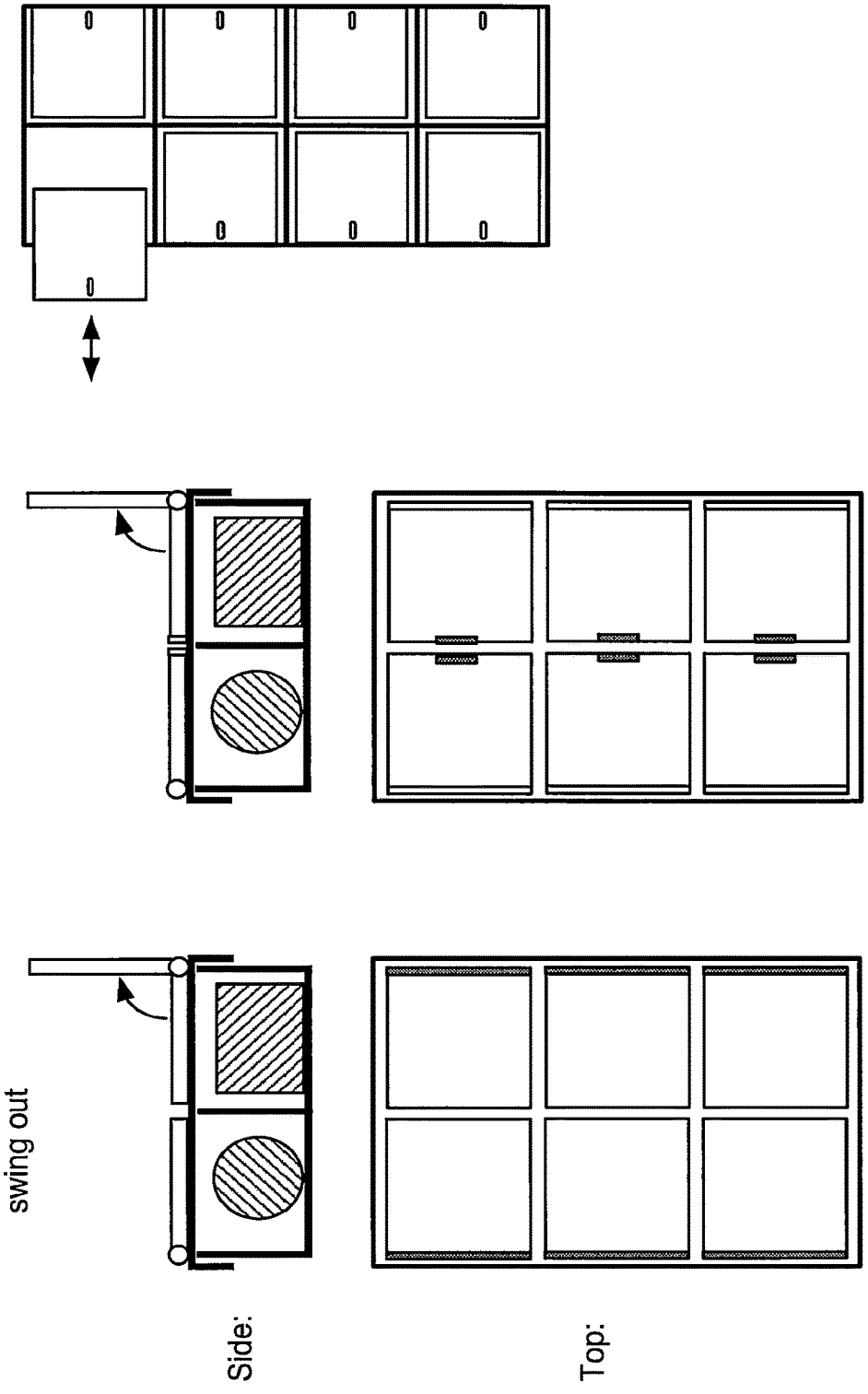
FIG. 33 is an illustration of various types of "trap door" lids that could be utilized for these totes, including swinging doors with lockable hinges, doors with lockable latches, and slide-out doors.
Figure 35:
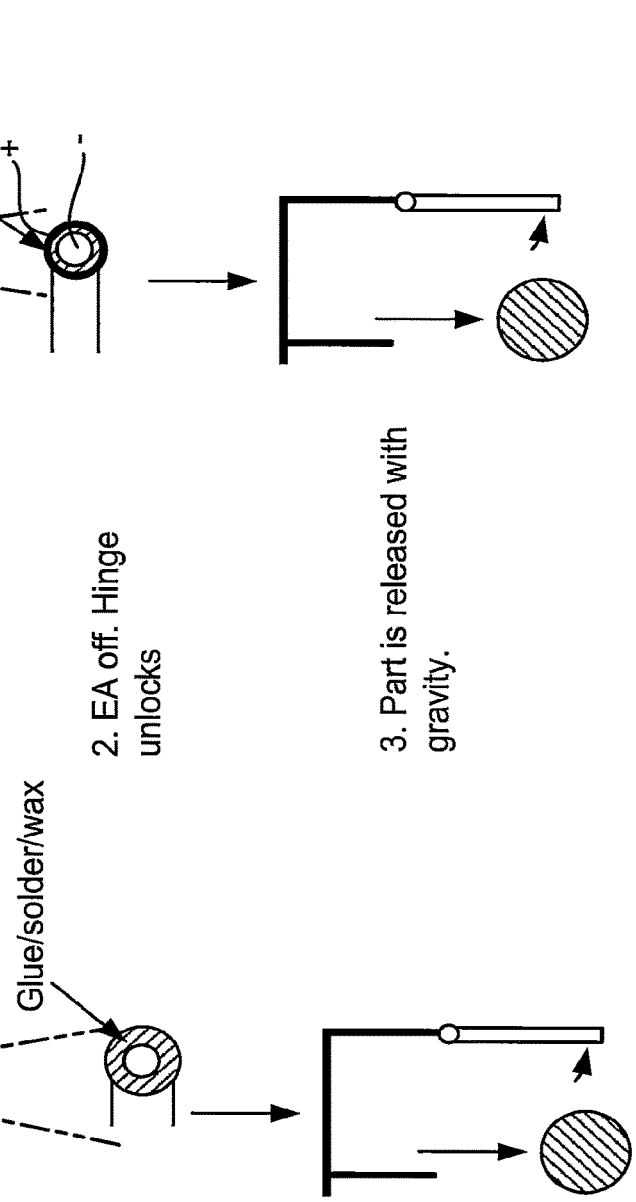
FIG. 35 is an illustration of lockable hinges comprising re-meltable glues, wax or solder that hardens to lock a hinge. Alternately electroadhesive (EA) interaction can be applied to open, close or lock a hinged door.
Figure 36:
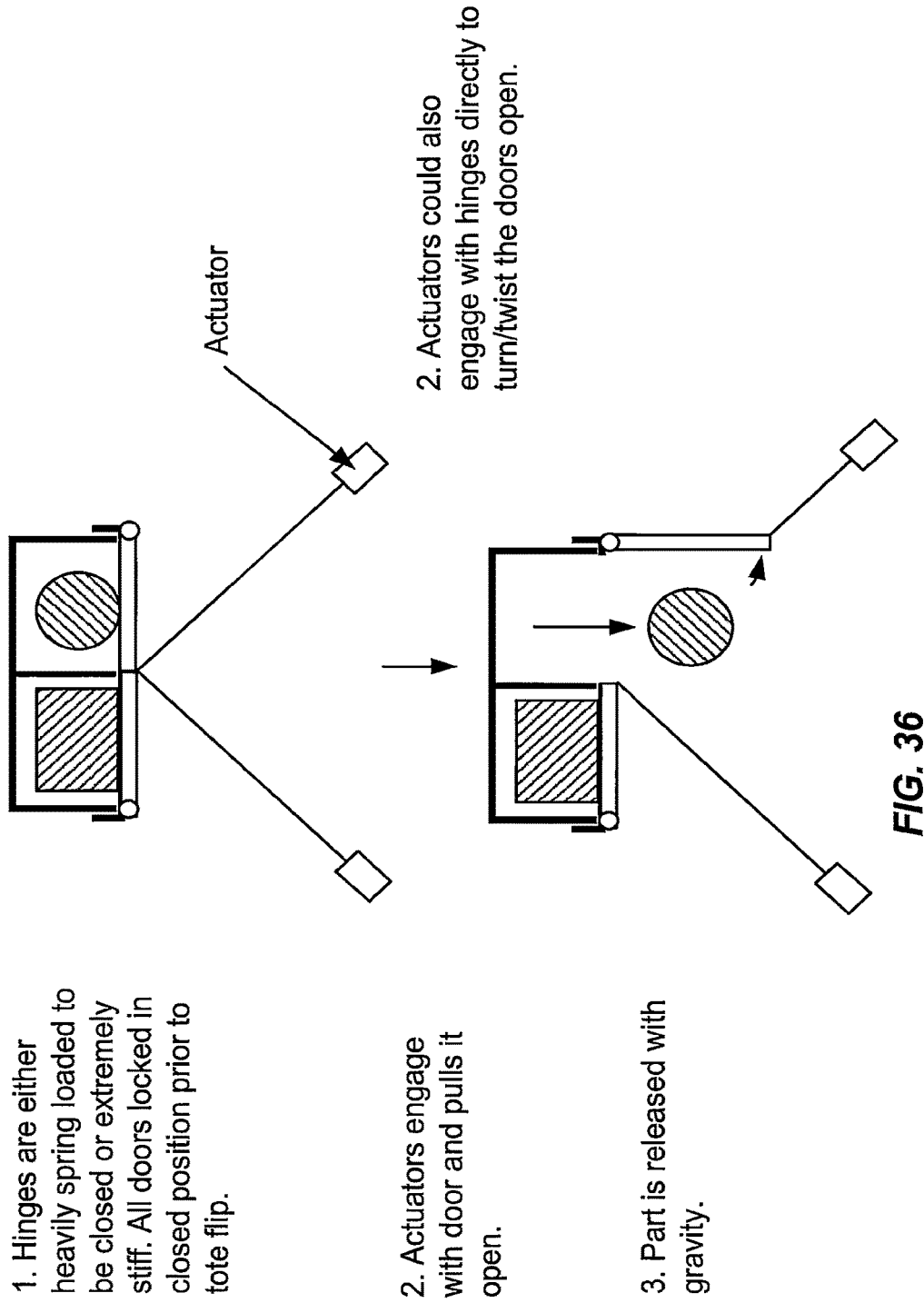
FIG. 36 is an illustration of an electromechanical actuator to open and close a hinged door.
Figure 37:
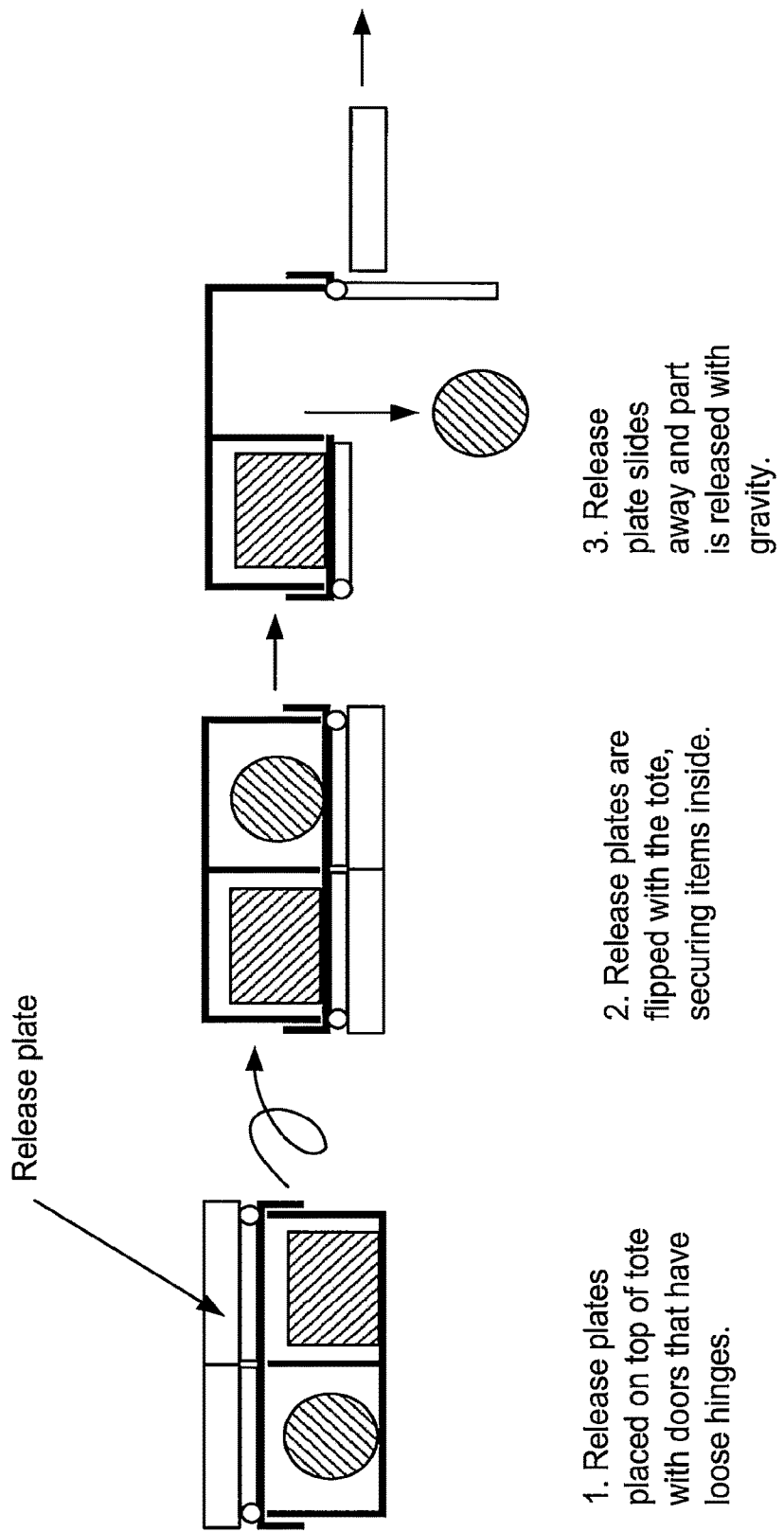
FIG. 37 is an illustration of the use of release plates to secure and/or open lid doors.
Figure 39:
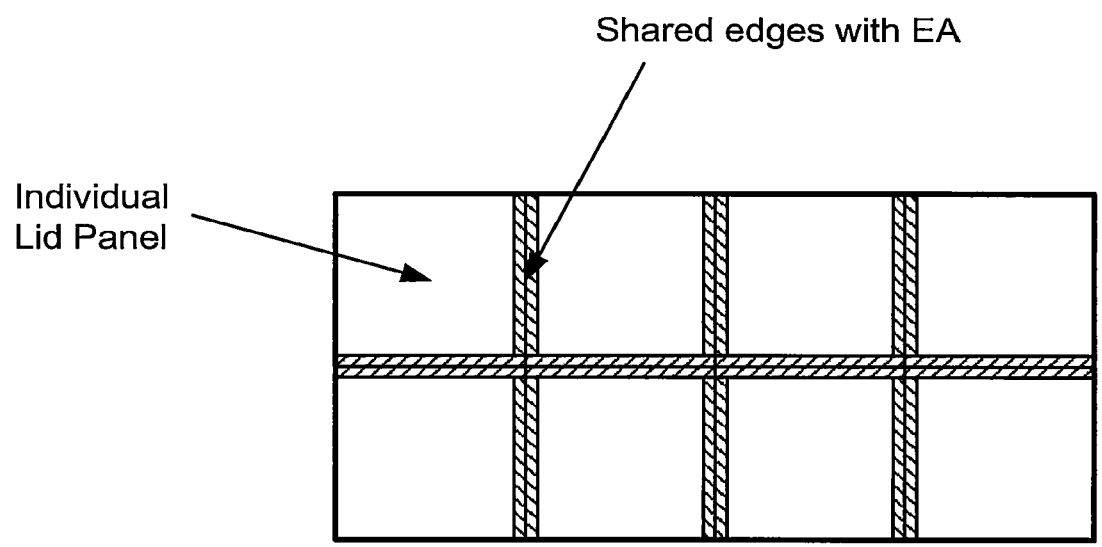
FIG. 39 is an illustration of material lids over each containment area, held in place with EA edges that can be selectively activated/deactivated in a release station.

FIGS. 32 and 33 provide representative examples of various types of lids as described above.

Figure 40:
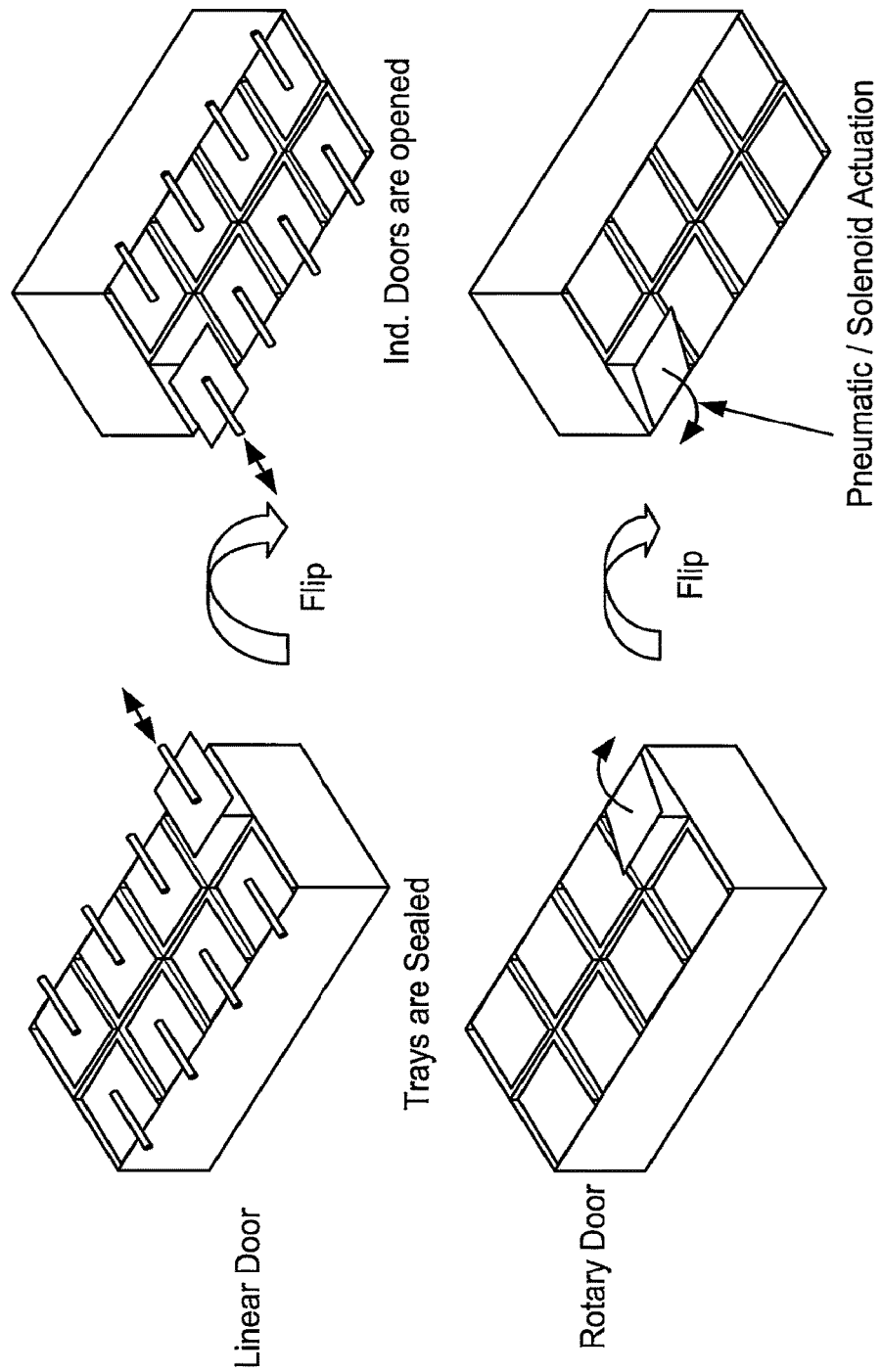
FIG. 40 is an illustration of a tote that does not have a lid when it enters a release station. In this variation, the release station provides and attaches a lid comprising releasable doors to the tote; flips the tote over the customer receiving totes or a smart chute, then selectively actuates the releasable doors to release the contents of the specific containment area. Doors way be linear, rotary, or flexible and actuated by pneumatic, electrical, EA, or mechanical means.
Figure 41:
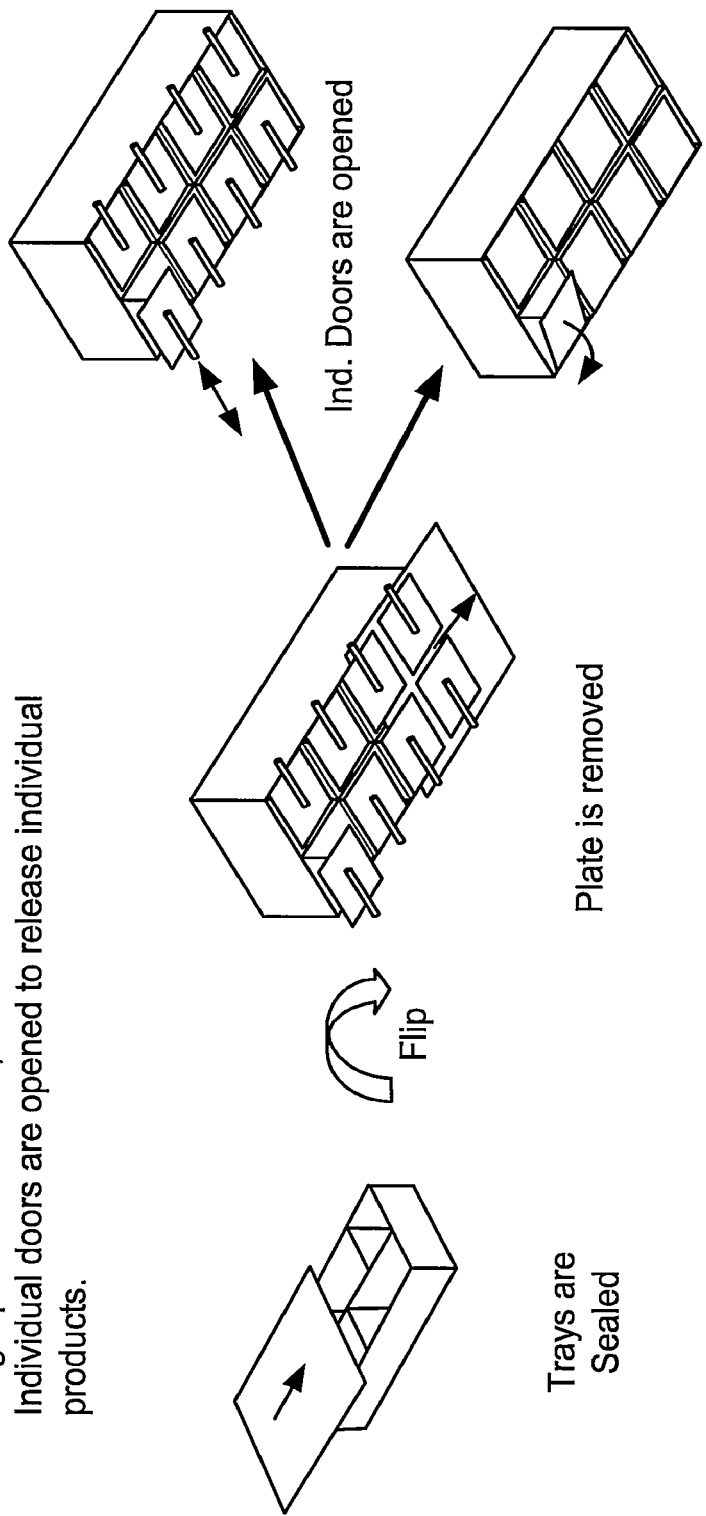
FIG. 41 is an illustration of a tote that does not have a lid when it enters a release station. In this variation, the release station provides and attaches a single plate that seals all the bins in the tote; the tote and single plate get flipped; individual doors are put in place; single plate is removed; individual doors are opened to release individual products.

FIGS. 40 and 41 provide an alternative lid configurations supplied at the release station, to the tote that does not comprise a lid.

As used herein, a lid may be "addressable" and/or "releasably lockable". In some embodiments, the terms are interchangeable and convey the concept that each lid may be individually controlled to open and close on command and that the command can be conveyed in or addressed to the lid in a myriad of ways. By being releasably lockable, a lid will remain closed until addressed to open and remain open until addressed to close, or configured to do so automatically. The lid may be configured to open or close by means of a set of actuating computer instructions. The lid may be configured to open or close by means of electroadhesion. The lid may be configured to open or close by means of a mechanical gripper. The lid may be configured to open or close by means of a manual (human) action such as release of a lever. The lid may be configured to open or close by means of an electrical signal or current. The lid may be configured to open or close by means of an optical signal, such as a laser, infrared signal or pulse. The lid may be configured to open or close through instructions of a bar code or comparable system. The lid may be configured to open or close by means of a temperature sensitive material attached to the lid locking or hinge mechanism. FIGS. 15-19 illustrate numerous examples of hinged lid configurations adaptable to this system.

FIGS. 34-39 illustrate numerous configurations of addressable lid configurations comprising releasable locking mechanisms.

Still further, a containment surface or covering surface comprising addressable lids may also be configured from an inventory of components and may also comprise a combination of any of the lid configurations previously described. Ideally, lids may be provided in a series of standard shapes, sizes and configurations to allow for the construction of larger containment or covering surfaces having a myriad of possible containment area shapes within a standard size configuration or configuration range.

Figure 43:
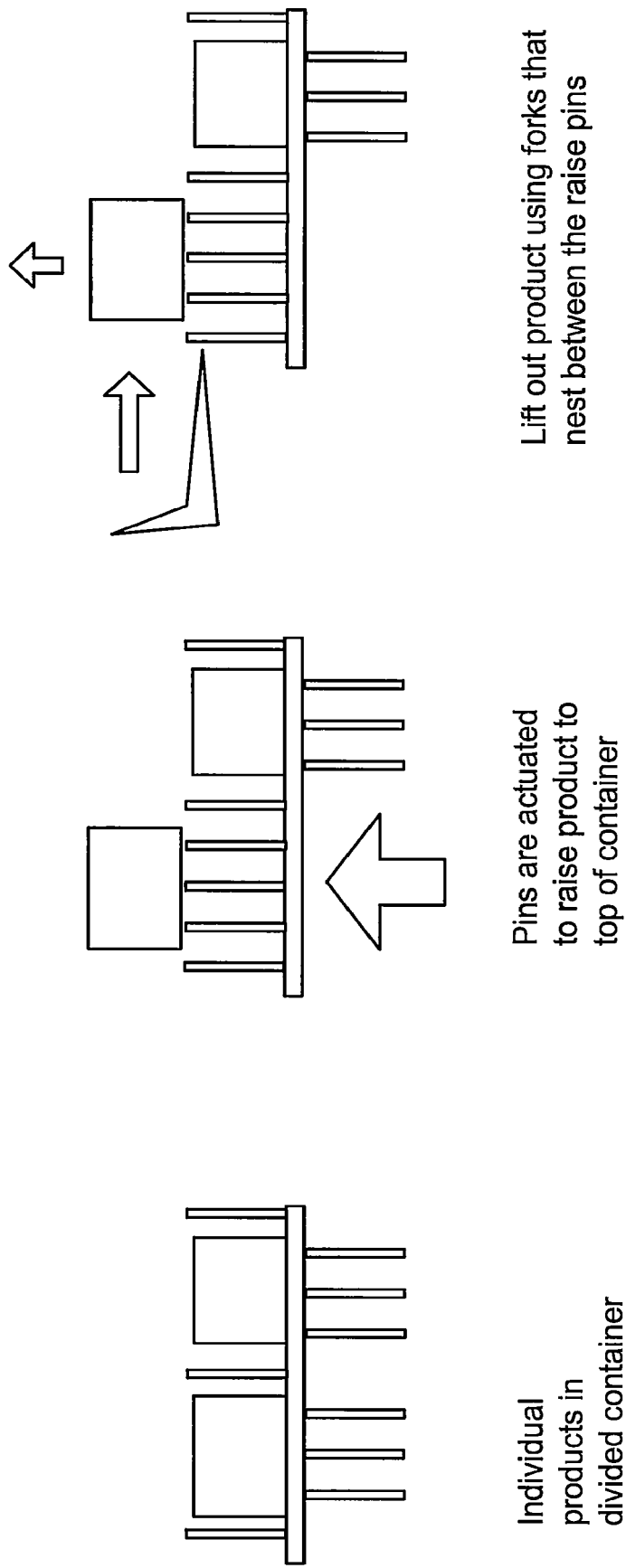
FIG. 43 is an illustration of a configured tote having no lid, and a tote bottom with features that can elevate the selected item(s) therein above the edge of the tote. A gripper or forked lift can lift the item out of the tote and move it to the next processing step or delivery tote.

Further still, FIGS. 42-43 illustrate alternative tote configurations with partitions that are movable to allow the item to fall out or be lifted out of the container.

FIG. 44 illustrates a container with a removable "bottom lid".

Figure 46:
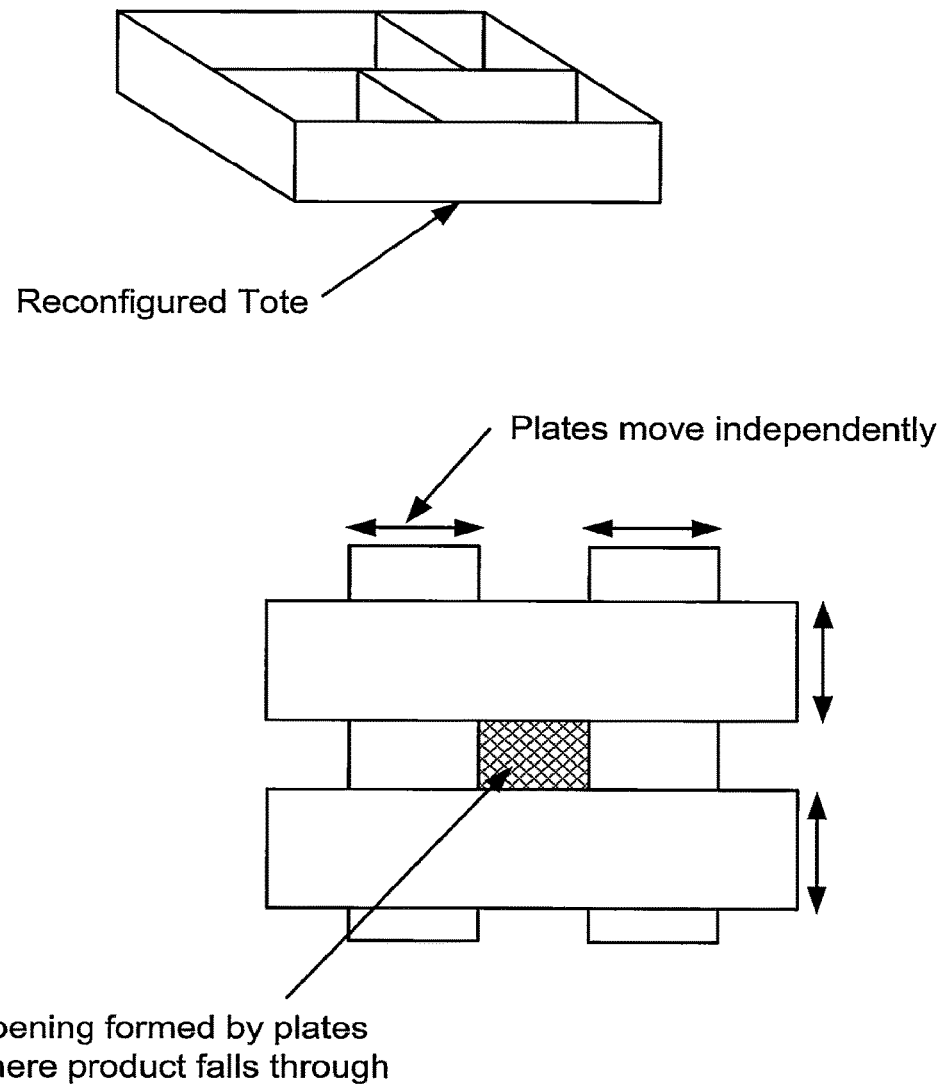
FIG. 46 is an illustration of tote with no lid, wherein an aperture cover plate is used to cover the tote when it arrives at the release station. The two sets of plates are arranged to cover the tote. The tote is then inverted. The sets of plates reposition themselves to form an opening that matches the corresponding partition and releases a product.

FIGS. 45 and 46 provide illustrations of various forms of indexing devices in combination with lids for the select addressable delivery of items contained in a tote.

In some embodiments, the Automated Item Handling System, or Pick System described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony®PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

In some embodiments, the Automated Item Handling System, or Pick System disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the Automated Item Handling System, or Pick System disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the Automated Item Handling System, or Pick System disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the Automated Item Handling System, or Pick System disclosed herein include one or more databases, or use of the same. In view of the disclosure provided herein, those of skill in the art will recognize that many databases are suitable for storage and retrieval of storage location, content and bin configuration information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

As illustrated in FIG. 1, with a manual warehouse picking system, incoming goods arrive at the warehouse receiving dock from vendors in bulk, where a first picking is performed by a human, to unload, depalletize, and inventory the items into inventory storage. At some point, usually following the compilation of multiple batch orders received, a second picking occurs where items are pulled in semi-bulk, (by another human typically), to fulfill the batch orders and placed in batch containers for secondary sorting. Finally, the batch orders are separated at a third picking station (again by a human), into their individual orders before packing, labeling and shipping to a customer.

Alternately there are mixed automated/human warehouse picking systems involving the use of human operators for depalletizing incoming goods arriving from vendors/suppliers to a warehouse, where items must be removed from bulk pallets, broken down into smaller lots sizes and/or containers, cataloged and moved to cataloged warehouse inventory storage and/or mixed shelving locations. However the second and or third picking operation may utilize an automated robotic system, such as the Kiva Robotic® system. In these systems, inventory items are sometimes stored in inventory "pods" located in the inventory storage or mixed shelving location; picked up and brought to a stationary human operator in a secondary staging location by a fleet of mobile robotic drive units, where the items are physically removed from a carrier rack or bin holding bulk quantities of one or multiple items, then catalogued against a pending order, then placed in a secondary carrier for additional sorting down-line, or alternately placed in an individual order or shipping container for outgoing shipment to a customer.

Figure 2:
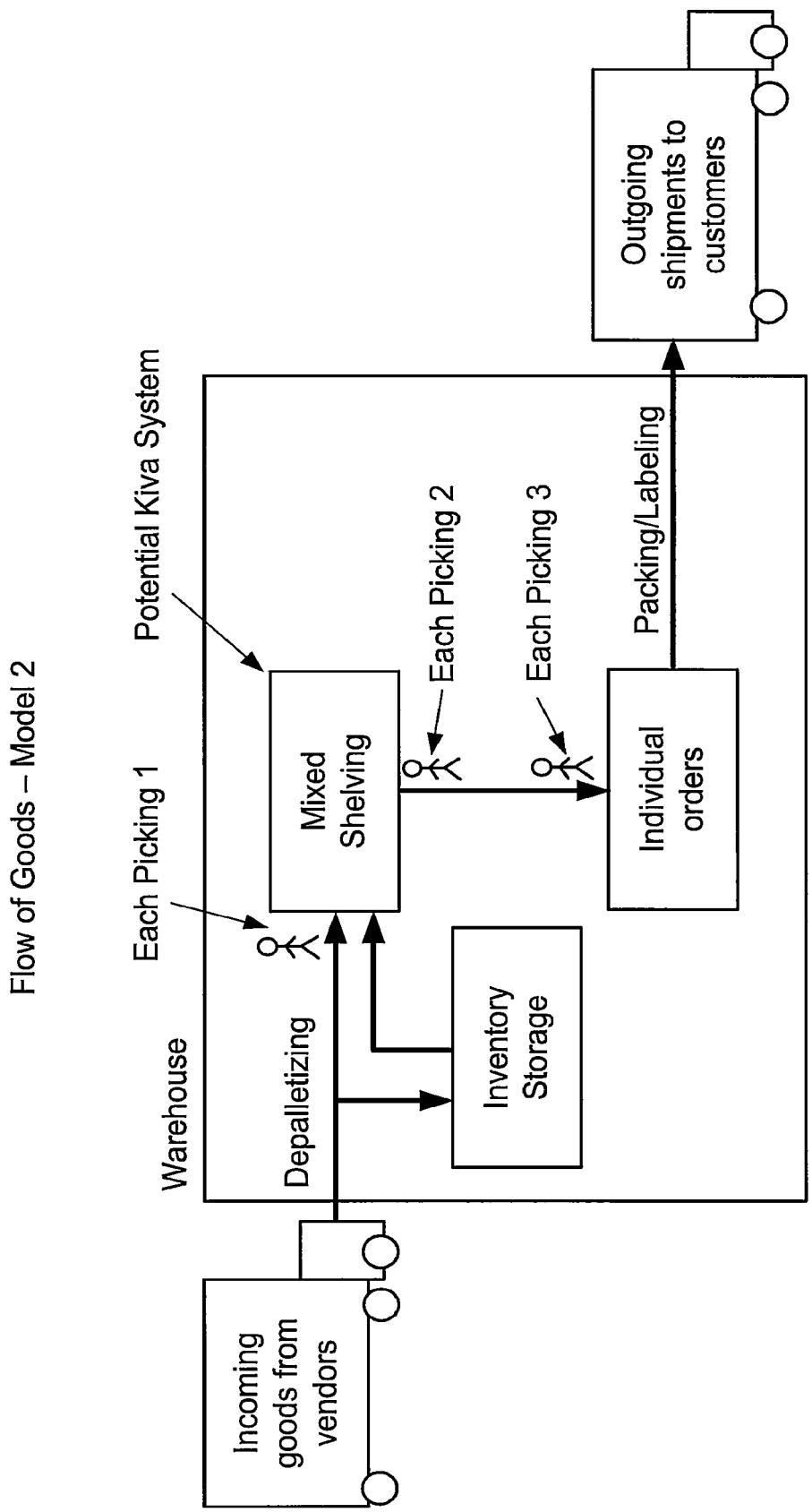
FIG. 2 is another illustrative flow diagram of a typical semi-automated flow of goods in a typical "Each Picking" warehouse material handling operation.

As illustrated in FIG. 2, with a semi-automated warehouse picking system, incoming goods arrive at the warehouse receiving dock from vendors in bulk, where a first picking is performed by a human, to unload, depalletize, and inventory the items into inventory storage and/or mixed shelving locations. At some point, again, usually following the compilation of multiple batch orders received, a second picking occurs where items are pulled in semi-bulk. However, as noted in the flow diagram of FIG. 2, the second picking operation may utilize an automated robotic system, such as the Kiva Robotic® system, to pick up a mobile mixed shelving or storage bin and bring it to a stationary operator, for manual selection of items from the containers. Alternately, a robotic system may be utilized at this stage, often utilizing a bar coding or 3D vision system for item selection. At this point the items are physically removed from a carrier rack or bin holding bulk quantities, then catalogued against a pending order, and placed in a secondary carrier for additional sorting down-line.

Finally a third Picking occurs where, once again either a human or robotic system may be utilized to select items from the de-bulked second picking bin(s) and sorted into individual orders prior to packing, labeling and shipping to a customer.

Often times, an operator may be working to fulfill three, five or even 10 orders simultaneously, sometimes resulting in the mixing of orders, due to fatigue or simple human error. Other systems utilize bar coding or similar tracking and cataloging systems in an attempt to reduce these errors.

Still other systems may incorporate semi-automated systems utilizing variants of 3D vision systems and robotic grippers to identify and select items for order fulfillment. Unfortunately, such systems are extremely challenging when dealing with very large inventories and varieties of parts (>1 million SKUs) involving items that are constantly changing in dimensions, color, etc., and unannounced manufacturer's design and packaging changes.

Provided herein are systems to address these challenges while still allowing automated handling without the complexity of robotic gripping. The present system automates aspects of all three Picking operations through the use what can be termed as "reconfigurable dumb totes" combined with "smart stations". Reconfigurable totes can be conveyed around a warehouse to different smart stations where they are manipulated, configured with reconfigurable partitions, optimizing them for inventory control and maximized use of space for the items they are to be tasked with transporting, then loaded with their cargo, catalogued by individual containment area, then either stored in inventory until needed, or transported to another smart "release" station where items can be individually released from their individual containment area in the container to a smart chute or individual shipping container for order fulfillment. Once an item is released, the container can be returned inventory or routed to another smart station for another picking.

Figure 47:
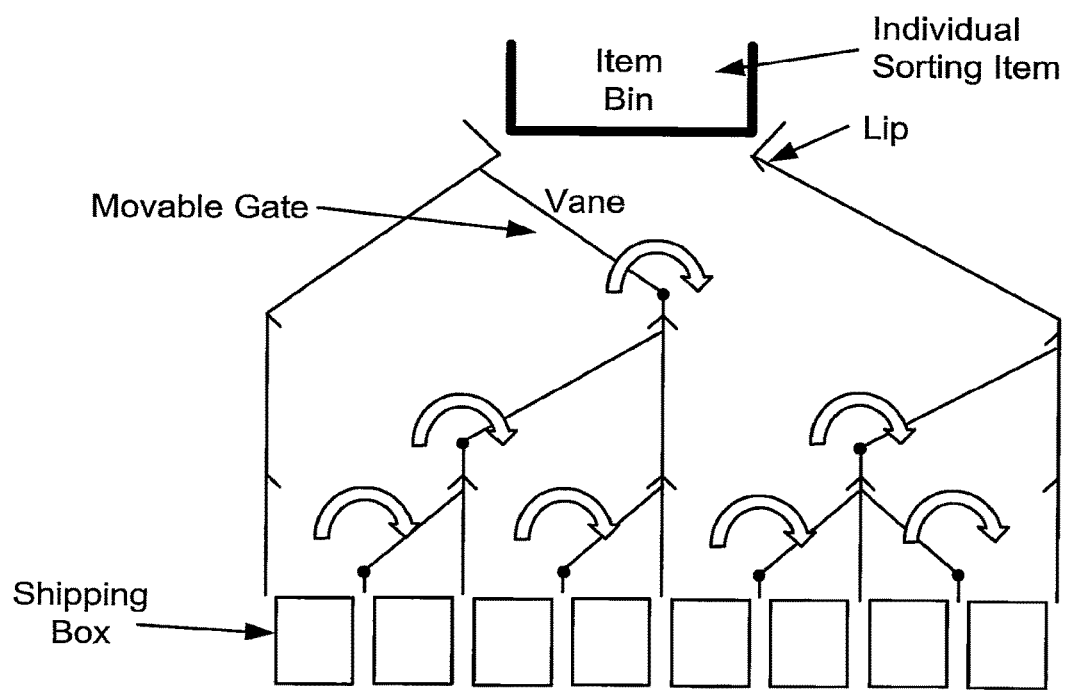
FIG. 47 is an illustration of a smart chute with switching paths and chutes. As items are released in the release station and dropped into the smart chute; items are diverted into the appropriate shipping boxes using movable vanes. EA could be used to intelligently control the descent of the product along the chutes.

FIG. 47 illustrates an example of a smart chute system wherein items are diverted into the appropriate shipping boxes using movable vanes. Electroadhesion (EA) could be used to intelligently control the decent of the product along the chutes.

Still further, when a container is emptied of the contents for which is was configured, it can be recycled or reconfigured by routing it to a smart "reconfiguration" station where the container can be reconfigured with a new partitioning configuration to optimally accommodate a new cargo.

Advantageously, the system is not limited by a need for uniformity of size, volume or number of items in a container. The system provides the user with the ability to customize the configuration of each containment area within a container to allow for the fulfilling of individual orders comprising multiple items of different shape or size or volume, while providing secure handling and optimal use of the container volume.

Additionally, a container can be configured to handle, sort, transport and deliver two or more different orders securely by segregating the customized containment areas with individually addressable "lid" sections that can be released on demand at a smart release station, allowing the parts to be placed in individual customer shipping containers with the possibility of mixing orders.

Still further, a preferred number of system and container configurations eliminate the need for robotic grippers, by allowing items to depart the container at a release station, through the releasable lid section, via gravity.

Provided herein are solutions to automated material handling issues comprising systems that allow automated "each pick handling" without requiring the complexity of robotic grasping. Numerous examples of pre-configurable and reconfigurable transport containers, partitioning devices, and automated container configuration stations are described in addition to methods of use and associated material handling systems that utilize such containers. Further described are containers that are individually configured or customized according to specific lot sizes to more efficiently and optimally contain, store and distribute articles as a component of an automated picking material handling system. Configurable containers or "totes" may be customized on a per-order basis to create optimally configured containers that maximize the use of space in a container, on a single-item-per-space basis, regardless of item quantity, size or volume, by customizing the size of each space within a container or tote. Still further, each containment area comprises a releasable surface that allows for picking of an item by utilizing gravity in lieu of a robotic gripper.

Figure 48:
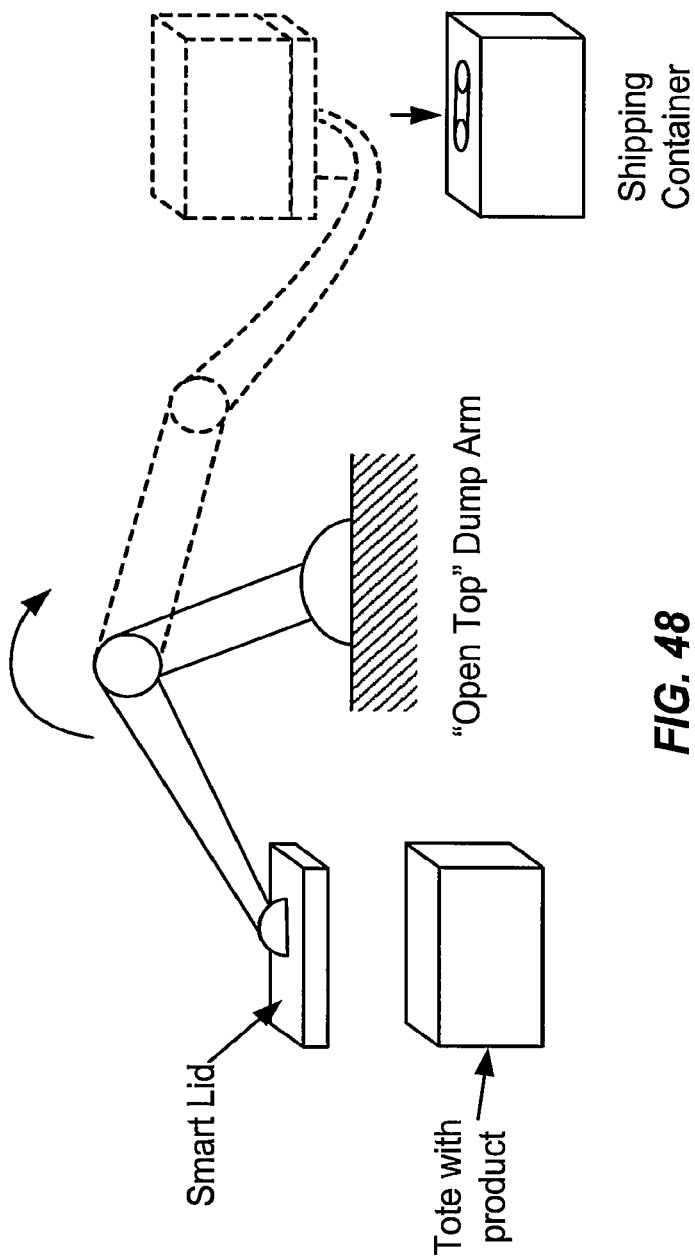
FIG. 48 is an illustration of a final picking operation wherein a robotic gripper with a "smart lid" attached, is attached to a tote and inverts, then moves around to release the contents of the customer tote into the appropriate shipping container.

Alternatively, rather than using robots for conventional "Picking" operations, robotic devices can be tasked to deliver a "smart lid" to totes as part of a material handling system. As illustrated in FIG. 48, a robot with a smart lid attaches to a tote and inverts then moves around to release product over an appropriate shipping container. The same concept would be applicable to move customer or bulk totes between release stations or to transfer totes between conveyance systems within the warehouse.

Figure 3:
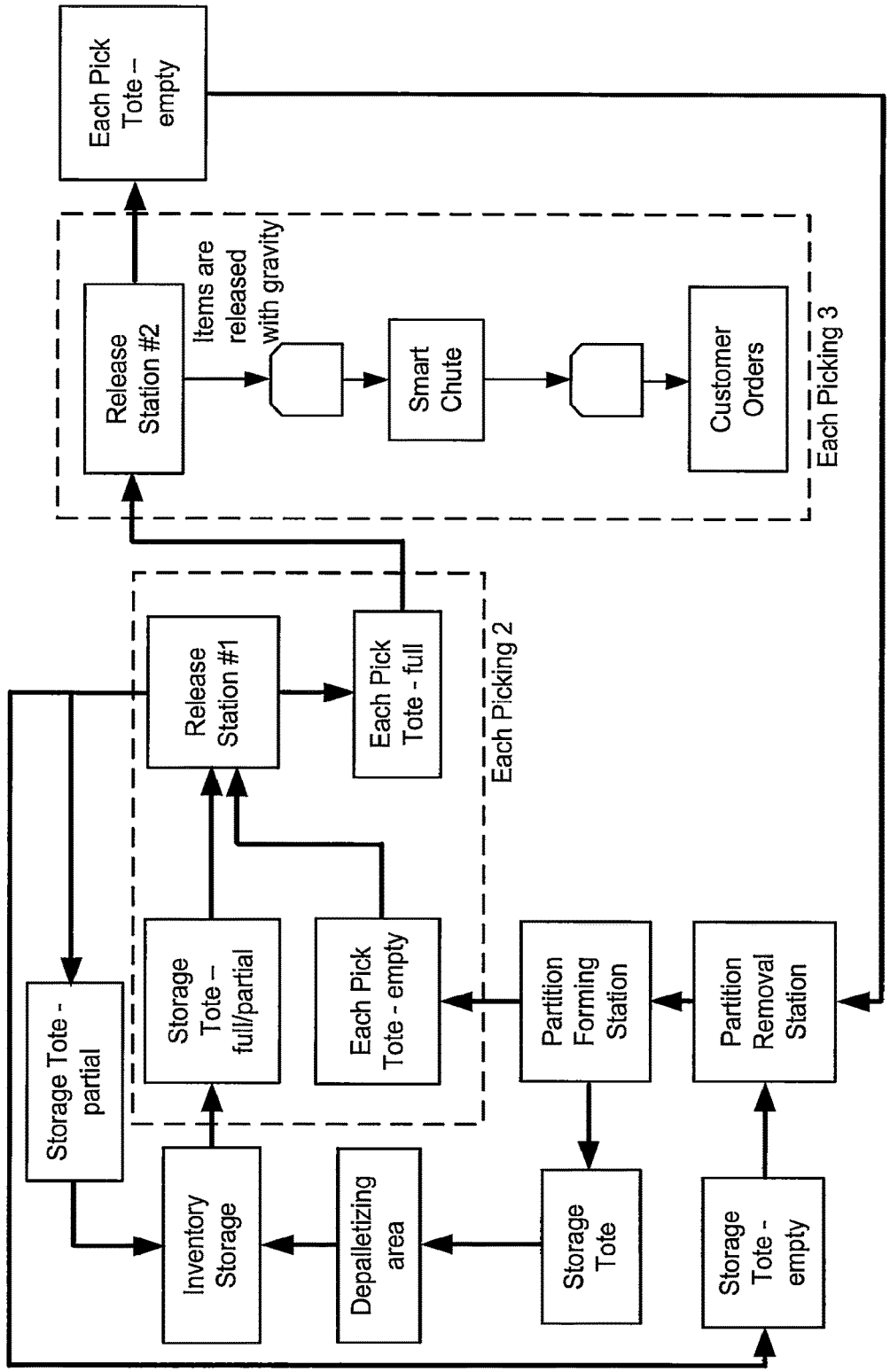
FIG. 3 is an illustrative flow diagram of an exemplary "Each Pick Carousel" model for automating the second and third Each Picking operations in a warehouse material handling operation.

One such solution is illustrated in FIG. 3 wherein customized totes are initially configured at a smart station according to the requirements of incoming instruction from an ordering system to accommodate either, goods arriving in bulk at the warehouse receiving dock from vendors, or for an incoming customer order. In a receiving dock embodiment, a tote can be either a new tote or a previously configured used tote. If a new tote is selected from a tote inventory location, it can be sent to a partition forming station wherein the tote is optimally configured to accommodate the specific requirements of the incoming bulk order, where a first picking is performed by a human, to unload, depalletize, and inventory the items into inventory storage and/or mixed shelving locations. The tote, (or multiple totes if required) would be configured with partitioning to store a maximum number of items, each item in an individual containment area within the tote and each containment area comprising an addressable release lid. If a previously configured used tote (or multiple totes if required) is selected from a tote inventory location, it is sent to a smart partition removal/disassembly station, where the old partitions are disassembled prior to sending the tote on to the smart partition forming station. Once a tote (or multiple totes) is properly configured it is then forwarded to the depalletizing area where it is loaded with the depalletized items from the bulk receiving order, addressable release lids may be secured if desired, the items of each containment area are inventoried, the totes are given a unique identifier, and the totes are subsequently sent to their assigned storage inventory or mixed shelving location in the warehouse for future use.

In a customer order scenario, the same initial sequence of events would apply. A tote can be either a new tote or a previously configured used tote. If a new tote is selected from a tote inventory location, it can be sent to a partition forming station wherein the tote is optimally configured to accommodate the specific requirements of one or more customer orders. The tote, (or multiple totes if required) would be configured with partitioning to optimal store a maximum number of items, each item in an individual containment area within the tote and each containment area comprising an addressable release lid, the item intended for each containment area is identified according to a specific customer order, and the totes are each given a unique identifier. Each containment area would be optimally customized to securely contain each item in the customer order(s), depending on number, size and volume of each item in each order. If a previously configured used tote (or multiple totes if required) is selected from a tote inventory location, it is sent to a smart partition removal/disassembly station, where the old partitions are disassembled prior to sending the tote on to the smart partition forming station. Once a tote (or multiple totes) is properly configured, it is then forwarded to a smart release station for picking, the second picking or Picking 2.

In a smart release station, the customized configuration customer order totes are positioned, typically beneath the smart release station. There may be one or many such totes configured to receive items from the release station, wherein the addressable lids of each containment area are open to receive items dispensed from the release station above.

In a corresponding location of the smart release station, above the customer order totes, inventory or mixed shelving totes containing the bulk items needed to fulfill customer orders are selectively positioned within the smart release station, wherein the inventory of items is read by the smart station, and the appropriate addressable lids for items in the appropriate containment areas needed to fulfill the customer orders are released, allowing the items contained therein to drop out (via gravity), into a smart chute where each item is appropriately routed to the correct customer order bin and containment area below. When inventory items are no longer needed to fulfill orders, the inventory or mixed shelving totes are removed from the smart station and returned to their assigned storage location, or moved to a new smart release station to repeat the disbursement sequence for other orders. If additional items are needed to complete the fulfilling of customer orders below the smart release station, other inventory or mixed shelving totes are selectively positioned to repeat the disbursement sequence and complete the fulfilling operation for the customer order totes. Any empty inventory or mixed shelving totes are routed back to an empty tote inventory location to await future reconfiguration.

Once a customer order tote is full at the second picking operation, it is routed to a second smart release station for a third picking sequence or Picking 3. At this point the previous sequence of operations is essentially repeated, wherein the customer totes, which may contain more than one customer order, are regarded like bulk container totes and are selectively positioned within the second smart release station, wherein the inventory of items is read by the smart station, and the appropriate addressable lids for items in the appropriate containment areas needed to fulfill the individual customer orders are released, allowing the items contained therein to drop out (via gravity), into a smart chute where each item is appropriately routed to the correct customer order shipping container, where they are labeled, checked for order accuracy, and ultimately shipped. The empty totes are then routed back to an empty tote inventory location to await future reconfiguration.

Figure 4:
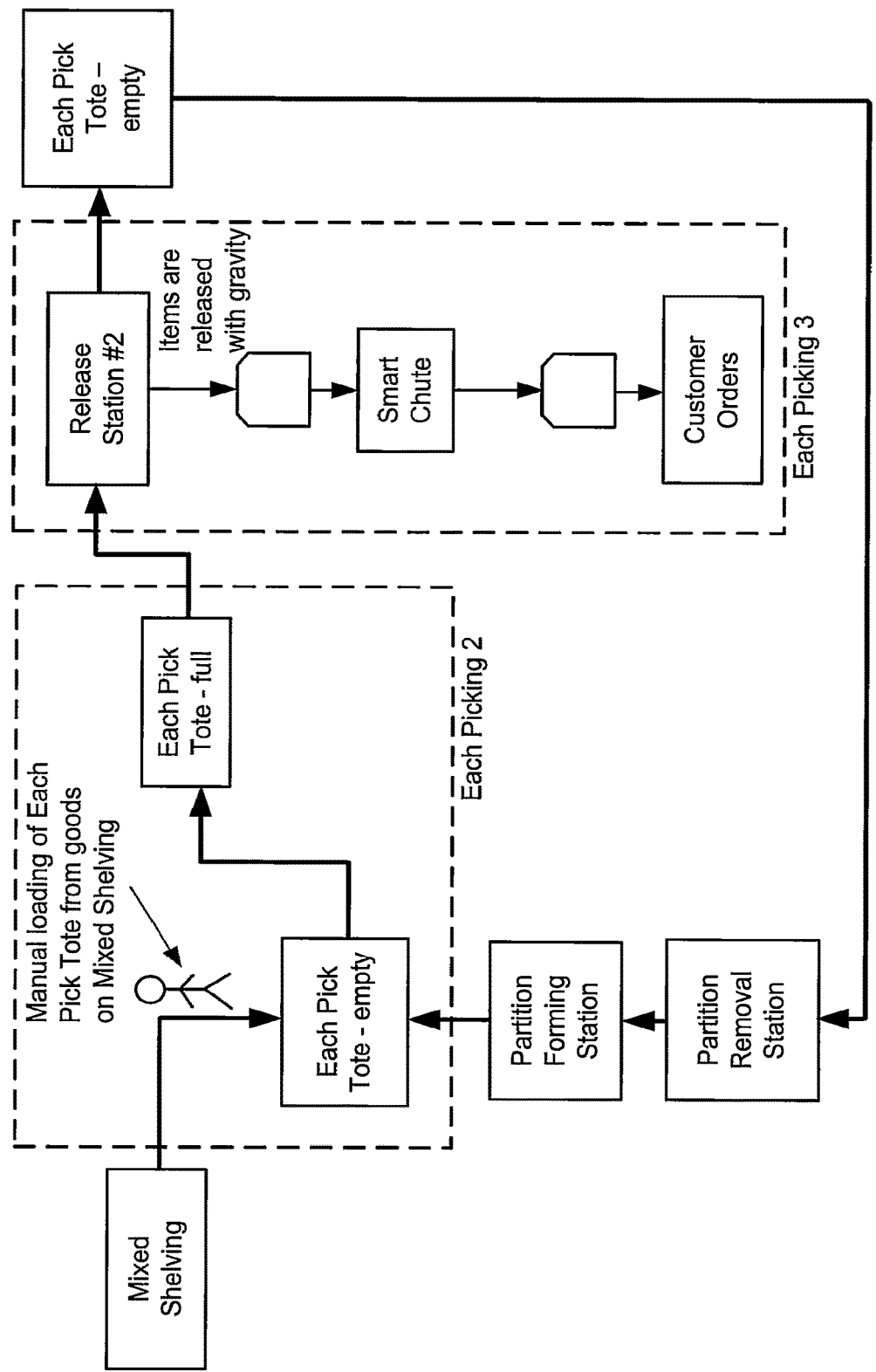
FIG. 4 is an illustrative flow diagram of an alternative exemplary "Each Pick Carousel" model for automating the second and third Each Picking operations in a warehouse material handling operation.

An alternate solution is illustrated in FIG. 4, illustrating an embodiment that combines the inventive solution described herein with other manual and semi-automated systems. In this embodiment, a customized configuration customer tote is forwarded from a smart partition forming station to a second picking location, or Picking 2 station. As described previously, a tote can be either a new tote or a previously configured used tote that has been reconfigured for new customer orders.

In this embodiment, the second picking station may be a fully manual picking station or a semi-automated picking station such as the previously described Kiva Robotic® system, where inventory "pods" located in the inventory storage or mixed shelving location are picked up and brought to a stationary human operator in the Picking 2 location by a fleet of mobile robotic drive units. Here, the items are physically removed from a carrier rack or bin holding bin, sorted against a pending order or orders, then placed into awaiting customized customer totes. When a customized customer tote is full, it is routed to a smart release station for a third picking sequence or Picking 3. At this point customer order totes are again regarded like bulk container totes and are selectively positioned within the smart release station, wherein the inventory of items is read by the smart station, and the appropriate addressable lids for items in the appropriate containment areas needed to fulfill the individual customer orders are released, allowing the items contained therein to drop out (via gravity), into a smart chute where each item is appropriately routed to the correct customer order shipping container, where they are labeled, checked for order accuracy, and ultimately shipped. The empty totes are then routed back to an empty tote inventory location to await future reconfiguration.

Figure 5:
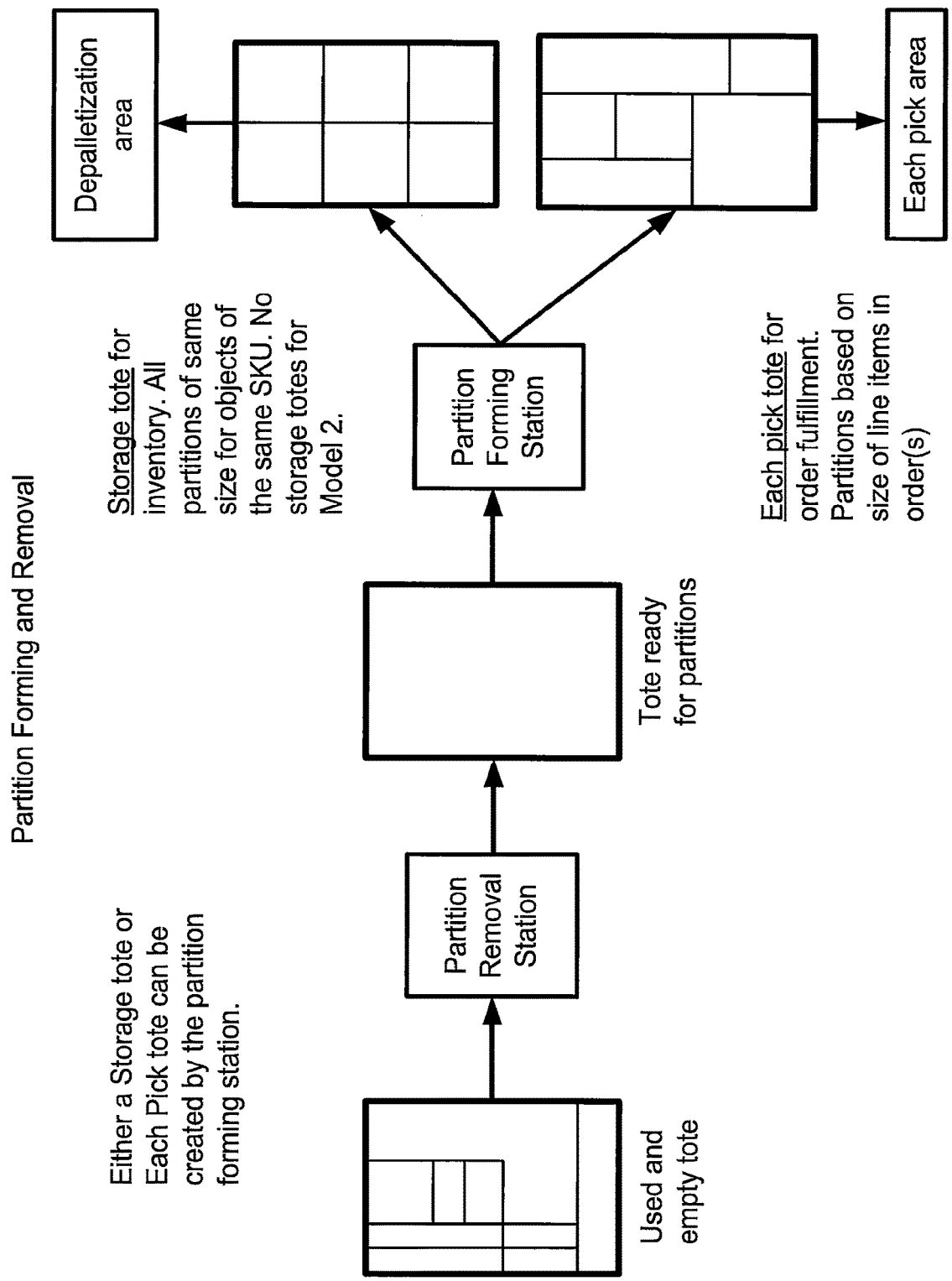
FIG. 5 is an illustrative example of a tote partition forming and removal station.

As illustrated in FIG. 5, the system includes partition forming stations and partition removal stations, or generally "partition stations". The partition stations are "smart stations" that are configured to receive program instructions from an ordering system. The programing instructions provide the partition stations with the necessary information about existing container conditions and required container conditions for new inventory storage requirements or new customer orders. The smart stations can then evaluate the requirements and determine how to deconstruct/disassemble a used configurable container and rebuilt it for the new requirements, or determine how to configure a new or empty container with the appropriate optimized or custom containment areas using partitioning units that fit inside the container. Although not illustrated in FIG. 5, a new container may comprise construction and or assembly of multiple independent smaller containers or partitioning units, and fashioning them into a larger stand-alone container. The smaller containers or partitioning units may be multi-sided open or enclosed units and comprise assembly features that allow them to be attached to each other to form a larger container or tote. Ideally, a series of standard sizes and shapes of partitioning units or smaller containers would be created to generate a picking inventory for the partition stations in order to optimize the assembly process. However, complete customization of dividers and containers is also possible with the use of such processes as 3D printing, gel-forming and other rapid prototyping processes to create virtually any shape required.

Figure 6:
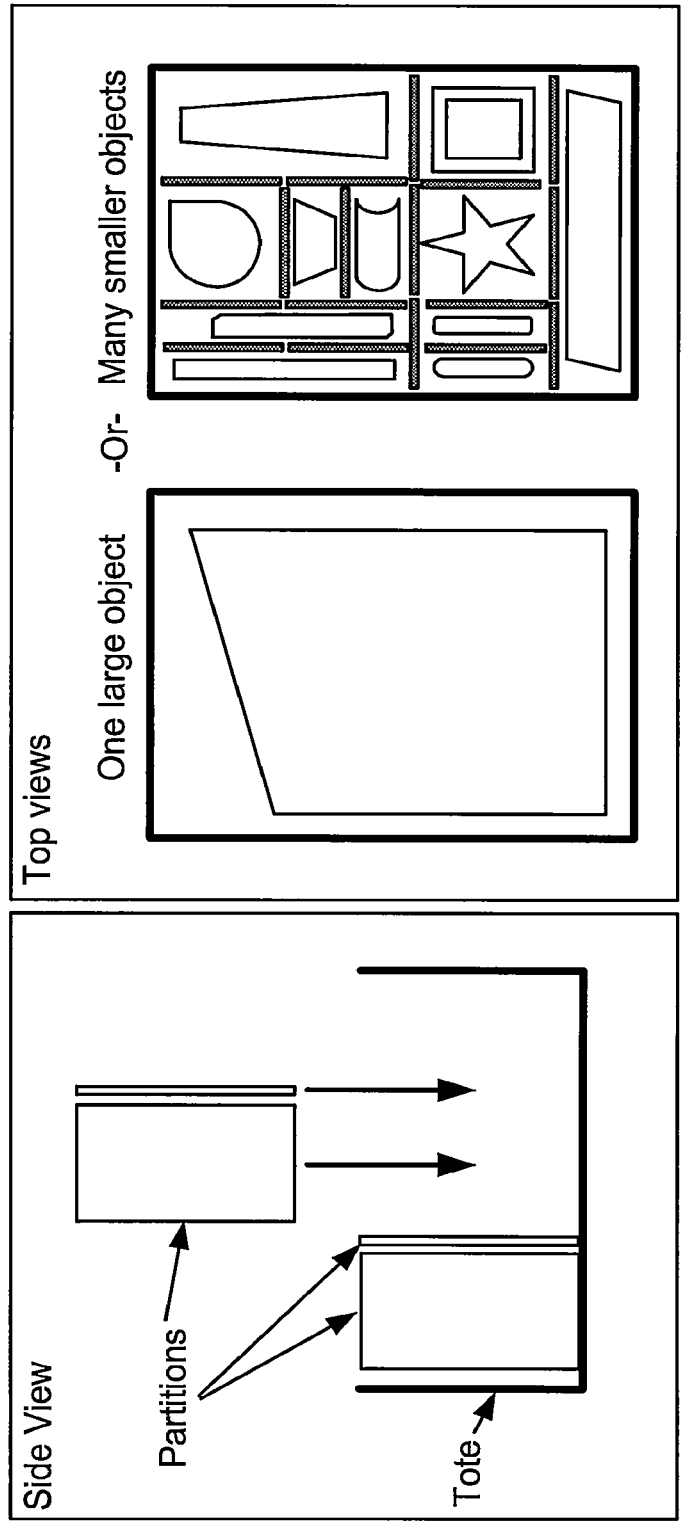
FIG. 6 is an illustrative example of an Each Pick tote with reconfigurable partitions capable of customizing a tote for optimal space utilization in real time.

FIG. 6 provides a further illustration of the idea of customized or optimized tote configurations. As illustrated in the left side view, partitions can be inserted (or removed) in any order or configuration to create any number of desired containment areas within a tote. The number of containment areas can be as few as one (no partitions), to as many as needed to completely fulfill the volume of the tote, regardless of item shape. Each containment area within a tote may comprise a single order of (1 item), wherein the tote holds many orders, or the entire container may comprise a single order (or part of a single order, or part of bulk item storage SKU).

Not shown, in this figure is the concept of layering in order to achieve maximum concentration of items in a custom configuration. The tote may comprise one or more layers, wherein each layer may be a complete layer covering the entire available surface area of the tote when viewed from the top, or a layer may be a partial layer, covering only a portion of the available surface area of the tote when viewed from the top. A partial layered configuration would thus accommodate large items in one part of a tote and many smaller items in multiple layers in another part of the tote. Also not shown in this figure is the use of addressable lids for each containment area. However, as described previously, the addressable and releasably lockable lid is a covering surface that may be permanent, temporary or reconfigurable. A lid may be a top enclosure, bottom enclosure, or intermediate surface between layers of a container. A lid may be a divider between two or more layers of containment areas in a container. A lid may be a covering surface for an entire tote or container, or may comprise separate sections covering all or some of the containment areas in a container. A lid may be hinged to allow it to swing open. A lid may be configured to slide open from the side, top or bottom of a container. The lid may be configured as an accordion to compress in multiple layers upon itself. The lid may be configured as a rolling or sliding single, or multi-sectioned unit, similar to roll-top desk or garage door, where it can retract into another are of the container along a tracked path. A lid may be a flexible or fabric surface that can be pulled away. A lid may be an integrated part of the tote, or may be applied at, near or close to the release station to the tote. In some cases, the lid may not be physically attached to the tote, but simply part of the release station and aligned to the tote so as to cause controllable release of certain item or items from the tote.

Depending on the desired custom configuration, a lid may also be configured from an inventory of components and may also comprise a combination of any of the lid configurations previously described. Lids with addressable sections may be configured for the top of a container that can be manipulated by grippers, or flipped; for the bottom of a container; either of which would allow for a bomb bay door type of gravimetric delivery, or alternately a sliding mechanism that may be better suited for a layer lid that could be manipulated from the side of container through an access slot. Ideally, lids may be provided in a series of standard shapes, sizes and configurations to allow for the construction of larger containment surfaces having a myriad of possible containment area shapes within a standard size configuration or configuration range.

Figure 7:
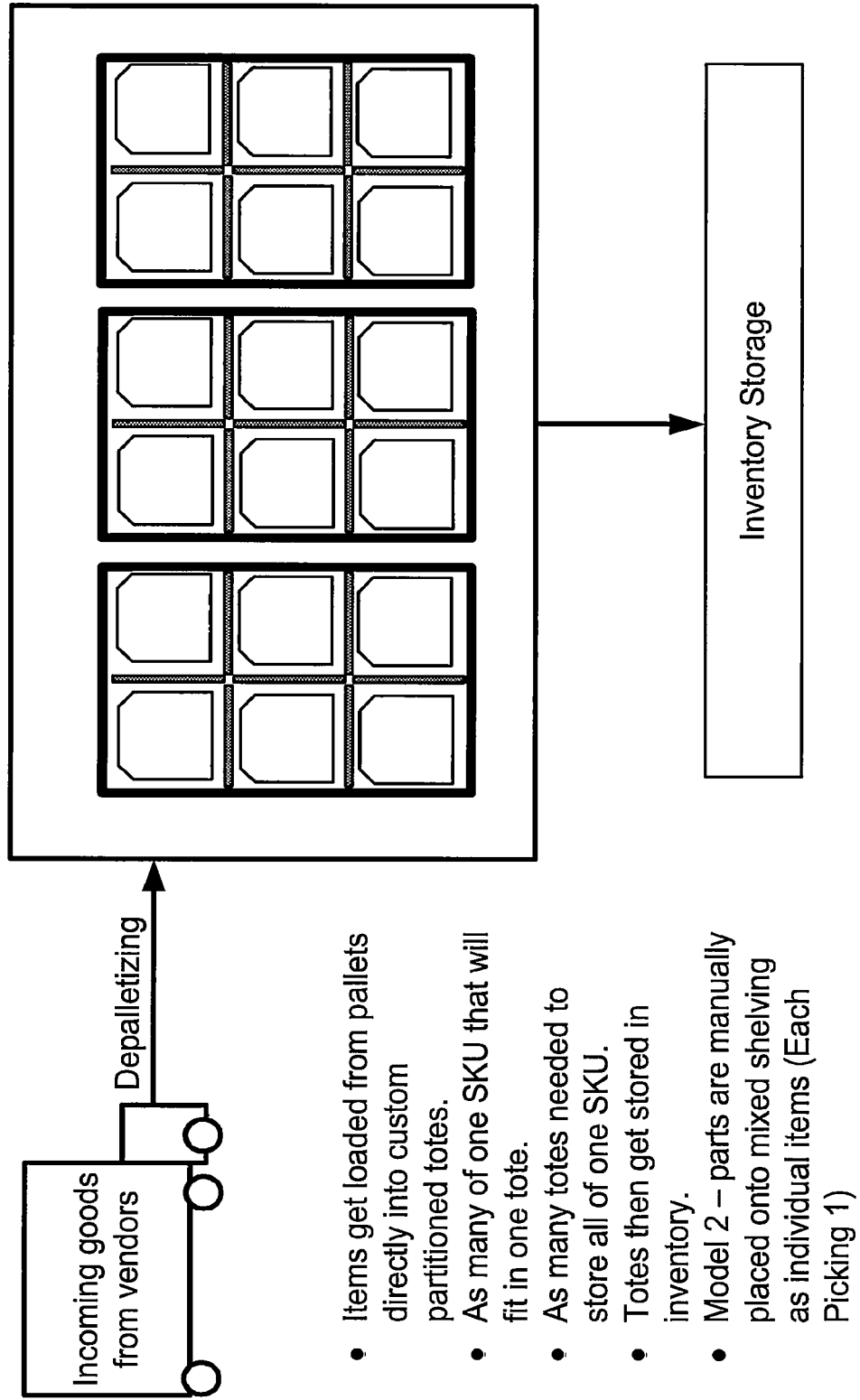
FIG. 7 is an illustrative example of a custom-partitioned inventory tote formed for optimized inventory storage.

In a further illustration of the possible applications of the described systems and totes, FIG. 7 illustrates the concept of configuring inventory storage totes utilizing the customized reconfigurable tote comprising optimized containment areas. As illustrated in FIG. 7, reconfigurable containers can be prepared to accept a maximum number of items comprising one SKU that will fit in one tote, either prior to or soon after the arrival of a bulk incoming goods order arriving at a warehouse from a vendor. When the bulk items are depalletized, they are placed directly into the custom optimized containers and stored in inventory. Alternatively, the bulk order may be broken down and may be manually placed into mixed shelving as individual items. Although not illustrated, the bulk item storage bins may be fitted with addressable lids. Alternatively they may be left open. Still further, bulk item storage bins may be stackable or nested.

Figure 8:
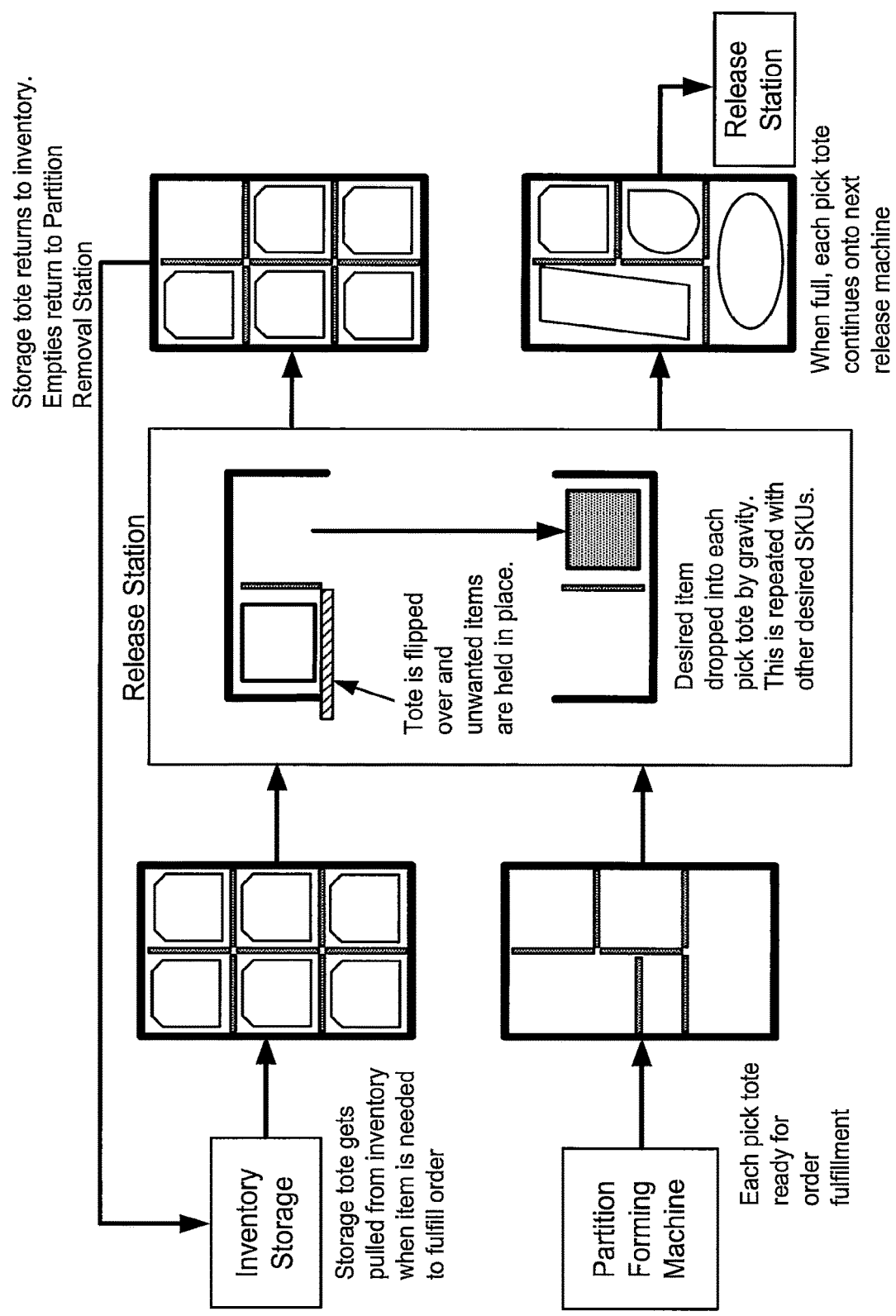
FIG. 8 is an illustrative flow diagram of an automated "Each Picking" warehouse material handling system utilizing optimized material handling totes processing items through a real time order fulfillment process illustrating the use of optimized inventory storage totes and customized "Each Pick" totes, processed through an automated release station.

FIG. 8 is a further illustration and alternative variation of the previously described Picking 2 operation described in FIG. 3 or 4. In this embodiment, an inventory tote is delivered to a smart release station. Corresponding custom configured Each Pick customer order totes are delivered to their corresponding receiving position in the smart release station, below the inventory storage totes. In this embodiment, the inventory totes are further manipulated by the release station, by flipping the tote which comprises a top lid comprising an addressable lid surface. When the tote is flipped, the release station activates the appropriate releasable lid to release the contents in one or more of the containment areas, allowing the contents to drop (via gravity) into the customer order tote below. Subsequently, other inventory totes may be positioned, flipped and allowed to deliver other SKU items into the customer order tote, until the customer order, (or multiple orders), is completed. Once completed, the inventory storage containers may be moved to other release station for similar operations; returned to inventory storage; or if empty, returned to an empty tote inventory location or to a partition removal station for reconfiguration.

Alternatively, when the customer order tote is full, it is subsequently routed to the next release station (Picking 3), where the items therein are released into the individual customer shipping containers for labeling, inspection and ultimate shipping to the customer.

Figure 9:
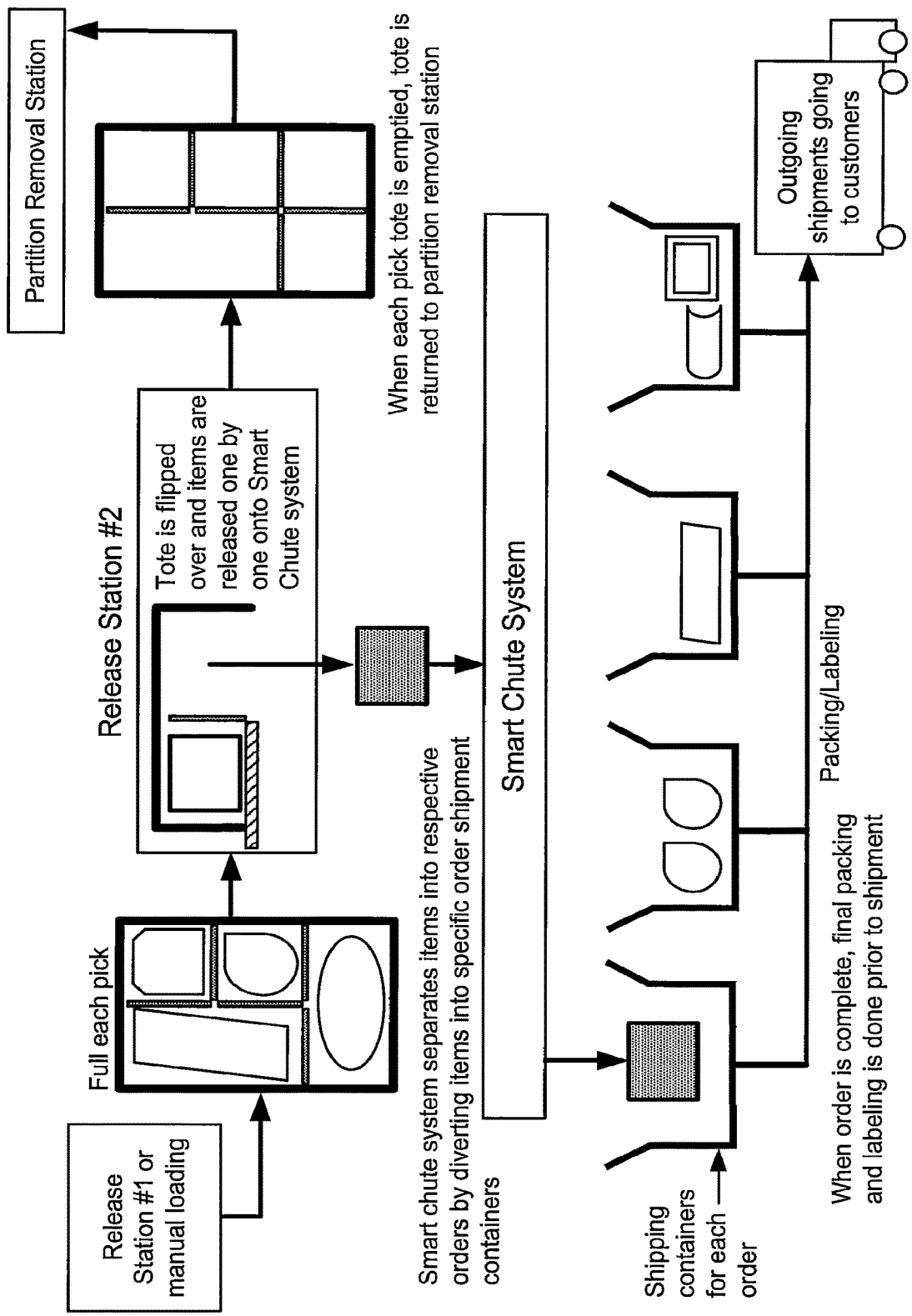
FIG. 9 is an illustrative flow diagram of an automated "Each Picking" warehouse material handling system utilizing optimized "each pick" material handling totes for processing items through a real time order fulfillment process illustrating the use of automated release stations, "smart chute" sorting and material handling, and customized recycling or partition removal from used totes, processed through an automated partition removal station, all in real time.
Figure 10:
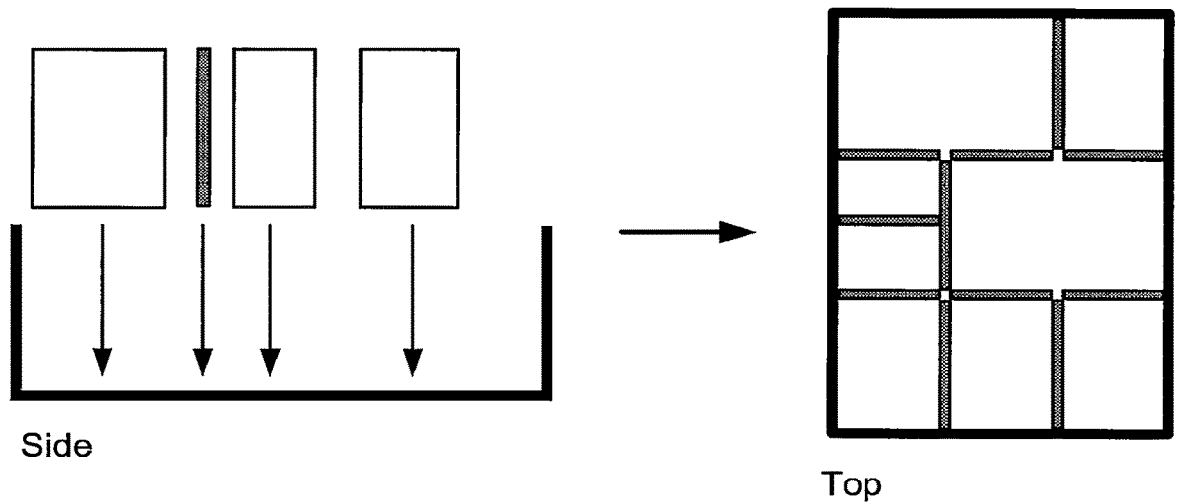
FIG. 10 is an illustration of partition walls/units being inserted into a tote to create a configuration of mixed-sized containment areas.
Figure 11:
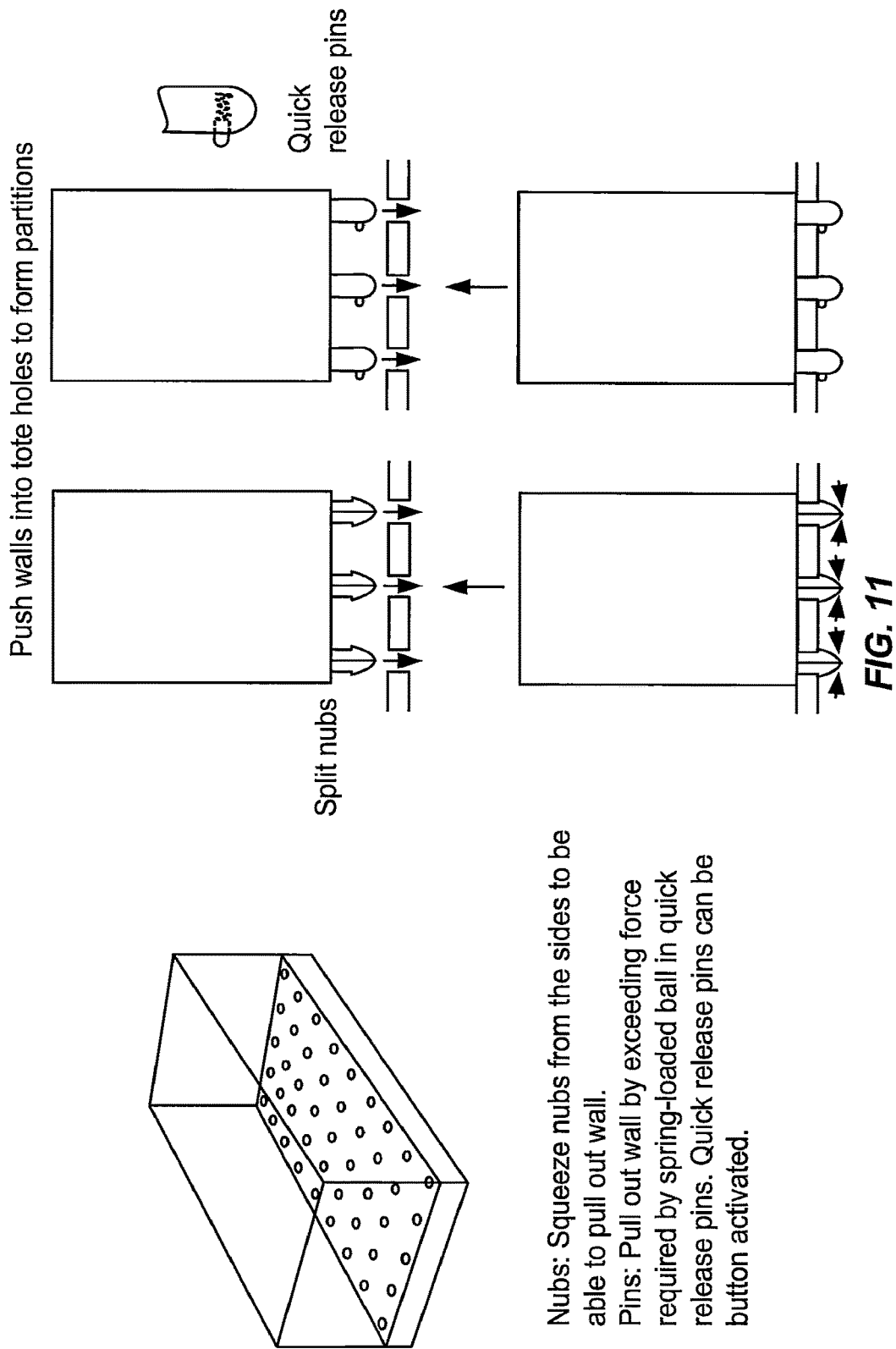
FIG. 11 is an illustration of a tote with a hole array configured to receive partitioning units with pins that align in the holes and retain the partitioning units.
Figure 12:
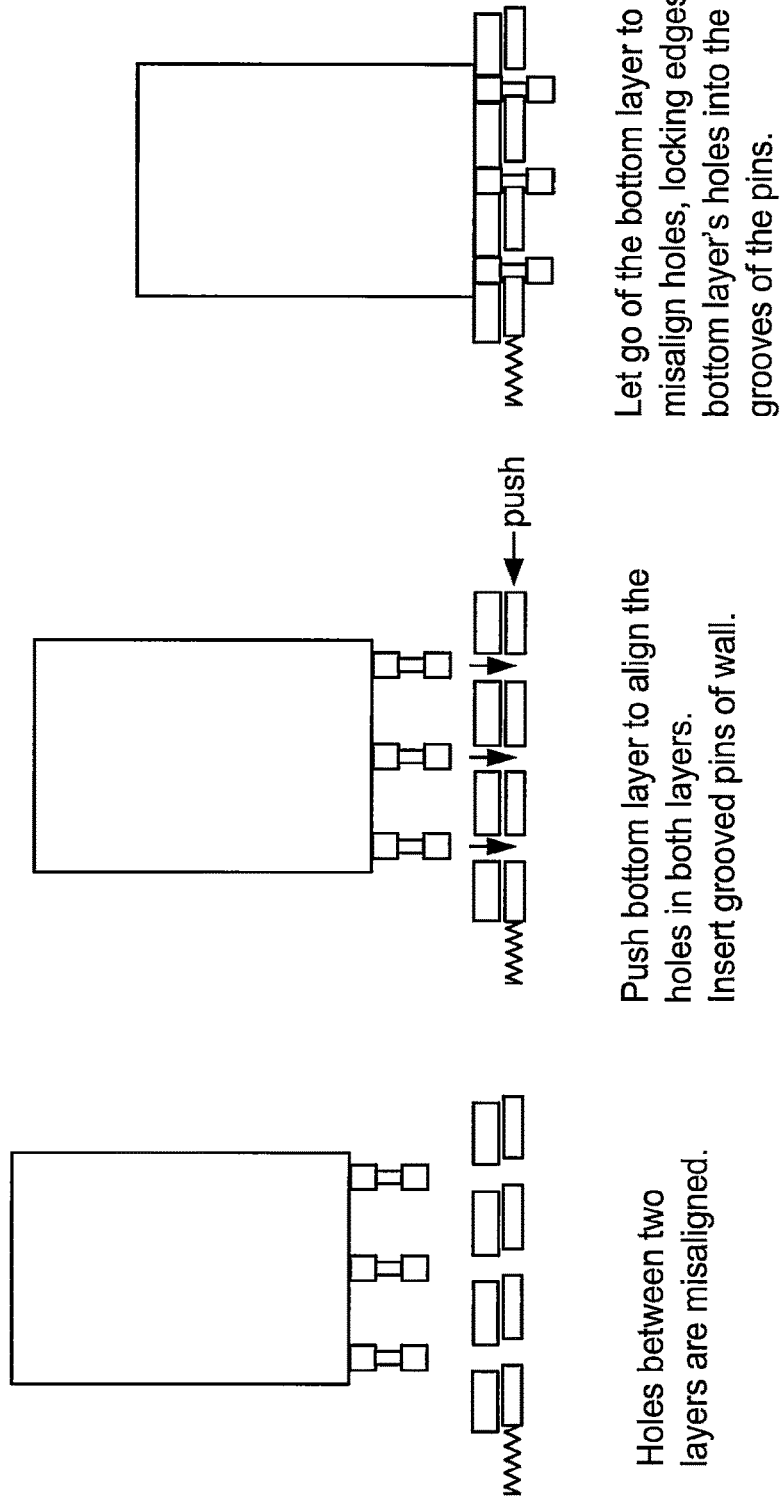
FIG. 12 is an illustration of illustrates a variant of FIG. 11 comprising a secondary locking layer to capture grooved pins.
Figure 15:
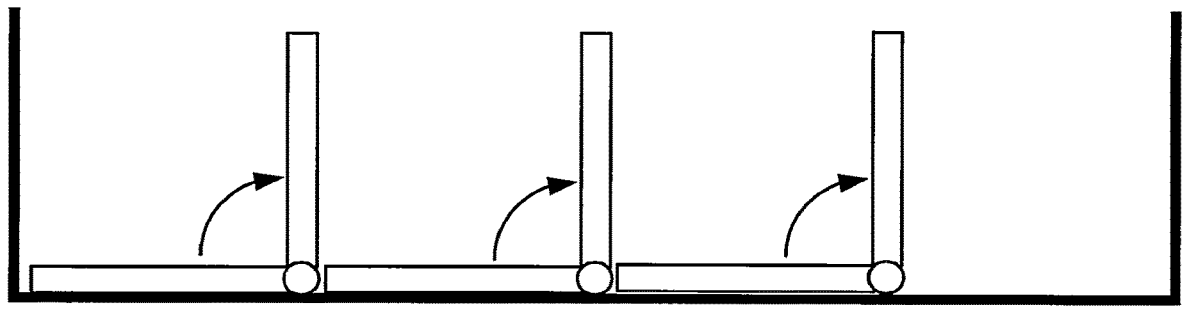
FIG. 15 is an illustration of the general concept of folding partitions.
Figure 18:
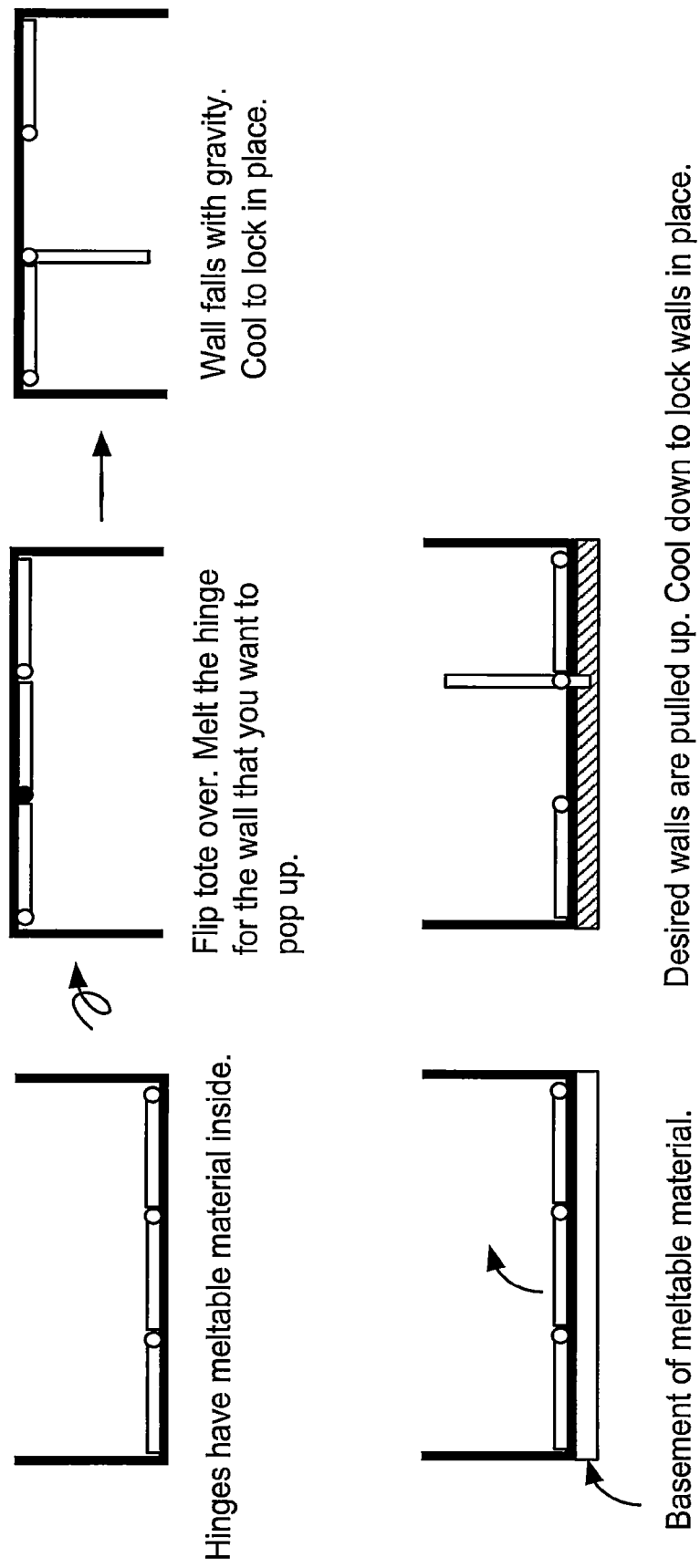
FIG. 18 is an illustration of hinged partitions that utilize meltable adhesives, wax, or solder-like materials to lock/unlock hinges.

FIG. 9 is an illustration of a fully automated system utilizing the full complement of options available for the automated customized totes. As illustrated herein once a tote (or multiple totes) is properly configured and fulfilled in a first picking operation (Picking 1), it is then forwarded to a smart release station for picking, the second picking or Picking 2. Each tote may comprise multiple items of a single SKU, or may alternately comprise multiple SKUs such as a mixed shelving bin.

In the second smart release station, the customized configuration inventory or mixed inventory totes are positioned above a smart chute. The totes are then manipulated, or flipped, wherein the addressable lids of each containment area are opened to release the selected items (via gravity) into the smart chute system, where the items are then sorted and properly distributed into the customized customer totes below. In some cases, the smart chute can be replaced by another container, tote, box or other means of fulfilling each customer's orders. The configurable tote, customer tote, or both may be moving and the release times in order to achieve the desired combination of item into the appropriate customer order container.

When inventory items are no longer needed to fulfill orders, the inventory or mixed shelving totes are removed from the smart station and returned to their assigned storage location, or moved to a new smart release station to repeat the disbursement sequence for other orders. If additional items are needed to complete the fulfilling of customer orders below the smart release station, other inventory or mixed shelving totes are selectively positioned to repeat the disbursement sequence and complete the fulfilling operation for the customer order totes. Any empty inventory or mixed shelving totes are routed back to an empty tote inventory location to await future reconfiguration.

Once a customer order tote is full at the second picking operation, it is routed to a second smart release station for a third picking sequence or Picking 3. At this point the previous sequence of operations is essentially repeated, wherein the customer totes, which may contain more than one customer order, are regarded like bulk container totes and are selectively positioned within the second smart release station, wherein the inventory of items is read by the smart station, and the appropriate addressable lids for items in the appropriate containment areas needed to fulfill the individual customer orders are released, allowing the items contained therein to drop out (via gravity), into a smart chute where each item is appropriately routed to the correct customer order shipping container, where they are labeled, checked for order accuracy, and ultimately shipped. The empty totes are then routed back to an empty tote inventory location to await future reconfiguration.

Provided herein is a system for the automated configuration, transport, storage, management and delivery of items comprising: a container configuration station for configuring optimized containers comprising: an automated assembly device, wherein the automated assembly device is adapted to optimally configure a reconfigurable container based on the number, size and volume of items according to specific ordering information or a first set of ordering information; the reconfigurable containers comprising one or more optimized containment areas; and a means for moving the assembled container to the next step in an automated process. Provided herein is a system for the automated configuration, transport, storage, management and delivery of items comprising: a container configuration station; an automated assembly device adapted to optimally configure a reconfigurable container at the container configuration station based on the number, size and volume of items according to specific ordering information or a first set of ordering information thereby generating an optimally configured container, the optimally configured container comprising one or more optimized containment areas; and an assembled container transporter configured to transport the optimally configured container to the next step in an automated process.

In some embodiments, the reconfigurable container comprises configurable, positionable and/or assemblable partitioning units. In some embodiments, the optimized containment areas comprise configurable, positionable and/or assemblable partitioning units. In some embodiments, the reconfigurable container consists of configurable, positionable and/or assemblable partitioning units. In some embodiments, the optimized containment areas are configured for the optimal storage and management of items. In some embodiments, the optimized containment areas are configured for the optimal transport and management of items to be selectively picked from storage inventory to fulfill orders. In some embodiments, selectively picked can be a subset of items picked from a storage inventory comprising an entire set of items. In some embodiments, the system further comprises a partition removal station, wherein the partitioning units are removed when the optimally configured container has fulfilled an order or orders for which it was originally configured, thereby restoring the optimally configured container to an un-configured state. In some embodiments, the system further comprises a partition removal station, wherein the partitioning units are removed when the optimally configured container has fulfilled an order or orders for which it was originally configured, thereby restoring the optimally configured container to an un-configured state, wherein the resulting reconfigurable container and/or partitioning units are returned to an available inventory for a future reconfiguration. In some embodiments, each containment area holds one item. In some embodiments, each optimally configured container is assigned a unique identification for each assembled configuration of the container. In some embodiments, the system further comprises an ordering system. In some embodiments, the system further comprises a release surface addressable to each optimized containment area. In some embodiments, the reconfigurable container comprises configurable, positionable and/or assemblable partitioning units. In some embodiments, the optimized containment areas comprise configurable, positionable and/or assemblable partitioning units. In some embodiments, the optimized containment areas are configured for the optimal storage and management of items. In some embodiments, the optimized containment areas are configured for the optimal transport and management of items to be selectively picked from storage inventory to fulfill orders. In some embodiments, selectively picked can be a subset of items picked from a storage inventory comprising an entire set of items. In some embodiments, the system further comprises a partition removal station, wherein the partitioning units are removed when a reconfigurable container has fulfilled an order or orders for which it was originally configured. In some embodiments, the reconfigurable container and/or partitioning units are returned to an available inventory for a future reconfiguration. In some embodiments, each containment area holds one item. In some embodiments, each configured container is assigned a unique identification for each assembled configuration of the container. In some embodiments, the system further comprises an ordering system. In some embodiments, the system further comprises a release surface addressable to each optimized containment area which can be actuated to controllably dispense each item as needed into an awaiting chute or order fulfilment container.

In some embodiments, the reconfigurable container comprises a multi-sided container comprising features that allow for the placement of dividing units to segregate portions of the container, creating individual containment areas within the container.

In some embodiments, the reconfigurable container comprises configurable, positionable and/or assemblable partitioning units. The partitioning units may themselves be smaller containers, capable of being assembled into a larger container.

In some embodiments, the optimized containment areas comprise configurable, positionable and/or assemblable partitioning units. The configurable, positionable and/or assemblable partitioning units may comprise wall units capable of forming simple or complex dividing sections.

In some embodiments, the reconfigurable container consists of configurable, positionable and/or assemblable partitioning units. The configurable, positionable and/or assemblable partitioning units may be provided in a series of standard shapes, sizes and volumetric capacities to allow for the construction of larger containers having a myriad of possible containment areas within a standard outer size configuration or configuration range.

In some embodiments, the optimized containment areas are configured for the optimal storage and management of items. With the ability to configure an optimized containment area, a tote may be customized such that a maximum number of items can be placed in a container regardless of size, volume or number of items In some embodiments, the optimized containment areas are configured for the optimal transport and management of items to be selectively picked from storage inventory to fulfill orders. In some embodiments, selectively picked can be a subset of items picked from a storage inventory comprising an entire set of items.

In some embodiments, a human operator is performing the task of determining the configuration of the optimized containment areas.

In some embodiments, the system further comprises a partition removal station, as previously described, wherein the partitioning units are removed when a reconfigurable container has fulfilled an order or orders for which it was originally configured.

In some embodiments, a human operator is performing the task of removing the partitions.

In some embodiments, the reconfigurable container and/or partitioning units are returned to an available inventory for a future reconfiguration.

As previously described, a partition may be a dividing unit or a stand-alone containment unit. Ideally, in addition to standard reconfigurable totes or containers, partitions, dividing units, or assemblable stand-alone containment units may be provided in a series of standard shapes, sizes and configurations to allow for the construction of larger configurable containers having a myriad of possible containment area shapes within a standard size configuration or configuration range.

In some embodiments, the system further comprises a release surface comprising a lid addressable to each optimized containment area. The release surface may be permanently attached or may be removable. The release surface may be a top, a bottom or an intermediate surface for the container or tote. In some cases, the release surface may be part of the release station, but control the release of objects from each optimized containment area by proper alignment between the openings in the release surface and the optimized containment areas within the tote.

In some embodiments, each containment area holds one item. In some embodiments, each containment area can hold one or more items. In some embodiments, each containment area can hold a plurality of items. In some embodiments, containment areas can hold one or more items.

In some embodiments, each configured container is assigned a unique identification for each assembled configuration of the container. In some embodiments, each configured container is assigned a barcode for each assembled configuration of the container.

In some embodiments, each configured containment area within each configurable container is assigned a unique identification for unit tracking within each of the containers. This concept would apply equally to inventory storage totes, mixed shelving storage containers or customer order totes.

In some embodiments, the system further comprises an ordering system.

In some embodiments the ordering system may be a computer-implemented system comprising: a digital processing device comprising an operating system configured to perform executable instructions and a memory; and providing a computer program including instructions executable by the digital processing device to process an incoming order and capable of determining the requirements for fulfilling the incoming orders.

In some embodiments the ordering system may be a human operator.

Provided herein is a method of using a system for the automated configuration, transport, storage, management and delivery of items comprising: providing a container configuration station for configuring containers comprising: providing an automated assembly device adapted to optimally configure a configurable container based on the number, size and volume of items according to specific ordering information or a first set of ordering information; supplying configurable containers comprising one or more optimized containment areas; and providing a means for transporting the assembled configurable container to the next step in an automated process. Provided herein is a method of using a system for the automated configuration, transport, storage, management and delivery of items comprising: providing a container configuration station for configuring containers; providing an automated assembly device; the automated assembly device optimally configuring a reconfigurable container at the container configuration station based on the number, size and volume of items according to specific ordering information or a first set of ordering information, thereby generating an optimally configured container comprising optimized containment areas; and providing a means for transporting the assembled configurable container to the next step in an automated process. In some embodiments, the method comprises providing configurable, positionable and/or assemblable partitioning units. In some embodiments, the optimally configured container comprises configurable, positionable and/or assemblable partitioning units. In some embodiments, the reconfigurable container consists of configurable, positionable and/or assemblable partitioning units. In some embodiments, the optimized containment areas are configured in the optimally configured container for the optimal storage and management of items. In some embodiments, the optimized containment areas are configured for the optimal transport and management of items to be selectively picked from storage inventory to fulfill orders. In some embodiments, selectively picked can be a subset of items picked from a storage inventory comprising an entire set of items. In some embodiments, the method comprises providing a partition removal station, wherein the partitioning units are removed when an optimally configured container has fulfilled an order or orders for which it was originally configured. In some embodiments, the reconfigurable container and/or partitioning units are returned to an available inventory for a future reconfiguration. In some embodiments, each containment area is configured to hold one item. In some embodiments, each optimally configured container is assigned a unique identification for each assembled configuration of the container. In some embodiments, the method further comprises: providing an ordering system. In some embodiments, the method further comprises providing a release surface addressable to each optimized containment area.

In some embodiments of the method, the reconfigurable container comprises: providing and using configurable, positionable and/or assemblable partitioning units. In some embodiments, the optimized containment areas comprises: providing and using configurable, positionable and/or assemblable partitioning units. In some embodiments, the reconfigurable container consists of configurable, positionable and/or assemblable partitioning units. In some embodiments, the optimized containment areas are configured for the optimal storage and management of items.

In some embodiments, the optimized containment areas are configured for the optimal transport and management of items to be selectively picked from storage inventory to fulfill orders. In some embodiments, selectively picked can be a subset of items picked from a storage inventory comprising an entire set of items.

In some embodiments, a human operator is performing the task of determining the configuration of the optimized containment areas.

Still further, some embodiments of the method comprise providing a partition removal station, wherein the partitioning units are removed when a reconfigurable container has fulfilled an order or orders for which it was originally configured.

In some embodiments, a human operator is performing the task of removing the partitions.

In some embodiments, the reconfigurable container and/or partitioning units are returned to an available inventory for a future reconfiguration.

In some embodiments, each containment area is configured to hold one item. In some embodiments, each containment area is configured to hold more than one item. In some embodiments, each containment area is configured to hold a plurality of items.

In some embodiments, each configured container is assigned a unique identification for each assembled configuration of the container. In some embodiments, each configured container is assigned a barcode for each assembled configuration of the container.

Further still, some embodiments comprise providing a release surface addressable to each optimized containment area.

Still further, some embodiments comprise providing an ordering system.

In some embodiments the ordering system may be a computer-implemented system comprising: a digital processing device comprising an operating system configured to perform executable instructions and a memory; and providing a computer program including instructions executable by the digital processing device to process an incoming order and capable of determining the requirements for fulfilling the incoming orders.

In some embodiments the ordering system may be a human operator.

Provided herein is a system for the automated configuration, transport, storage, management and delivery of items comprising: an ordering system; a container configuration station for configuring a configurable container comprising: an automated assembly device to optimally configure a configurable container according to specific ordering information or a first set of ordering information provided by the ordering system; the configurable container; and configurable partitioning units; wherein the configurable partitioning units are positionable within the configurable container by the automated assembly device to create optimized containment areas based on the number, size and volume of items to be placed in the containment areas according to the specific ordering information or a first set of ordering information, for the optimal transport, storage and management of said items, and a means to move the assembled configurable container to the next step in an automated process. Provided herein is a system for the automated configuration, transport, storage, management and delivery of items comprising: an ordering system; a container configuration station for configuring a configurable container comprising: an automated assembly device to optimally configure a configurable container according to specific ordering information or a first set of ordering information provided by the ordering system; the configurable container; and configurable partitioning units; wherein the configurable partitioning units are positionable within the configurable container by the automated assembly device to create optimized containment areas based on the number, size and volume of items to be placed in the containment areas according to the specific ordering information or a first set of ordering information, for the optimal transport, storage and management of said items, and a means to move the assembled configurable container to the next step in an automated process. In some embodiments, the system further comprises a partition removal station, wherein the partitioning units are removed when a reconfigurable container has fulfilled a task for which it was originally configured. In some embodiments, the reconfigurable container and or configurable partitioning units are returned to an available inventory for a future reconfiguration. In some embodiments, each containment area holds one item. In some embodiments, each configured container is assigned a unique identification for each configuration of the container. In some embodiments, each configurable container further comprises a release surface addressable to each optimized containment area which can be actuated to controllably dispense each item as needed into an awaiting chute or order fulfilment container.

In some embodiments, a human operator is performing the task of determining the configuration of the optimized containment areas.

In some embodiments, the system further comprises a partition removal station, wherein the partitioning units are removed when a reconfigurable container has fulfilled a task for which it was originally configured.

In some embodiments, a human operator is performing the task of removing the partitions.

In some embodiments, the reconfigurable container and or configurable partitioning units are returned to an available inventory for a future reconfiguration.

In preferred embodiments, each containment area holds one item. In some embodiments, each containment area can hold one or more items. In some embodiments, each containment area can hold a plurality of items. In some embodiments, containment areas can hold one or more items.

In preferred embodiments, each configured container is assigned a unique identification for each configuration of the container. In some embodiments, each configured container is assigned a barcode for each assembled configuration of the container.

In some embodiments, each configurable container further comprises a release surface addressable to each optimized containment area.

Provided herein is a system for the automated configuration, transport, storage, management and delivery of items comprising: an ordering system; a container configuration station for configuring a configurable container comprising: an automated assembly device to optimally configure the configurable container according to specific ordering information or a first set of ordering information provided by the ordering system; the configurable container; and configurable partitioning units; wherein the configurable partitioning units are positionable within the configurable container by the automated assembly device to create optimized containment areas based on the number, size and volume of items to be placed in the containment areas according to the specific ordering information or a first set of ordering information, for the optimal transport, storage and management of said items thereby generating the assembled configurable container, and a means to move the assembled configurable container to the next step in an automated process. In some embodiments, the system further comprises a partition removal station, wherein the partitioning units are removed when the assembled configurable container has fulfilled a task for which it was originally configured. In some embodiments, the configurable container and or configurable partitioning units are returned to an available inventory for a future reconfiguration. In some embodiments, each containment area holds one item. In some embodiments, each configured container is assigned a unique identification for each configuration of the container. In some embodiments, each configurable container further comprises a release surface addressable to each optimized containment area. In some embodiments of the method, the reconfigurable container comprises: providing and using configurable, positionable and/or assemblable partitioning units. In some embodiments, the optimized containment areas comprise using configurable, positionable and/or assemblable partitioning units. In some embodiments, the reconfigurable container consists of configurable, positionable and/or assemblable partitioning units. In some embodiments, the optimized containment areas are configured for the optimal storage and management of items. In some embodiments, the optimized containment areas are configured for the optimal transport and management of items to be selectively picked from storage inventory to fulfill orders. In some embodiments, selectively picked can be a subset of items picked from a storage inventory comprising an entire set of items. Still further, in some embodiments, comprise providing a partition removal station, wherein the partitioning units are removed when a reconfigurable container has fulfilled an order or orders for which it was originally configured. In some embodiments, the reconfigurable container and/or partitioning units are returned to an available inventory for a future reconfiguration. In some embodiments, each containment area is configured to hold one item. In some embodiments, each configured container is assigned a unique identification for each assembled configuration of the container. Still further, some embodiments comprise providing an ordering system. Further still, some embodiments comprise providing a release surface addressable to each optimized containment area which can be actuated to controllably dispense each item as needed into an awaiting chute or order fulfillment container.

Provided herein is a method of using a system for the automated transport, storage, management and delivery of items comprising: providing an ordering system; providing a container configuration station comprising an automated assembly device for optimally configuring a configurable container according to specific ordering information or a first set of ordering information provided by the ordering system; positioning a configurable container in the container configuration station; providing configurable partitioning units; and causing the configurable partitioning units to be optimally positioned within the configurable container by the automated assembly device; wherein the partitioning units are positioned in to create optimized containment areas based on the number size and volume of items to be placed in the containment areas according to the specific ordering information or a first set of ordering information, for the optimal transport, storage and management of said items; and providing a means to move the assembled configurable container to the next step in an automated process. Provided herein is a method of using a system for the automated transport, storage, management and delivery of items comprising: providing an ordering system; providing a container configuration station comprising an automated assembly device for optimally configuring a configurable container according to specific ordering information or a first set of ordering information provided by the ordering system; positioning a configurable container in the container configuration station; providing configurable partitioning units; and causing the configurable partitioning units to be optimally positioned within the configurable container by the automated assembly device thereby generating an assembled configurable container, wherein the partitioning units are positioned in to create optimized containment areas based on the number size and volume of items to be placed in the containment areas according to the specific ordering information or a first set of ordering information, for the optimal transport, storage and management of said items; and providing a means to move the assembled configurable container to the next step in an automated process. In some embodiments, the method comprises providing a partition removal station, wherein the partitioning units are removed from a assembled configurable container when the configured container has fulfilled a task for which it was originally configured. In some embodiments, the configurable container and or configurable partitioning units are returned to an available inventory for a future reconfiguration. In some embodiments, the configurable container is assembled for an inventory storage application. In some embodiments, the configurable container is assembled for a unique fulfillment order. In some embodiments, the configurable container is assembled for a first fulfillment order. In some embodiments, each containment area holds one item. In some embodiments, each assembled configurable container is assigned a unique identification for each configuration of the container. In some embodiments, the method further comprises: providing a release surface addressable to each optimized containment area. In some embodiments, the method further comprises providing a partition removal station, wherein the partitioning units are removed from a reconfigurable container when the configured container has fulfilled a task for which it was originally configured. In some embodiments, the reconfigurable container and or configurable partitioning units are returned to an available inventory for a future reconfiguration. In some embodiments, a reconfigurable container is assembled for an inventory storage application. In some embodiments, a reconfigurable container is assembled for a unique fulfillment order. In some embodiments, a reconfigurable container is assembled for a first fulfillment order. In some embodiments, each containment area holds one item. In some embodiments, each configured container is assigned a unique identification for each configuration of the container. In some embodiments, the method further comprises providing a release surface addressable to each optimized containment area which can be actuated to controllably dispense each item as needed into an awaiting chute or order fulfilment container.

In some embodiments of the method, a human operator is performing the task of determining the configuration of the optimized containment areas.

In some embodiments, the method further comprises providing a partition removal station, wherein the partitioning units are removed from a reconfigurable container when the configured container has fulfilled a task for which it was originally configured.

In some embodiments, a human operator is performing the task of removing the partitions.

In some embodiments, the reconfigurable container and or configurable partitioning units are returned to an available inventory for a future reconfiguration.

In some embodiments, a reconfigurable container is assembled for an inventory storage application.

In some embodiments, a reconfigurable container is assembled for a unique fulfillment order or multiple orders.

In some embodiments, a reconfigurable container is assembled for a first fulfillment order or multiple orders.

In preferred embodiments, each containment area holds one item. In some embodiments, each containment area can hold one or more items. In some embodiments, each containment area can hold a plurality of items. In some embodiments, containment areas can hold one or more items.

In preferred embodiments, each configured container is assigned a unique identification for each configuration of the container. In some embodiments, each configured container is assigned a barcode for each assembled configuration of the container.

In some embodiments, the method further comprises providing a release surface addressable to each optimized containment area.

Provided herein is a system for configuring a reconfigurable container comprising: a container configuration station comprising an automated assembly device; and configurable partitioning units; wherein the configurable partitioning units are positionable and assemblable by the automated assembly device to form a configured container comprising optimized containment areas based on the number, sizes and volumes of items for which the container is configured. Provided herein is a system for configuring a reconfigurable container comprising: a container configuration station comprising an automated assembly device; and configurable partitioning units; wherein the configurable partitioning units are positionable and assemblable by the automated assembly device to form a configured container comprising optimized containment areas based on the number, sizes and volumes of items for which the container is configured. In some embodiments, the system further comprises a partition removal station, wherein the configurable partitioning units are disassembled when a configured container has fulfilled a task for which it was originally configured. In some embodiments, the configurable partitioning units are returned to an available inventory for a future reconfiguration. In some embodiments, each containment area holds one item. In some embodiments, each containment area further comprises an addressable release surface. In some embodiments, each configured container is assigned a unique identification for each configuration of the container. In some embodiments, each configured container further comprises a release surface addressable to each optimized containment area. In some embodiments, the system further comprises a partition removal station, wherein the configurable partitioning units are disassembled when a configured container has fulfilled a task for which it was originally configured. In some embodiments, each configurable partitioning units are returned to an available inventory for a future reconfiguration. In some embodiments, each containment area holds one item. In some embodiments, each containment area further comprises an addressable release surface. In some embodiments, each configured container is assigned a unique identification for each configuration of the container. In some embodiments, each configured container further comprises a release surface addressable to each optimized containment area which can be actuated to controllably dispense each item as needed into an awaiting chute or order fulfilment container.

In some embodiments, a human operator is performing the task of determining the configuration of the optimized containment areas.

In some embodiments, the system further comprises a partition removal station, wherein the configurable partitioning units are disassembled when a configured container has fulfilled a task for which it was originally configured.

In some embodiments, a human operator is performing the task of removing the partitions.

In some embodiments, the configurable partitioning units are returned to an available inventory for a future reconfiguration.

In preferred embodiments, each containment area holds one item. In some embodiments, each containment area can hold one or more items. In some embodiments, each containment area can hold a plurality of items. In some embodiments, containment areas can hold one or more items.

In preferred embodiments, each containment area further comprises an addressable release surface.

In preferred embodiments, each configured container is assigned a unique identification for each configuration of the container. In some embodiments, each configured container is assigned a barcode for each assembled configuration of the container.

In some embodiments, each configured container further comprises a release surface addressable to each optimized containment area.

Provided herein is a method of using a system for configuring a reconfigurable container comprising: providing a container configuration station comprising an automated assembly device; and providing configurable partitioning units to the configuration station; wherein the partitioning units are positioned and assembled by the automated assembly device to form a configured container comprising optimized containment areas based on the number, size and volume of items for which the container is configured. Provided herein is a method of using a system for configuring a reconfigurable container comprising: providing a container configuration station comprising an automated assembly device; and providing configurable partitioning units to the configuration station; wherein the partitioning units are positioned and assembled by the automated assembly device to form a configured container comprising optimized containment areas based on the number, size and volume of items for which the container is configured. In some embodiments, the method further comprises: providing a partition removal station, wherein the configurable partitioning units are disassembled when a configured container has fulfilled a task for which it was originally configured. In some embodiments, the configurable partitioning units are returned to an available inventory for reconfiguration. In some embodiments, a reconfigurable container is assembled for an inventory storage application. In some embodiments, a reconfigurable container is assembled for a unique fulfillment order. In some embodiments, a reconfigurable container is assembled for a unique first order. In some embodiments, each containment area holds one item. In some embodiments, each containment area further comprises an addressable release surface. In some embodiments, each configured container further comprises an addressable release surface. In some embodiments, each configured container is assigned a unique identification for each configuration of the container. In some embodiments, the method further comprises providing a partition removal station, wherein the configurable partitioning units are disassembled when a configured container has fulfilled a task for which it was originally configured. In some embodiments, the configurable partitioning units are returned to an available inventory for reconfiguration. In some embodiments, a reconfigurable container is assembled for an inventory storage application. In some embodiments, a reconfigurable container is assembled for a unique fulfillment order. In some embodiments, a reconfigurable container is assembled for a first fulfillment order. In some embodiments, each containment area holds one item. In some embodiments, the method provides that each containment area further comprises an addressable release surface which can be actuated to controllably dispense each item as needed into an awaiting chute or order fulfilment container. In some embodiments, each configured container further comprises an addressable release surface which can be actuated to controllably dispense each item as needed into an awaiting chute or order fulfilment container. In some embodiments, each configured container is assigned a unique identification for each configuration of the container.

In some embodiments, the method further comprises providing a partition removal station, wherein the configurable partitioning units are disassembled when a configured container has fulfilled a task for which it was originally configured.

In some embodiments, a human operator is performing the task of removing the partitions.

In some embodiments, the configurable partitioning units are returned to an available inventory for reconfiguration.

In some embodiments, a reconfigurable container is assembled for an inventory storage application.

In some embodiments, a reconfigurable container is assembled for a unique fulfillment order. In some embodiments, a reconfigurable container is assembled for a first fulfillment order.

In some embodiments of the method, a human operator may provide additional or customized instruction to the configuration station to further customize the configuration of the containment areas.

In some embodiments, each containment area holds one item. In some embodiments, each containment area can hold one or more items. In some embodiments, each containment area can hold a plurality of items. In some embodiments, containment areas can hold one or more items.

In some embodiments, the method provides that each containment area further comprises an addressable release surface.

In some embodiments, each configured container further comprises an addressable release surface.

In some embodiments, each configured container is assigned a unique identification for each configuration of the container. In some embodiments, each configured container is assigned a barcode for each assembled configuration of the container.

Provided herein is a system for the automated configuration of a configurable container and selection of items to fulfill an order or orders comprising: an ordering system; a computer-implemented system comprising: a digital processing device comprising an operating system configured to perform executable instructions and a memory; a computer program including instructions executable by the digital processing device to process an incoming order and determine the requirements for fulfilling the incoming order comprising: a first software module configured to determine an optimized containment area configuration for a configurable container based on the number, size and volume of items in an incoming order; a second software module configured to manipulate an automated assembly device to assemble the components of the configurable container; a third software module configured to determine an optimal pick-order from an inventory and routing to fulfill the incoming order; a fourth software module configured to determine an optimal routing release sequence for the assembled configurable container containing the picked items for delivery of the picked order; and a means to move the assembled configurable container to a next step in the optimal routing an automated process.

In some embodiments, the system comprises a container configuration station for configuring a configurable container (or multiple containers) comprising: an automated assembly device to optimally configure the configurable container according to specific ordering information or a first set of ordering information for incoming order or orders, and the configuration determined by the first software; the configurable container comprising one or more addressable release surfaces; and configurable partitioning units; wherein the partitioning units are positionable within the configurable container by the automated assembly device to create optimized containment areas based on instruction provided by the second software module, and wherein each optimized containment area is accessible by an addressable release surface.

In some embodiments, the system further comprises a release station for releasing the picked items from the configurable container comprising an automated release device; wherein the configurable container is delivered to the release station and the automated release device is configured to cause the selective release of one or more of the addressable release surfaces, wherein the item held in the containment area where the addressable release surfaces of the configured container is released, will drop into an awaiting pick container or chute.

In some embodiments, the system comprises a third software module, having determined an optimal pick-order from the inventory and routing to fulfill the incoming order, provides executable instructions to the means for moving the assembled container.

In some embodiments, routing to fulfill an order can be the route or path or coordinates taken within the inventory space. In some embodiments, the inventory space can be the space that houses the one or more items to be picked to fulfill an order. In some embodiments, an optimal routing can be the route taken within the inventory space to meet the optimal pick-order. In some embodiments, the optimal routing can be the route taken within the inventory space to minimize the total time to fulfill an order. In some embodiments, the optimal routing can be the route taken to minimize the total distance travelled to fulfill an order. In some embodiments, the optimal routing can be the route taken to minimize contact with other configurable containers fulfilling other orders.

In some embodiments, the optimal pick-order is the order in which the one or more items of the order to be fulfilled are packed or added to the configurable container. In some embodiments, the optimal pick-order can be determined by minimizing the distance traveled between items within the inventory space to fulfill the order. In some embodiments, the optimal pick-order can be determined by the one or more layers of items within the configurable container. For example, the optimal pick-order can start with the items in the bottom layer first and can end with the items in the top layer last. In some embodiments, the optimal pick-order can be determined by a characteristic of each items in an order, for example color of each item, weight of each item, shape of each item, size of each item, temperature of each item, fragility of each item. For example, the optimal pick-order can start with adding heaviest items to the configurable container first, and lighter items second. In some embodiments, the optimal pick-order can be customized by a user.

In some embodiments, the system comprises a fourth software module, having determined an optimal routing for the assembled configurable container containing the picked items, provides executable instructions to the means for moving the assembled container for delivery of the picked order.

In some embodiments, the configurable container comprising an addressable release surface that releases items in the optimized containment areas when the addressable release surfaces are activated by the release station according to the routing release sequence determined by the fourth software module.

In some embodiments, the one or more addressable release surfaces of the configurable container comprises: a top surface; an intermediate surface; and a bottom surface.

In some embodiments, each optimized containment area is configured to hold one item.

In some embodiments, the container may have a 1-column configuration with multiple intersecting rows creating columnar containment areas. These may be appropriate when storing thin rectangular objects of similar configuration, such as books.

In some embodiments, each optimized containment area is configured to hold more than one item. For example, some items may be packaged or intended to be sold in pairs or some other multiple unit number. In this case it may be preferable to also pack, store, sort ad deliver those items in the appropriate multiple for which it was intended.

In preferred embodiments, each optimized containment area is configured to hold one item.

In preferred embodiments, each configured container is assigned a unique identification for each configuration of the container. In some embodiments, each configured container is assigned a barcode for each assembled configuration of the container.

In some embodiments, each configured container further comprises a containment surface, wherein the containment surface may be configured to cover or enclose the entire container. A containment surface can be permanent or temporary. A containment surface can be a top surface, bottom surface or intermediate layer surface.

In some embodiments, each configured container does not have a containment surface. In some embodiments, each configured containment area further comprises an addressable lid. In other embodiments, each configured containment area does not have a lid.

Provided herein is a system for the automated release of items from a configurable container comprising: a configurable container comprising: multiple containment areas of optimal size based on the number, size and volume of items therein; at least one containment surface comprising addressable releasable openings matching the configuration of the multiple containment areas; and a release station comprising an automated device configured to cause the selective release of one or more of the at least one addressable releasable openings of the containment surface, wherein, items held in the containment areas where the addressable releasable opening of the containment surface is activated and released will drop into an awaiting pick container or chute.

Provided herein is a method of using a system for the automated release of items from a configurable container comprising: providing a configurable container comprising multiple containment areas of optimal size based on the number, size and volume of items therein; providing at least one containment surface on the configurable container comprising addressable releasable openings matching the configuration of the multiple containment areas; providing a release station comprising an automated device configured to cause the selective release of one or more of the at least one addressable releasable openings of the containment surface, activating at least one addressable releasable opening causing the opening to release the item held therein, wherein, the item will drop into an awaiting pick container or chute.

Provided herein is a method of automating the storage, and picking of inventory comprising: providing a configurable container comprising multiple containment areas for optimal individual object storage based on item number, size and volume; providing at least one containment surface on the configurable container comprising releasable openings to match configuration of the multiple containment areas; providing an inventory system for recording the contents of each containment area within each configurable container and inventory storage locations thereof; and providing an order filling system configured to selectively pick items from the recorded locations of the inventory storage locations; directing an automated picking system to release the releasable opening of the at least one containment surface of any selected configurable container to allow the picking of the item contained therein; and depositing the item into an awaiting pick container or chute.

Provided herein is system for the configuration of reconfigurable containers comprising: an ordering system; a computer-implemented system comprising: a digital processing device comprising an operating system configured to perform executable instructions and a memory; a computer program including instructions executable by the digital processing device to process an incoming order and determine the requirements for fulfilling an incoming order from the ordering system comprising a fifth software module configured to determine an optimized number of configurable containers and the containment areas thereof, based on the number, size and volume of items in the incoming order; a sixth software module configured to manipulate an automated assembly device to assemble components of the configurable transport container as needed, according to the configuration requirements provided by the fifth software module; a seventh software module configured to identify a used assembled reconfigurable container and provide instruction to an automated disassembly device to disassemble the components of the configurable transport container; an eighth software module configured to provide instruction to a transport means for the return of a disassembled configurable container and/or the components thereof to an inventory location; and a means to move a reconfigurable container or the components thereof to an inventory location.

In some embodiments, the system comprises a container configuration station for configuring a configurable container comprising: an automated assembly device to optimally configure the configurable container according to specific ordering information or a first set of ordering information of an incoming order; a configurable container capable of comprising: multiple containment areas of optimally size based on the number, size and volume of items to be held therein; and at least one containment surface comprising addressable releasable openings matching the configuration of the multiple containment areas.

In some embodiments, the system further comprises a container disassembly station, wherein the components of a reconfigurable container are disassembled when a configured container has fulfilled a task for which it was originally configured.

In some embodiments, the disassembled components of a reconfigurable container are returned to an available inventory for a future reconfiguration.

In some embodiments, each containment area holds one item. In some embodiments, each containment area can hold one or more items. In some embodiments, each containment area can hold a plurality of items. In some embodiments, containment areas can hold one or more items.

In some embodiments, the configurable container further comprises a containment surface.

In some embodiments, each configured container is assigned a unique identification for each configuration of the container. In some embodiments, each configured container is assigned a barcode for each assembled configuration of the container.

In some embodiments, the system comprises a used reconfigurable transport container; a transport configuration station for reconfiguring a used reconfigurable transport container comprising: a disassembly device for removing existing optimized containment areas of the configurable transport container as directed by instructions provided by a seventh software module; an automated assembly device to optimally reconfigure the used reconfigurable container according to specific ordering information or a first set of ordering information of the incoming order and the configuration determined by the fifth software module; and a means for creating new optimized containment areas based on the number, size and volume of items to be held therein as determined by the sixth software module.

In some embodiments, a containment area can hold a first item. In some embodiments, a containment area can hold one or more items. In some embodiments, a containment area can hold a plurality of items. In some embodiments, a containment area can hold two or more items. In some embodiments, a containment area can hold three or more items. In some embodiments, a containment area can hold four or more items.

In some embodiments, the disassembled components of a reconfigurable container are returned to an available inventory for a future reconfiguration.

In some embodiments, each containment area holds one item. In some embodiments, each containment area can hold one or more items. In some embodiments, each containment area can hold a plurality of items. In some embodiments, containment areas can hold one or more items.

In some embodiments, each reconfigured container further comprises at least one addressable releasable opening matching the configuration of each containment area; the configurable container further comprises a containment surface.

In some embodiments, each configured container is assigned a unique identification for each reconfiguration of the container. In some embodiments, each configured container is assigned a barcode for each assembled configuration of the container.

In some embodiments, the containment surface comprises: a top surface; an intermediate surface; and a bottom surface.

In some embodiments, the releasable openings of the containment surface are releasably lockable.

In some embodiments, the releasable openings of the containment surface are activated by a release station.

Provided herein is a method of recycling used reconfigurable containers comprising: receiving an incoming order from an ordering system; providing a used reconfigurable container; providing a container reconfiguration station; delivering the used transport container to the transport configuration station; providing a means for evaluating the configuration of containment areas within the used reconfigurable container relative to the requirements of the new incoming order; providing a means for determining the optimal configuration of the containment areas required in the reconfigurable container based on number size and volume of items needed to satisfy or fulfill the new incoming order; removing existing containment areas and forming new containment areas to optimally reconfigure the used configurable transport container to satisfy or fulfill the new incoming order; providing releasable openings configured to have movable sections matching the size of each new containment area; and delivering the reconfigured transport to a picking station for processing of the new incoming order.

In some embodiments, the ordering system comprises: providing a computer-implemented system comprising: a digital processing device comprising an operating system configured to perform executable instructions and a memory; and providing a computer program including instructions executable by the digital processing device to process an incoming order and in real time determine the requirements for fulfilling the incoming order comprising: a fifth software module configured to determine an optimized containment area configuration for a used reconfigurable transport container based on the incoming order; a sixth software module configured to manipulate an automated assembly device to remove existing containment areas and form new containment areas in a reconfigurable transport container as needed, according to the configuration requirements provided by the fifth software module; a seventh software module configured to determine an optimal pick-order from an inventory and optimal routing to fulfill the new incoming order; an eighth software module configured to determine an optimal routing release sequence for the reassembled reconfigurable container containing the picked items for delivery of the picked order; and providing a means to move the reassembled reconfigurable container to a next step in the optimal routing of an automated process as determined by the seventh and eighth software modules.

In some embodiments, the used reconfigurable transport container has been previously configured with a partitioning arrangement adapted to satisfy or fulfill another order.

In some embodiments, the means for evaluating the used container to satisfy or fulfill the new incoming order comprises: a human; a template; an optical system; and a combination thereof.

In some embodiments, the non-limiting means for moving the reassembled reconfigurable transport comprises: a human; a cart; a robot; a conveyor; an automated transport device; and a combination thereof.

Provided herein is a configurable container adapted for automated picking systems comprising: assemblable sub-units configured to hold an item, wherein the sub-units are configurable to be assembled to each other to form a nested container, wherein the assembled sub-units are optimally configured and positioned based on number, size and volume to create multiple containment areas within the nested container and configured to receive and retain an optimized number of items for an order or multiple orders; and each nested container comprises a containment surface comprising releasable openings configured to have movable sections matching the size of each assembled sub-unit; wherein the items held within each assembled sub-unit can be selectively picked during automated order picking operations, allowing only the item contained therein to be released when the releasable opening of a specific assembled sub-unit is released. In some embodiments, selectively picked can be a subset of items picked from a storage inventory comprising an entire set of items.

In some embodiments, a storage inventory can comprise one or more items. The one or more items comprising the storage inventory can be identical items. The one or more items comprising the storage inventory can be different items. The one or more items can comprise one or more identical items and one or more different items. In some embodiments, the one or more items comprising the storage inventory can be organized. The one or more items can be organized by type, size, color, weight, cost, shape, or others. In some embodiments, the one or more items comprising the storage inventory can be stored randomly. In some embodiments, a storage inventory can comprise one or more items to fulfill one or more orders. In some embodiments, a storage inventory can comprise one or more shelving units or bins or other storage units comprising one or more items. In some embodiments, a storage inventory can comprise a warehouse comprising one or more items. In some embodiments, one or more items can be removed from the storage inventory, for example, to fulfill an order. In some embodiments, one or more items can be added to a storage inventory, for example, to replacement items that were removed to fulfill an order.

As illustrated in FIG. 20, the containment areas may be supplied as pre-made bins from a library of pre-made bins that are assemblable to form a tote.

In some embodiments, the releasable openings of the containment surface are lockable.

In some embodiments, the assemblable sub-units are configured to optimal receive and constrain an item based on number, size and volume.

In some embodiments, the assemblable sub-units are configured to be uniform in one dimension. In some embodiments, the assemblable sub-units can be uniform in length. In some embodiments, the assemblable sub-units can be uniform in width. In some embodiments, the assemblable sub-units can be uniform in depth. In some embodiments, the assemblable sub-units can be uniform in height. In some embodiments, the assemblable sub-units can be uniform in more than one dimension. In some embodiments, the assemblable sub-units can be uniform in two dimensions. In some embodiments, the assemblable sub-units can be uniform in three dimensions.

In some embodiments, the assemblable sub-units are configured to have a common assembly feature.

In some embodiments, the assemblable sub-units are adapted for use by an order processing system.

In some embodiments, each containment area holds one item. In some embodiments, each containment area can hold one or more items. In some embodiments, each containment area can hold a plurality of items. In some embodiments, containment areas can hold one or more items.

In some embodiments, each nested container is assigned a unique identification for each configuration of the container. In some embodiments, each configured container is assigned a barcode for each assembled configuration of the container.

Provided herein is a method of using a configurable transport container adapted for automated picking systems comprising: providing two or more assemblable sub-units, each optimally configured to hold an item based on number, size and volume for an order or orders; positioning the assemblable sub-units based on item number, size and volume to form multiple containment areas in an optimal configuration; assembling the sub-units to each other to create nested container comprising containment areas configured to receive and retain an optimized number of items, and providing a containment surface comprising lockable and releasable openings configured to have movable sections matching the size of each assembled sub-unit, wherein the items held within each assembled sub-unit can be selectively picked during automated order picking operations; providing a means for unlocking the releasable opening, allowing only the item contained therein to be released when the releasable opening of a specific assembled sub-unit is released; depositing the item into an awaiting pick container or chute.

In some embodiments of the method, the assemblable sub-units are adapted for use with an order processing system.

Provided herein is a configurable container adapted for automated picking systems comprising: assemblable sub-units configured to hold an item, wherein the sub-units can be configurable to be assembled to each other to form a nested container, wherein the assembled sub-units are optimally configured and positioned based on number, size and volume to create multiple containment areas within the container and configured to receive and retain an optimized number of items for an order or orders; wherein the items held within each assembled sub-unit can be selectively picked during automated order picking operations, wherein the automated picking station provides preconfigured releasable lid configurations for allowing only the item contained therein to be released when the releasable lid of a specific assembled sub-unit is released.

Provided herein is a configurable container adapted for automated picking systems with an ordering system comprising: a configurable container; assemblable sub-units, smaller than the configurable container and configured to hold one item, wherein the sub-units are configurable to be assembled to each other to create optimal containment areas within the transport container to satisfy or fulfill an order or multiple orders provided by the ordering system, wherein the assemblable sub-units are optimally configured and positioned based on the number, size and volume of the items in the order to create optimized containment areas within the transport container to receive and retain optimized numbers of items to satisfy or fulfill the order; and each transport container comprises a containment surface comprising releasably lockable openings configured to have movable sections matching the size of each assembled sub-unit; wherein the items held within each assembled subunit can be selectively picked during automated order picking operations, allowing only the item contained therein to be released when the releasably lockable opening of a specific assembled subunit is released.

In some embodiments, the sub-units are configured to divide the volume of the of the configurable transport container into two sections along a first plane.

In some embodiments, the two sections are not equal in size or volume.

In some embodiments, the sub-units are configured to divide the two sections into one or more additional sections along at least a second intersecting plane.

In some embodiments, the at least second intersecting plane comprises: a horizontal plane; a transverse plane; an oblique plane; and a diagonal plane.

In some embodiments, the sub-units are configured to divide the volume of the configurable transport container along one plane only Provided herein is a method of making a configurable container adapted for automated picking systems with an ordering system comprising: providing a configurable container; providing assemblable sub-units, smaller than the configurable container and configured to hold one item, positioning and assembling the assemblable sub-units based on the number, size and volume of the items in the order to create optimized containment areas to satisfy or fulfill the order; and providing a containment surface for the transport container comprising releasably lockable openings configured to have movable sections matching the size of each assembled sub-unit.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for configuring a reconfigurable container, the system comprising:
    a container configuration station comprising an automated actuator assembly device; and
    configurable partitioning units;
    wherein the automated actuator assembly device is operable to selectively position or assemble the configurable partitioning units within the reconfigurable container to configure the reconfigurable container, the reconfigurable container comprising containment areas, and wherein containment area dimensions are defined by the number, sizes, and volumes of one or more items for which the reconfigurable container is configured.

2. The system of claim 1, further comprising a partition removal station, wherein the configurable partitioning units disassemble when a reconfigurable container fulfills a task.

3. The system of claim 2, wherein the configurable partitioning units return to a storage inventory for a future reconfiguration.

4. The system of claim 1, wherein each of the containment areas holds at least a first item.

5. The system of claim 1, wherein each of the containment areas further comprises an addressable release actuator operable to release at least one item in the containment area.

6. The system of claim 1, wherein the reconfigurable container is assigned a unique identification for each configuration of the reconfigurable container.

7. The system of claim 1, wherein the reconfigurable container further comprises a release actuator addressable to each of the containment areas such that the release actuator is operable to release at least one item from at least one of the containment areas.

8. The system of claim 1, further comprising a dispensing station, wherein the configurable partitioning units are controlled to dispense one or more items out of container.

9. The system of claim 8, wherein the dispensing station is located at a different location from the container configuration station.

10. The system of claim 9, further comprising a conveyor coupling the container configuration station with the dispensing station, the conveyor being configured to move the reconfigurable container between the container configuration station and the dispensing station.

11. The system of claim 8, wherein the dispensing station comprises an a smart dispenser, an awaiting chute, or an order fulfillment container.

12. The system of claim 1, wherein the configurable partitioning units are positioned or assembled by the automated actuator assembly device to form the reconfigurable container based on instructions from an automated warehouse picking system.

13. The system of claim 1, further comprising a release station configured to dispense one or more items into the reconfigurable container.

14. The system of claim 13, wherein the release station is configured to dispense the one or more items into the reconfigurable container based on instructions from an automated warehouse picking system.

* * * * *